(12) United States Patent
Tamura et al.

(10) Patent No.: US 10,545,623 B2
(45) Date of Patent: Jan. 28, 2020

(54) INFORMATION PROCESSING DEVICE AND INFORMATION PROCESSING METHOD TO COORDINATE WITH A PLURALITY OF INFORMATION PROCESSING DEVICES

(71) Applicant: SONY CORPORATION, Tokyo (JP)

(72) Inventors: Shigefumi Tamura, Tokyo (JP); Ryosuke Nomura, Kanagawa (JP); Yusuke Shimizu, Saitama (JP); Masaki Kasahara, Tokyo (JP); Kenji Nishiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 290 days.

(21) Appl. No.: 15/025,154

(22) PCT Filed: Aug. 20, 2014

(86) PCT No.: PCT/JP2014/071802
§ 371 (c)(1),
(2) Date: Mar. 25, 2016

(87) PCT Pub. No.: WO2015/049931
PCT Pub. Date: Apr. 9, 2015

(65) Prior Publication Data
US 2016/0231872 A1 Aug. 11, 2016

(30) Foreign Application Priority Data

Oct. 4, 2013 (JP) .................................. 2013-208828

(51) Int. Cl.
*G06F 3/0481* (2013.01)
*G06F 3/14* (2006.01)

(52) U.S. Cl.
CPC .......... *G06F 3/0481* (2013.01); *G06F 3/1454* (2013.01)

(58) Field of Classification Search
CPC . G06F 3/1454; G06F 1/1694; G09G 2370/20; H04N 2005/4408;
(Continued)

(56) References Cited

U.S. PATENT DOCUMENTS

2004/0257337 A1* 12/2004 Shibamiya ........... H04N 5/4403
345/156
2007/0293190 A1* 12/2007 Ota ........................ G08C 17/00
455/404.2

(Continued)

FOREIGN PATENT DOCUMENTS

JP 2004-021595 A 1/2004
JP 2006-065558 A 3/2006
(Continued)

*Primary Examiner* — Daniel Samwel
(74) *Attorney, Agent, or Firm* — Chip Law Group

(57) ABSTRACT

According to the present disclosure, there is provided an information processing device including: a communication unit configured to receive display position designation information indicating a display position of a window from another information processing device; and a control unit configured to perform control of displaying a window at the display position indicated by the display position designation information in a display area of a display unit. According to the present disclosure, an information processing device can receive display position designation information from another information processing device and display a window at a display position indicated by the display position designation information. Therefore, according to the present disclosure, a user can designate a display position of a window to be displayed on an information processing device using another information processing device.

12 Claims, 50 Drawing Sheets

(58) Field of Classification Search
CPC ..... H04N 2005/441; H04N 2005/4412; H04N 2005/4414; H04N 2005/4425; H04M 1/721533
See application file for complete search history.

(56) References Cited

U.S. PATENT DOCUMENTS

| | | | | |
|---|---|---|---|---|
| 2010/0302130 A1* | 12/2010 | Kikuchi | ................ | G06F 3/0481 345/1.3 |
| 2011/0001686 A1* | 1/2011 | Belvin | ................ | G06F 3/1454 345/2.2 |
| 2011/0163939 A1* | 7/2011 | Tam | ................ | G06F 3/1454 345/2.3 |
| 2011/0283334 A1* | 11/2011 | Choi | ................ | G06F 3/04883 725/148 |
| 2012/0030594 A1* | 2/2012 | Yokoyama | ................ | G06F 3/1454 715/765 |
| 2012/0191832 A1* | 7/2012 | Kim | ................ | H04L 12/2812 709/223 |
| 2014/0250245 A1* | 9/2014 | Pahud | ................ | G06F 13/102 710/14 |
| 2014/0282103 A1* | 9/2014 | Crandall | ................ | H04L 65/403 715/753 |
| 2014/0282229 A1* | 9/2014 | Laukkanen | ................ | G06F 3/0481 715/788 |
| 2014/0358981 A1* | 12/2014 | Miyake | ................ | H04L 67/1095 709/201 |

FOREIGN PATENT DOCUMENTS

| | | |
|---|---|---|
| JP | 2006-215531 A | 8/2006 |
| JP | 2007-148350 A | 6/2007 |
| JP | 2010-026327 A | 2/2010 |
| JP | 2013-145451 A | 7/2013 |
| JP | 2013-179553 A | 9/2013 |
| WO | 2009/125481 A1 | 10/2009 |

* cited by examiner

FIG. 25
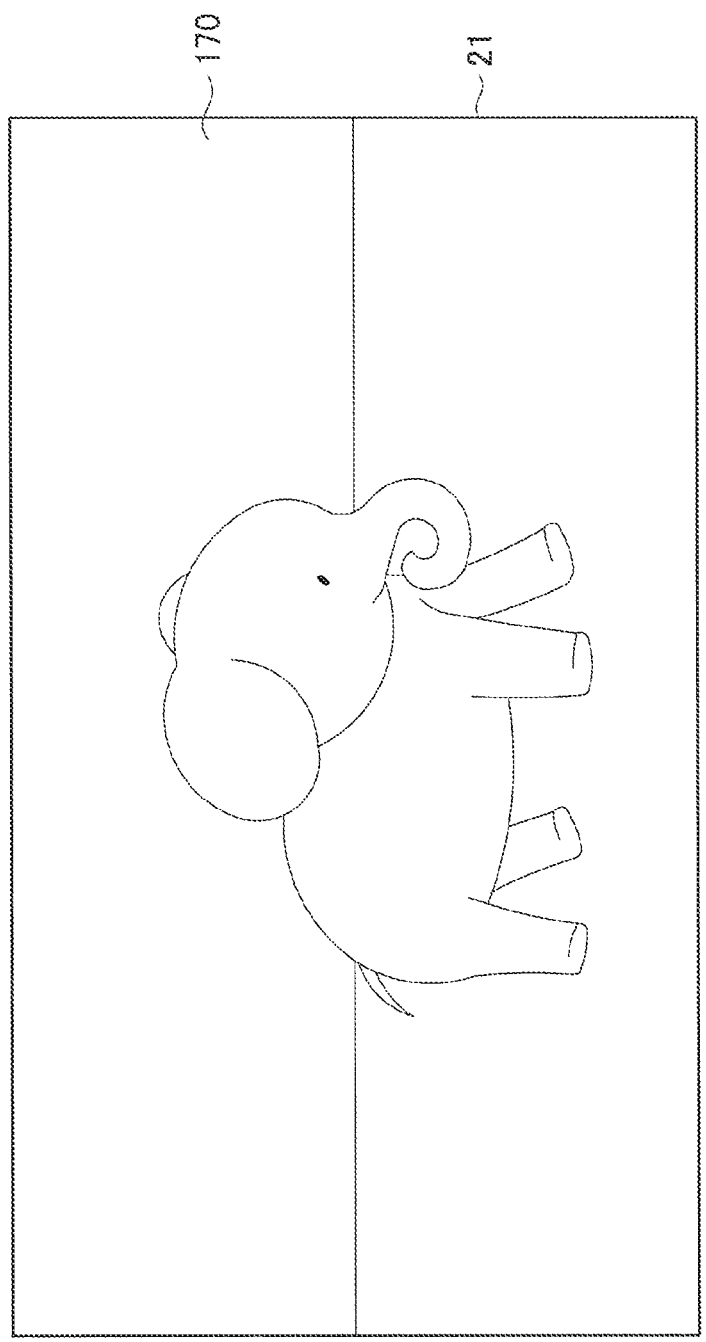
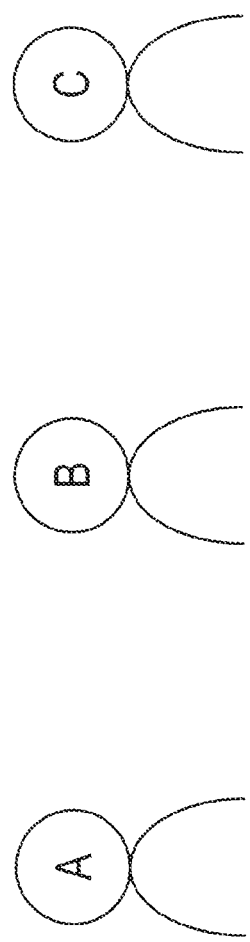

FIG. 31
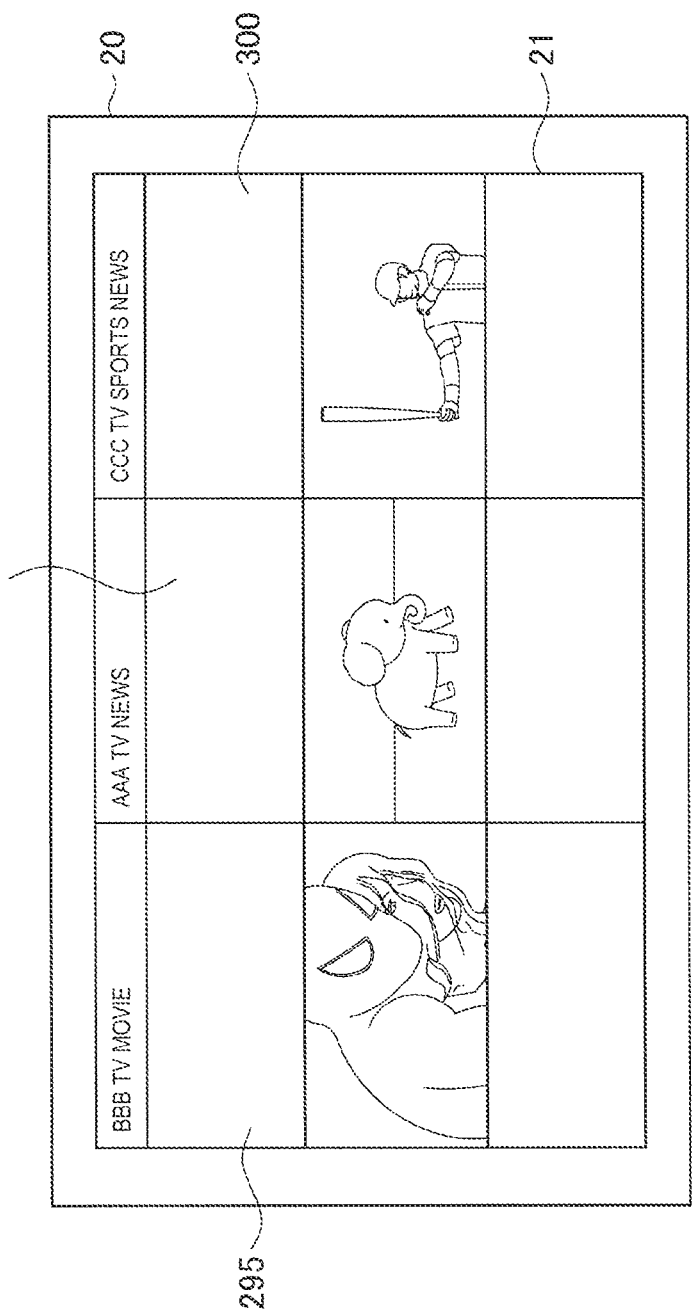
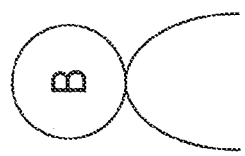
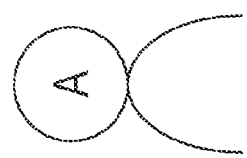

FIG. 32
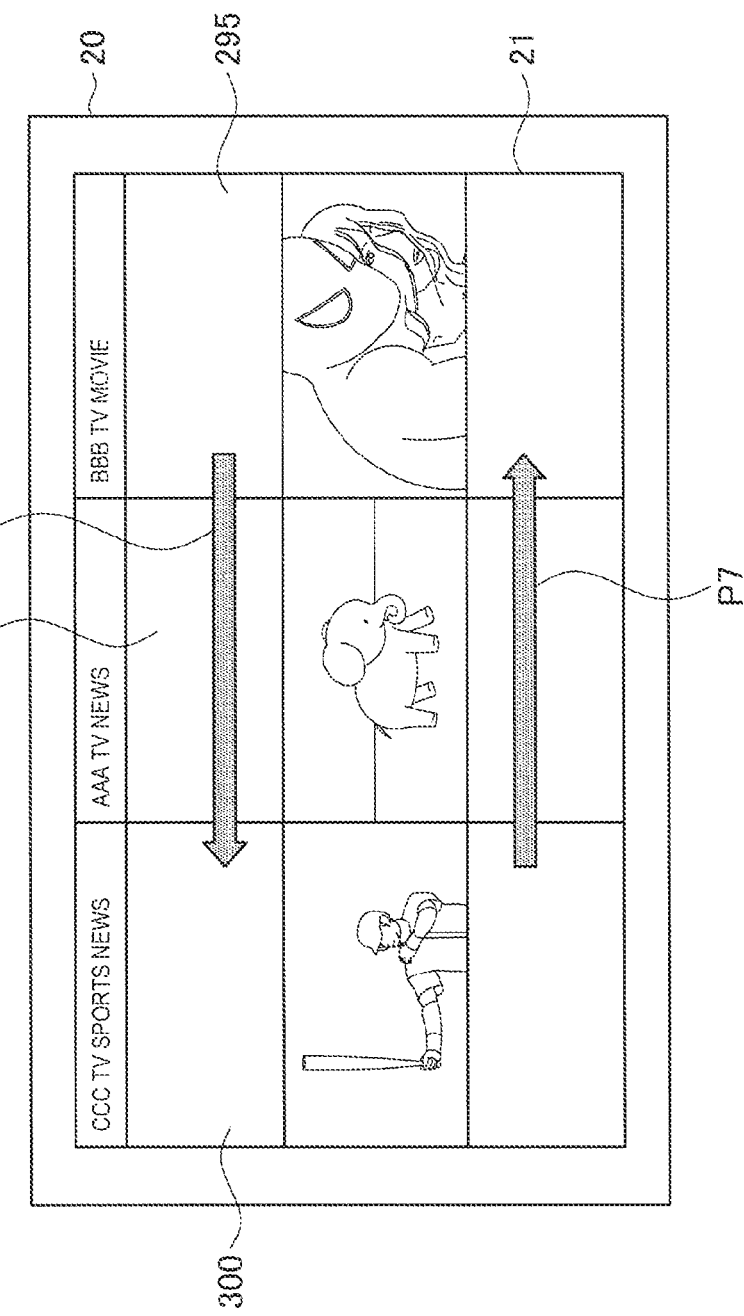
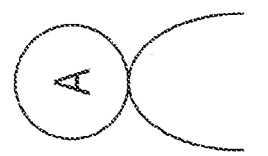
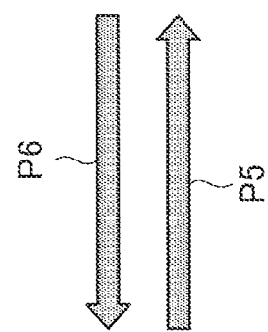
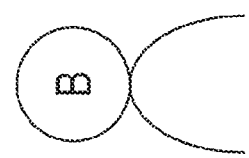

FIG. 35
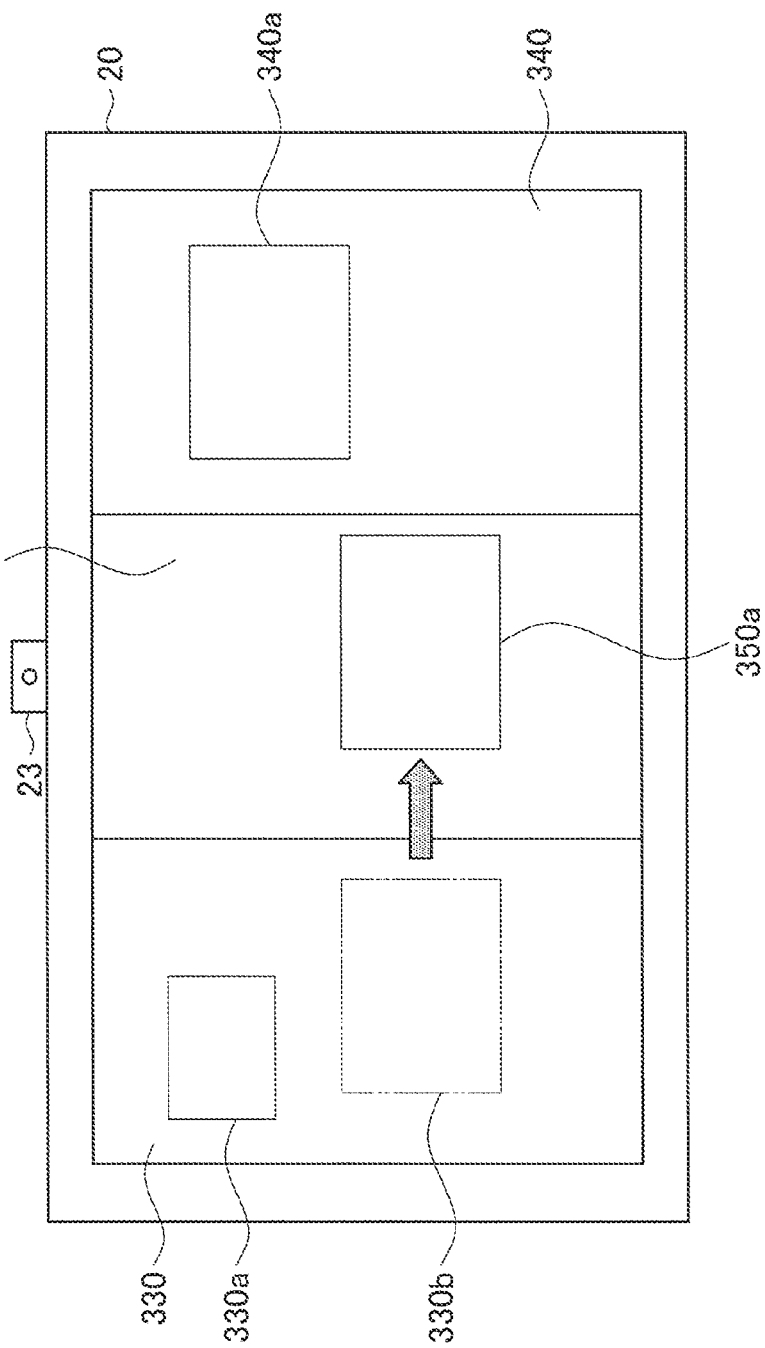
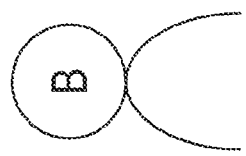
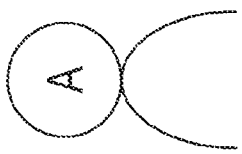

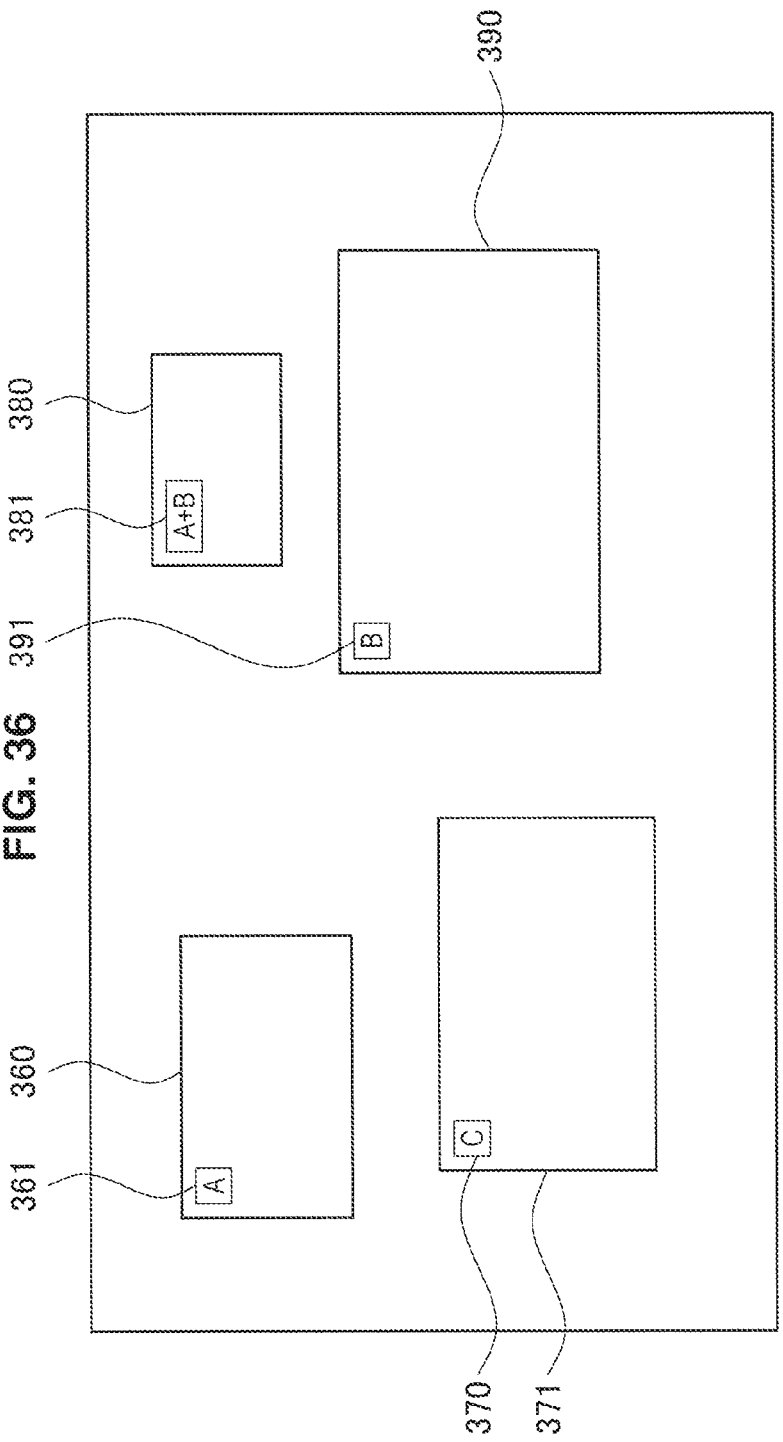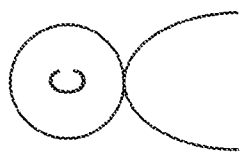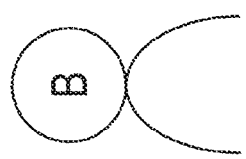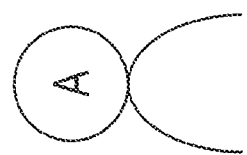

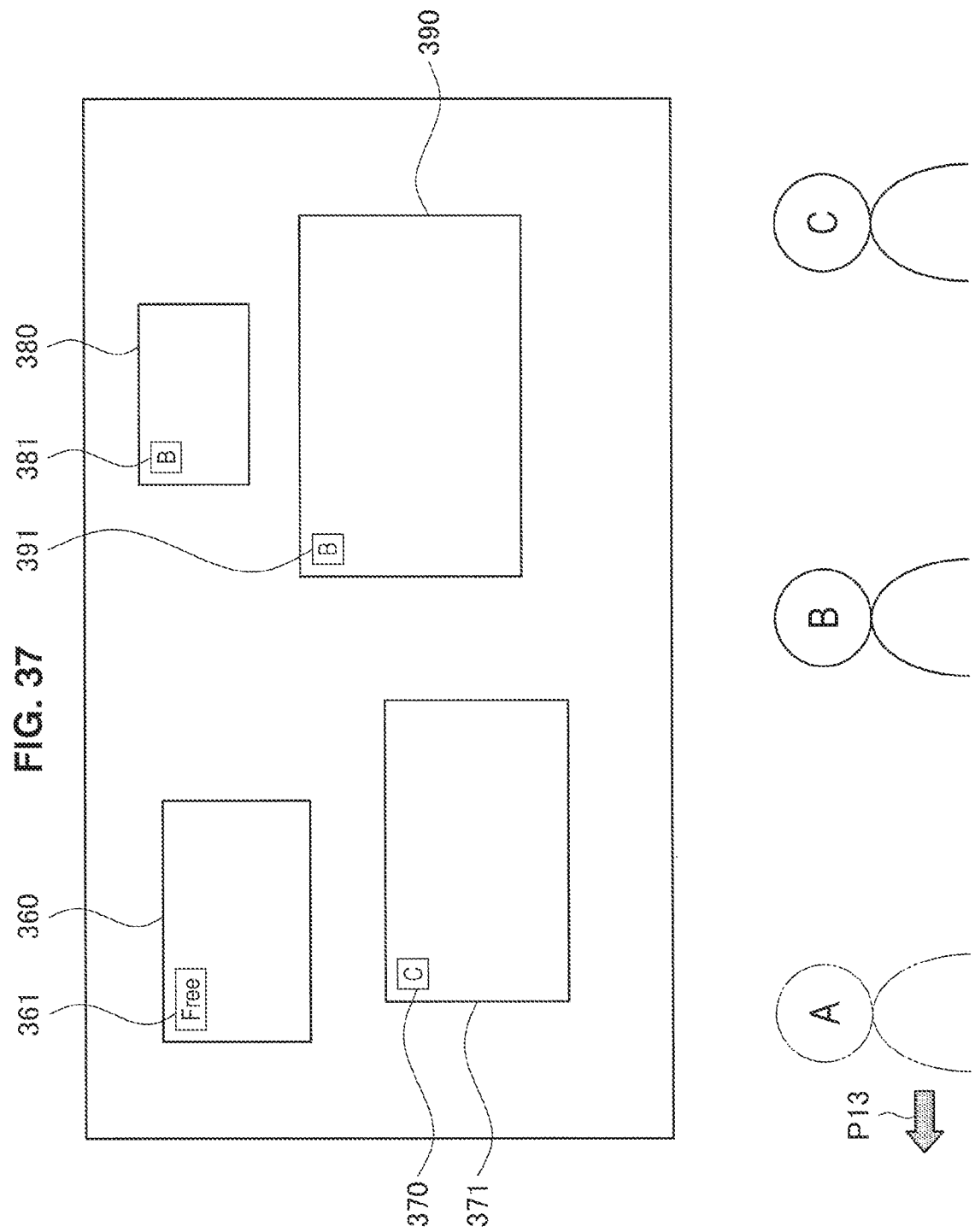

FIG. 57

| | SUBTITLES | SOUND |
|---|---|---|
| SPORTS | HMD | SMARTPHONE |
| NEWS | NONE | TV |
| DRAMA | TV | TV |

510

INFORMATION PROCESSING DEVICE AND INFORMATION PROCESSING METHOD TO COORDINATE WITH A PLURALITY OF INFORMATION PROCESSING DEVICES

TECHNICAL FIELD

The present disclosure relates to an information processing device, an information processing method, and a program.

BACKGROUND ART

Patent Literature 1 discloses a technology of setting administrative authority for each of windows. Patent Literature 2 discloses a technology of setting administrative authority for each of windows according to display positions of the windows. Patent Literature 3 discloses a technology of detecting a position of a user and deciding a display position of a window corresponding to the user based on the result of detection.

CITATION LIST

Non-Patent Literature

Patent Literature 1: JP 2006-65558A
Patent Literature 2: JP 2013-145451A
Patent Literature 3: JP 2010-26327A

SUMMARY OF INVENTION

Technical Problem

The patent literatures above, however, do not disclose a technology of coordinating a plurality of information processing devices with each other.

On the other hand, a technology of designating a display position of a window to be displayed on an information processing device using another information processing device has been demanded.

Solution to Problem

According to the present disclosure, there is provided an information processing device including: a communication unit configured to receive display position designation information indicating a display position of a window from another information processing device; and a control unit configured to perform control of displaying a window at the display position indicated by the display position designation information in a display area of a display unit.

According to the present disclosure, there is provided an information processing device including: a control unit configured to generate display position designation information indicating a display position of a window; and a communication unit configured to transmit the display position designation information to another information processing device capable of displaying the window.

According to the present disclosure, there is provided an information processing method including: receiving display position designation information indicating a display position of a window from another information processing device; and performing control of displaying a window at the display position indicated by the display position designation information in a display area of a display unit.

According to the present disclosure, there is provided a program causing a computer to realize: a communication function of receiving display position designation information indicating a display position of a window from another information processing device; and a control function of performing control of displaying a window at the display position indicated by the display position designation information in a display area of a display unit.

According to the present disclosure, an information processing device can receive display position designation information from another information processing device and display a window at a display position indicated by the display position designation information.

Advantageous Effects of Invention

According to the present disclosure described above, a display position of a window to be displayed can be designated using another information processing device. It should be noted that an effect brought on by the technology of the present disclosure is not limited to the effect described herein. The technology of the present disclosure may exhibit any effect described in the present specification or other effects.

BRIEF DESCRIPTION OF DRAWINGS

FIG. 25 is an illustrative diagram showing an example of display by a display device.

FIG. 31 is an illustrative diagram showing an example of display by a display device.

FIG. 32 is an illustrative diagram showing an example of display by a display device.

FIG. 35 is an illustrative diagram showing an example of display by a display device.

FIG. 36 is an illustrative diagram showing an example of display by a display device.

FIG. 37 is an illustrative diagram showing an example of display by a display device.

FIG. 57 is a descriptive diagram showing an example of a correspondence table.

DESCRIPTION OF EMBODIMENTS

Figure 1:
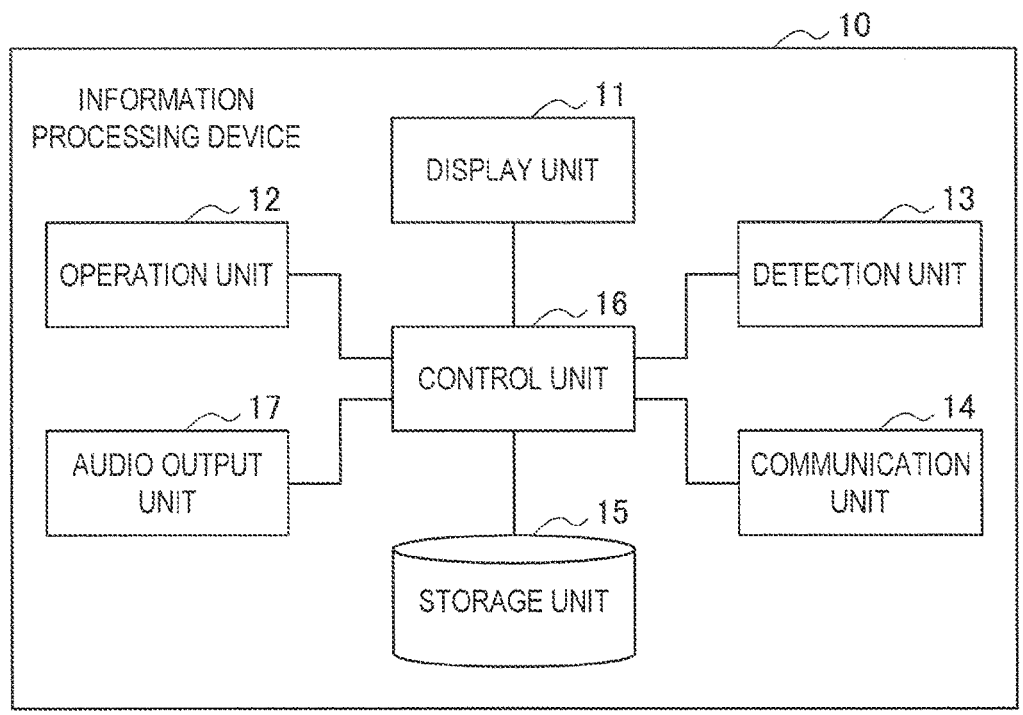
FIG. 1 is a block diagram showing a configuration of an information processing device (or another information processing device) according to a first embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

It should be noted that description will be provided in the following order.

1. First embodiment (Example of an information processing system which includes a display device and an information processing device)
   1-1. Overall configuration
   1-2. Configuration of an information processing device
   1-3. Configuration of a display device
   1-4. Process examples of an information processing system
      1-4-1. First process example
      1-4-2. Second process example
      1-4-3. Third process example
      1-4-4. Fourth process example
      1-4-5. Fifth process example
      1-4-6. Sixth process example
      1-4-7. Seventh process example
      1-4-8. Eighth process example
      1-4-9. Ninth process example
      1-4-10. Tenth process example
      1-4-11. Eleventh process example
2. Second embodiment (Example in which a head-mount display is added to the first embodiment)
   2-1. Overall configuration
   2-2. Configuration of a head-mount display
   2-3. Configurations of servers
   2-4. Process examples of an information processing system
      2-4-1. First process example
      2-4-2. Second process example
      2-4-3. Third process example
      2-4-4. Fourth process example
      2-4-5. Fifth process example
      2-4-6. Sixth process example

1. First Embodiment

1-1. Overall Configuration

First, an overall configuration of an information processing system according to a first embodiment will be described. The information processing system includes one or a plurality of information processing devices 10 and a display device 20. It should be noted that the information processing system may not have the information processing devices 10. In other words, the information processing devices 10 are not necessary in several process examples among process examples to be described below. In these cases, the information processing system may not have the information processing devices 10. When the information processing system has the plurality of information processing devices 10, these information processing devices 10 may be owned by different users.

The information processing devices 10 perform communication with the display device 20 according to an input operation by the users. Each of the information processing devices 10 is preferably an information processing device carried by a user, for example, a smartphone, a smart tablet, a mobile telephone, or the like, but is not limited thereto. In other words, the information processing devices 10 may be any type of device as long as they realize each of the process examples to be described below.

The display device 20 performs communication with the information processing devices 10, and displays various images according thereto. There are cases in which the display device 20 displays a plurality of windows. In addition, these windows can be operation targets of different users. Details thereof will be described in the process examples to be described below. Since the display device 20 displays a plurality of windows, it is preferable for resolution thereof to be high. Furthermore, the display device 20 may have high resolution and a large screen. For example, a wall of a room may be covered by the display device 20.

It should be noted that, in description below, "throw" means to cause information displayed in the information processing device 10 to be displayed on the display device 20. In addition, "catch" means to cause information displayed on the display device 20 to be displayed in the information processing device 10. Furthermore, "right" and "left" are directions based on a user's point of view.

1-2. Configuration of an Information Processing Device

Next, a configuration of the information processing device 10 according to the first embodiment will be described based on FIGS. 1 and 2. As shown in FIG. 1, the information processing device 10 includes a display unit 11, an operation unit 12, a detection unit 13, a communication unit 14, a storage unit 15, a control unit 16, and an audio output unit 17.

The display unit 11 displays various images under control of the control unit 16. The operation unit 12 receives input operations by a user. The operation unit 12 outputs input operation information to the control unit 16. The detection unit 13 detects an attitude and the like of the information processing device 10, and outputs detection information regarding the result of the detection to the control unit 16. The communication unit 14 performs communication with the display device 20, and outputs information obtained therefrom to the control unit 16. The communication unit 14 may perform communication with another information processing device via a network. The storage unit 15 stores various kinds of information, for example, a program for causing the information processing device 10 to realize the display unit 11, the operation unit 12, the detection unit 13, the communication unit 14, the storage unit 15, and the control unit 16, various kinds of image information, and the like. The control unit 16 not only controls the entire information processing device 10 but also performs processes to be introduced in each of the process examples to be described below. The audio output unit 17 outputs audio information under control of the control unit 16.

Figure 2:
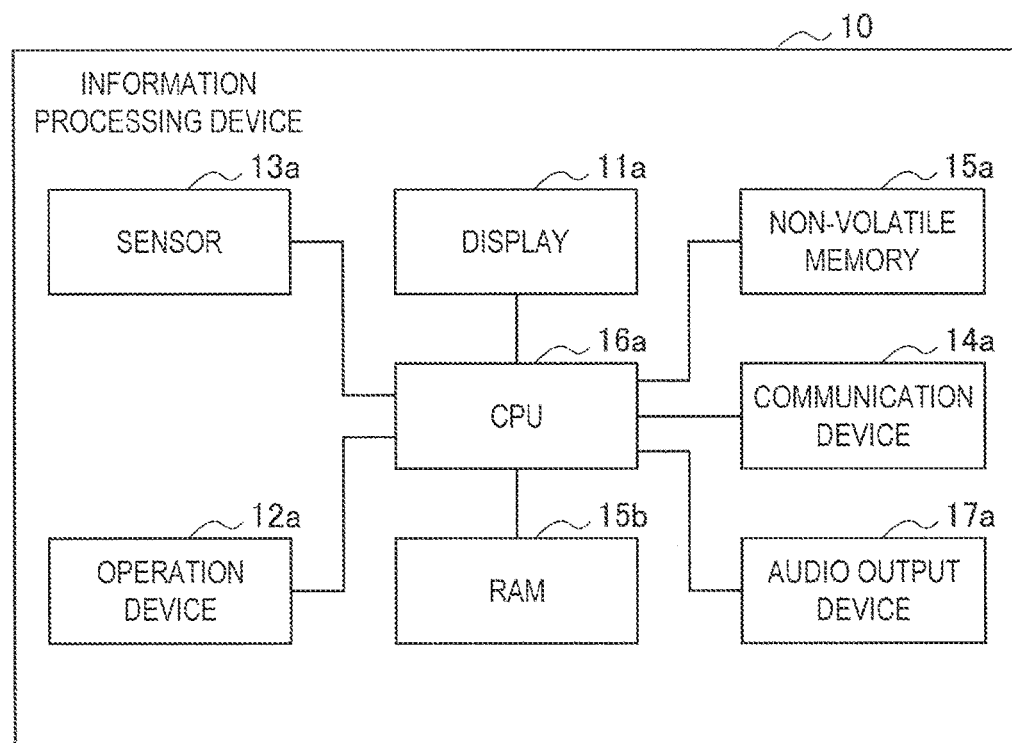
FIG. 2 is a hardware configuration diagram of the information processing device according to the same embodiment.

The information processing device 10 has hardware configurations shown in FIG. 2, and these hardware configurations help to realize the above-described display unit 11, operation unit 12, detection unit 13, communication unit 14, storage unit 15, control unit 16, and audio output unit 17.

In other words, the information processing device 10 includes, as the hardware configurations, a display 11a, an operation device 12a, a sensor 13a, a communication device 14a, a non-volatile memory 15a, a RAM 15b, a CPU 16a, and an audio output device 17a.

The display 11a displays various kinds of image information. The operation device 12a receives input operations from a user. The operation device 12a is preferably a touch panel, but may be a hard key or the like. The sensor 13a detects an attitude of the information processing device 10 and the like. As a specific example of the sensor 13a, for example, a gyro sensor, an acceleration sensor, or the like is exemplified.

The communication device 14a performs communication with the display device 20. The non-volatile memory 15a stores various programs, image information, and the like. Here, the programs include the program for causing the information processing device 10 to realize the display unit 11, the operation unit 12, the detection unit 13, the communication unit 14, the storage unit 15, the control unit 16, and the audio output unit 17. The RAM 15b serves as a work area of the CPU 16a. The CPU 16a reads out programs stored in the non-volatile memory 15a to execute the programs. Thus, as the CPU 16a reads out the programs stored in the non-volatile memory 15a to execute the programs, the display unit 11, the operation unit 12, the detection unit 13, the communication unit 14, the storage unit 15, and the control unit 16 are realized. In other words, the CPU 15a can serve as a substantial operation subject of the information processing device 10. The audio output device 17a is a device which outputs audio information, and is, for example, a speaker and a headphone.

1-3. Configuration of a Display Device

Figure 3:
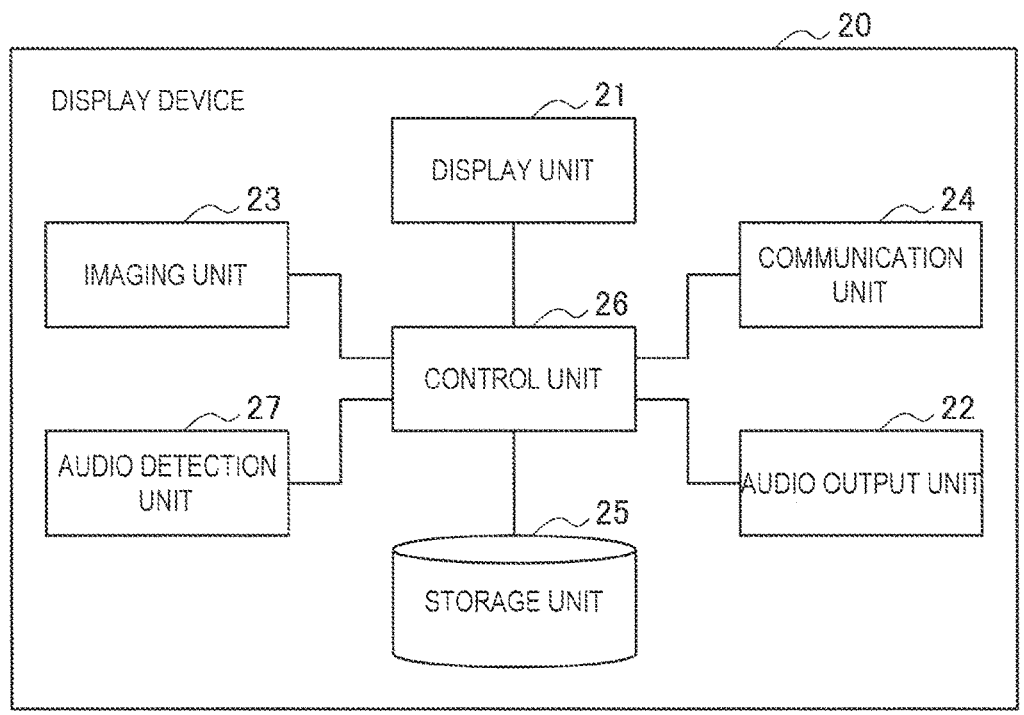
FIG. 3 is a block diagram showing a configuration of a display device (an information processing device) according to the same embodiment.

Next, a configuration of the display device 20 according to the first embodiment will be described based on FIGS. 3 and 4. As shown in FIG. 3, the display device 20 includes a display unit 21, an audio output unit 22, an imaging unit 23 (detection unit), a communication unit 24, a storage unit 25, a control unit 26, and an audio detection unit 27.

The display unit 21 displays various images under control of the control unit 26. The audio output unit 22 outputs audio information. Here, there are cases in which the audio output unit 22 outputs audio information having directivity. The imaging unit 23 images a user viewing the display device 20, or the like, and outputs a captured image obtained therefrom to the control unit 26. The communication unit 24 performs communication with the information processing device 10, and outputs information obtained therefrom to the control unit 26. The communication unit 24 may perform communication with another information processing device via a network. The storage unit 25 stores various kinds of information, for example, a program for causing the display device 20 to realize the display unit 21, the audio output unit 22, the imaging unit 23, the communication unit 24, the storage unit 25, the control unit 26, and the audio detection unit 27, various kinds of image information, and the like. The control unit 26 not only controls the overall display device 20 but also performs processes to be introduced in each of the process examples to be described below. The audio detection unit 27 detects audio information, for example, a voice of a user, and outputs it to the control unit 26.

Figure 4:
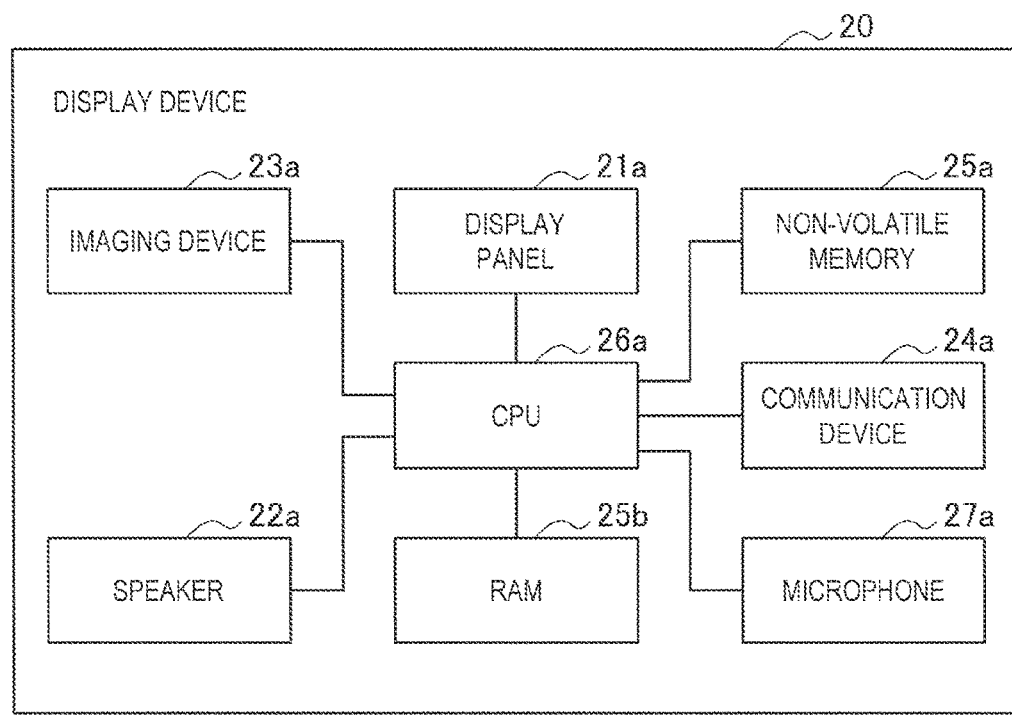
FIG. 4 is a hardware configuration diagram of the display device according to the same embodiment.

The display device 20 has hardware configurations shown in FIG. 4, and these hardware configurations help to realize the above-described display unit 21, audio output unit 22, imaging unit 23, communication unit 24, storage unit 25, control unit 26, and audio detection unit 27.

In other words, the display device 20 includes, as the hardware configurations, a display panel 21a, a speaker 22a, an imaging device 23a, a communication device 24a, a non-volatile memory 25a, a RAM 25b, a CPU 26a, and a microphone 27a.

The display panel 21a displays various kinds of image information. The speaker 22a outputs audio information. There are cases in which the speaker 22a outputs audio information having directivity. The imaging device 23a performs imaging and thereby generates captured images.

The communication device 24a performs communication with the information processing devices 10. The non-volatile memory 25a stores various programs, image information, and the like. Here, the programs include the program for causing the display device 20 to realize the display unit 21, the audio output unit 22, the imaging unit 23, the communication unit 24, the storage unit 25, the control unit 26, and the audio detection unit 27. The RAM 25b serves as a work area of the CPU 26a. The CPU 26a reads out programs stored in the non-volatile memory 25a to execute the programs. Thus, as the CPU 26a reads out the programs stored in the non-volatile memory 25a to execute the programs, the display unit 21, the audio output unit 22, the imaging unit 23, the communication unit 24, the storage unit 25, and the control unit 26 are realized. In other words, the CPU 25a can serve as a substantial operation subject of the display device 20. The microphone 27a detects audio information. It should be noted that a set-top box which is formed as a different body from the display device 20 may be prepared and the control unit 26 may be realized by this set-top box. In this case, the set-top box has a hardware configuration necessary for realizing the control unit 26 (and a communication unit which communicates with the display device 20). In addition, the control unit 26 may be realized by (some of) the information processing devices 10. In addition, an information processing server which can at least communicate with the display device 20 via a network may be prepared, and the control unit 26 may be realized by this information processing server. In this case, the information processing server has a hardware configuration necessary for realizing the control unit 26 (and a communication unit which communicates with the display device 20).

1-4. Process Examples of an Information Processing System

Hereinbelow, process examples of the information processing system will be described. It should be noted that, in description below, each information processing device 10 is assumed to be a so-called smartphone. Thus, the above-described operation unit 12 is realized as a so-called touch panel.

1-4-1. First Process Example

Next, a first process example of the information processing system will be described. In the first process example, a user performs a throw operation to cause information displayed in the information processing device 10 to be displayed on the display device 20. The information processing device 10 mirror-displays information being displayed by the display device 20.

Detailed content of the first process example will be described based on FIGS. 5, 6, and 14 to 18. The information processing device 10 performs a process according to the flowchart shown in FIG. 5, and the display device 20 performs a process according to the flowchart shown in FIG. 6.

(Process by an Information Processing Device)

In Step S10, while causing the display unit 11 to display image information, the control unit 16 stands by until a user performs a throw operation. Here, the image information is image information to be displayed by the display device 20, i.e., throw image information. When the throw operation is performed, the operation unit 12 outputs throw operation information to the control unit 16. When the throw operation information has been given, i.e., the throw operation has been detected, the control unit 16 proceeds to Step S20.

Figure 14:
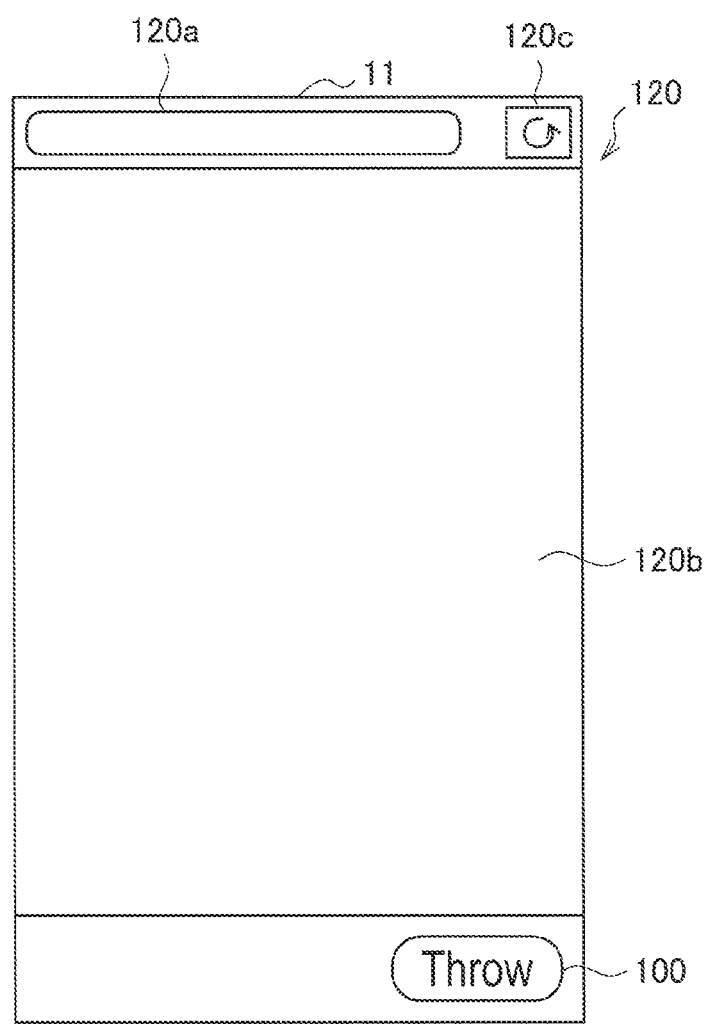
FIG. 14 is an illustrative diagram showing an example of display by an information processing device.
Figure 15:
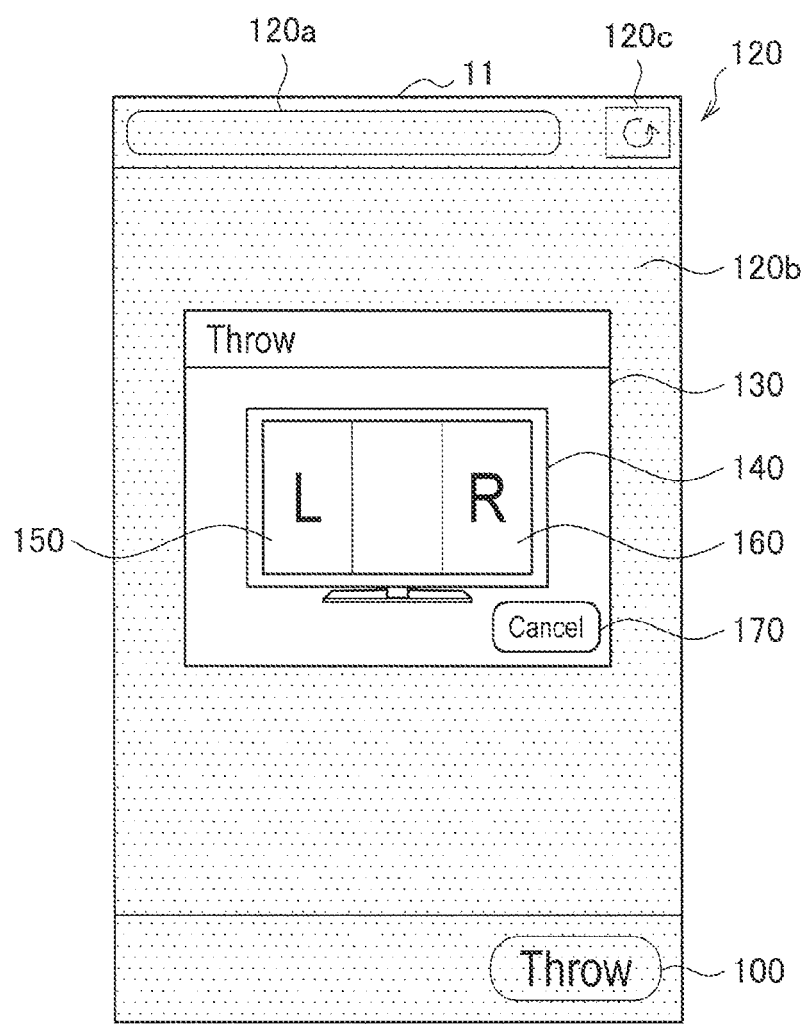
FIG. 15 is an illustrative diagram showing an example of display by an information processing device.

An example of the display will be shown in FIG. 14. In this example, the control unit 16 not only displays a web page as the throw image information, but also displays a throw button 100. Specifically, the control unit 16 displays the throw button 100 and a throw image display window 120. The throw button 100 is a button for a user to perform a throw operation. In other words, by tapping the throw button 100, a user performs a throw operation. It should be noted that a throw operation is not limited to this example. For example, any type of gesture operation (for example, an operation of flicking the display unit 11 from a lower end to an upper end) may be set to a throw operation. In this case, the throw button 100 may or may not be displayed. The throw image information is displayed in the throw image display window 120. Specifically, address image information 120a, a web page 120b, and an updating button 120c are displayed in the throw image display window 120. The address image information 120a indicates the address of the web page 120b being displayed. The updating button 120c is a button for updating the web page 120b to latest information, and thus, when the user taps the updating button 120c, the control unit 16 acquires a latest web page 120b, and causes the page to be displayed on the throw image display window 120. Of course, the control unit 16 may cause an image other than a web page to be displayed along with the throw button 100.

From Step S20, the control unit 16 outputs throw request information indicating that it desires to cause the display device 20 to display information being displayed by the information processing device 10 to the communication unit 14. The communication unit 14 transmits the throw request information to the display device 20. Accordingly, the display device 20 transmits displayable area information regarding a display area in which the throw image information is displayable (display position), i.e., a displayable area, to the information processing device 10. Details thereof will be described below.

In Step S30, the communication unit 14 receives the displayable area information and outputs the information to the control unit 16.

In Step S40, the control unit 16 generates a display area selection dialog based on the displayable area information, and displays the display area dialog on the display unit 11. The display area dialog is a dialog for allowing the user to select a display area of a window. A window is displayed in a display area selected by the user, and the information being displayed by the information processing device 10 is displayed within this window. An example of the display will be shown in FIG. 15. In this example, the control unit 16 grays the throw button 100, the address image information 120a, the web page 120b, and the updating button 120c out, and displays the display area dialog 130.

The display area dialog 130 includes a display device image 140, display area selection buttons 150 and 160, and a cancel button 170. The display device image 140 is a deformed image display of the display device 20. The display area selection buttons 150 and 160 are buttons for allowing the user to select a display area, and are displayed in a portion corresponding to the displayable area in the display device image 140. In other words, the display area selection buttons 150 and 160 indicate displayable areas. In this example, the left and right ends of the display unit 21 are displayable areas. The display area selection button 150 indicates the displayable area at the left end, and the display area selection button 160 indicates the displayable area at the right end. Thus, when the upper and lower ends of the display unit 21 are set to be displayable areas, for example, the display area selection buttons are displayed at the upper and lower ends of the display device image 140.

A display area dialog is not limited to this example. A display area dialog may display, for example, text information indicating positions of displayable areas in the form of a list. In this case, each row of the list is a display area selection button.

In Step S50, the control unit 16 stands by until the user performs a display area selection operation, i.e., an operation of selecting a table area. When the display area selection operation has been performed, the operation unit 12 outputs display area selection operation information to the control unit 16. When the display area selection operation information has been given, i.e., when the display area selection operation has been detected, the control unit 16 proceeds to Step S60. Here, as the display area selection operation, for example, an operation of tapping the display area selection button described above or the like is exemplified.

In Step S60, the control unit 16 recognizes a display area selected by the user based on the display area selection operation. Then, the control unit 16 generates selected area information regarding the display area selected by the user (display position designation information). The control unit 16 outputs the selected area information to the communication unit 14. The communication unit 14 transmits the selected area information to the display device 20. Accordingly, the display device 20 displays a window in the displayable area indicated by the selected area information.

In Step S70, the control unit 16 outputs the image information being displayed on the display unit 11, i.e., the throw image information to the communication unit 14, and the communication unit 14 transmits the throw image information to the display device 20 in streaming. The display device 20 receives the throw image information transmitted in streaming, and displays the throw image information within a throw image display window. It should be noted that a transmission form is not limited to this example. On the other hand, the control unit 16 also causes the display unit 11 to display the throw image information being transmitted in streaming. In other words, the control unit 16 causes the display unit 11 to mirror-display the throw image information to be displayed on the display device 20.

Figure 16:
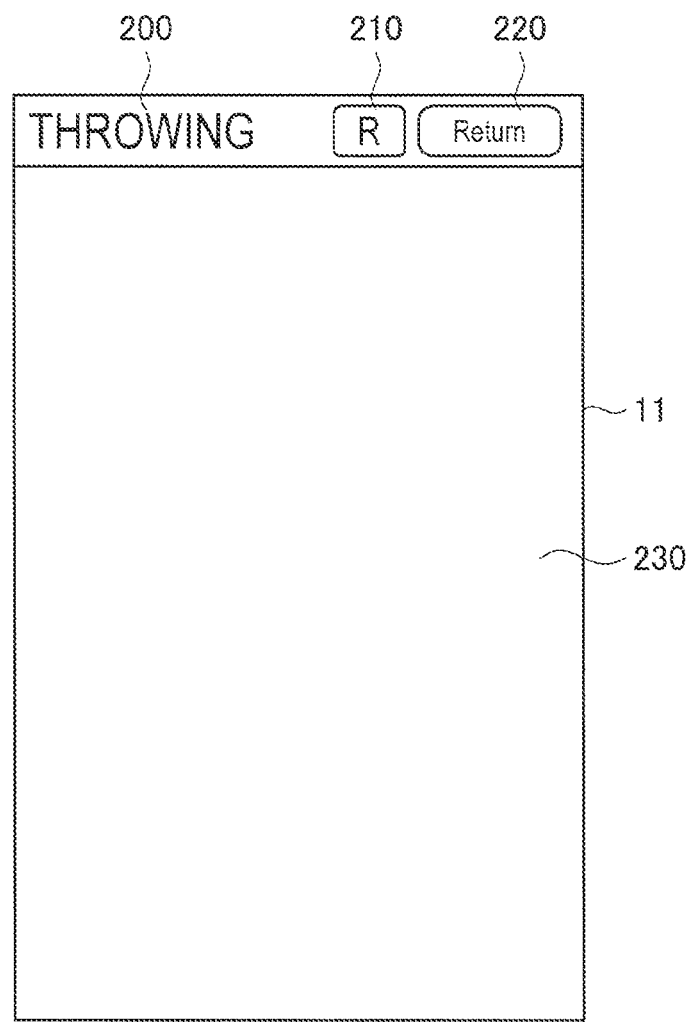
FIG. 16 is an illustrative diagram showing an example of display by an information processing device.

An example of the display is shown in FIG. 16. This example of the display is displayed when a display area at the left end is selected in the example of the display of Step S40. In other words, the control unit 16 causes an indicator 200, a display area switching button 210, a return button 220, and a window 230 to be displayed. The indicator 200 is text information indicating that a throw is in progress. The display area switching button 210 is a button for switching a display area of throw image information. Display area switching buttons 210 equal in number to displayable areas may be displayed. In this example, the displayable area switching button 210 indicates a displayable area at the right end. When the user taps the display area switching button 210, the control unit 16 outputs switch request information indicating the operation to the communication unit 14. The communication unit 14 transmits the switch request information to the display device 20. The display device 20 switches a display area of a window based on the switch request information. The return button 220 is a button for terminating streaming transmission to the display device 20. Throw image information being transmitted in streaming is displayed in the window 230. For example, the web page described above is displayed.

In Step S80, the control unit 16 determines whether or not the user has performed an operation of termination. For example, the control unit 16 may determine tapping of the return button 220 to be an operation of termination. In addition, the control unit 16 may determine any type of gesture operation to be an operation of termination. When an operation of termination has been performed, the operation unit 12 outputs termination operation information to the control unit 16. When the termination operation information has been given, i.e., an operation of termination has been detected, the control unit 16 proceeds to Step S90, and when an operation of termination has not been detected, the control unit returns to Step S70.

In Step S90, the control unit 16 performs a disconnecting process. For example, the control unit 16 outputs termination notification information indicating termination of the streaming transmission to the communication unit 14. The communication unit 14 transmits the termination notification information to the display device 20. Then, the control unit 16 disconnects communication with the display device 20.

(Process by a Display Device)

Figure 17:
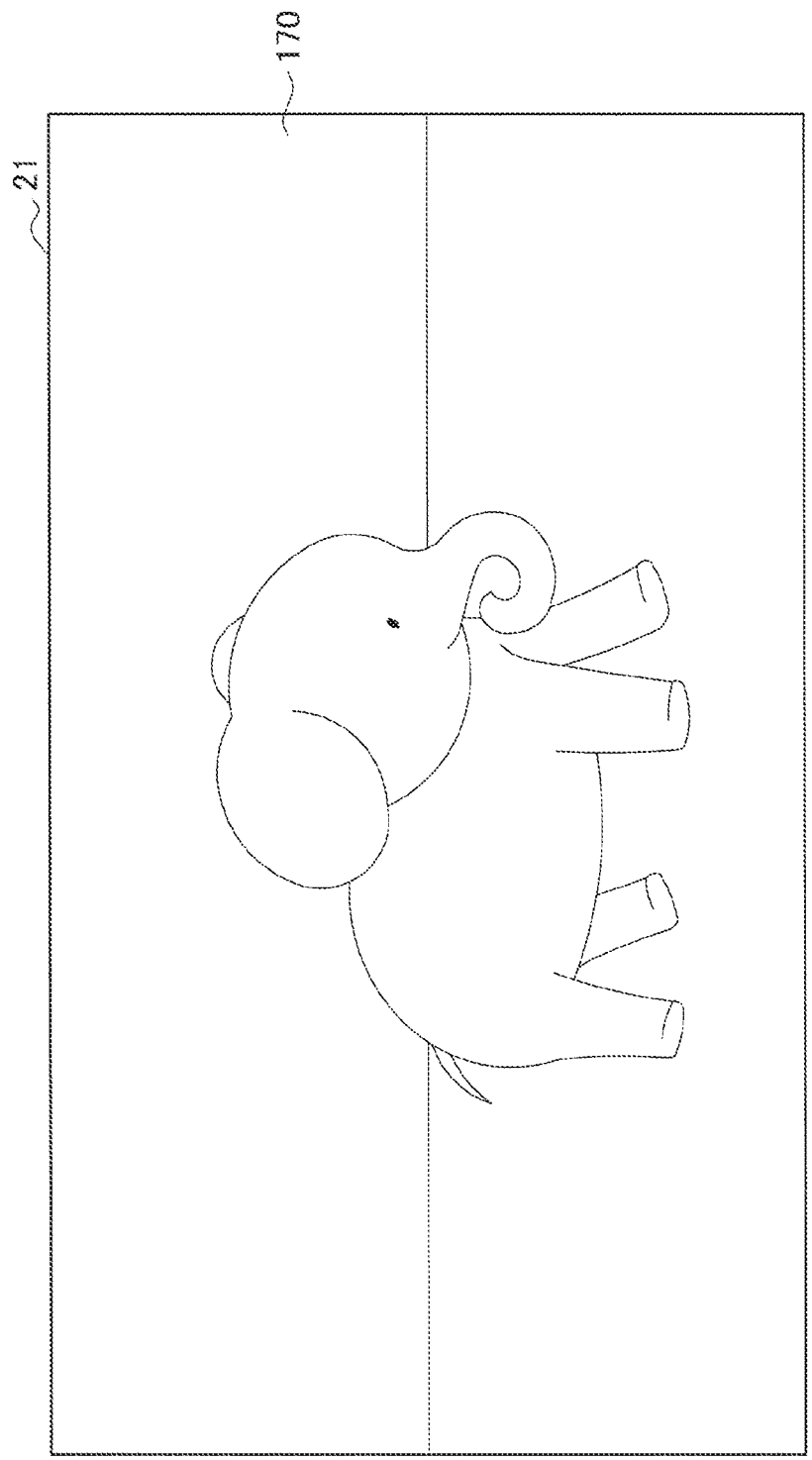
FIG. 17 is an illustrative diagram showing an example of display by a display device.

In Step S100, the communication unit 24 of the display device 20 receives the throw request information and outputs the information to the control unit 26. It should be noted that the control unit 26 may cause the display unit 21 to display any image information (hereinafter referred to also as "base image information") during stand-by for the throw request information. An example of the display is shown in FIG. 17. In this example, the control unit 16 causes the display unit 21 to display image information 170 as the base image information.

In Step S110, the control unit 26 decides a window displayable area. There is no particular restriction on a method for deciding a window displayable area. A displayable area may be set in advance or a user may arbitrarily set an area.

In Step S120, the control unit 26 generates displayable area information regarding the displayable area and outputs the information to the communication unit 24. The communication unit 24 transmits the displayable area information to the information processing device 10.

In Step S130, the communication unit 24 receives selected area information, and outputs the information to the control unit 26.

In Step S140, the control unit 26 opens a new window, i.e., a throw image display window, in the displayable area indicated by the selected area information.

In Step S150, the communication unit 24 receives the throw image information in streaming and outputs the information to the control unit 26.

In Step S160, the control unit 26 causes the throw image information to be displayed in the throw image display window.

Figure 18:
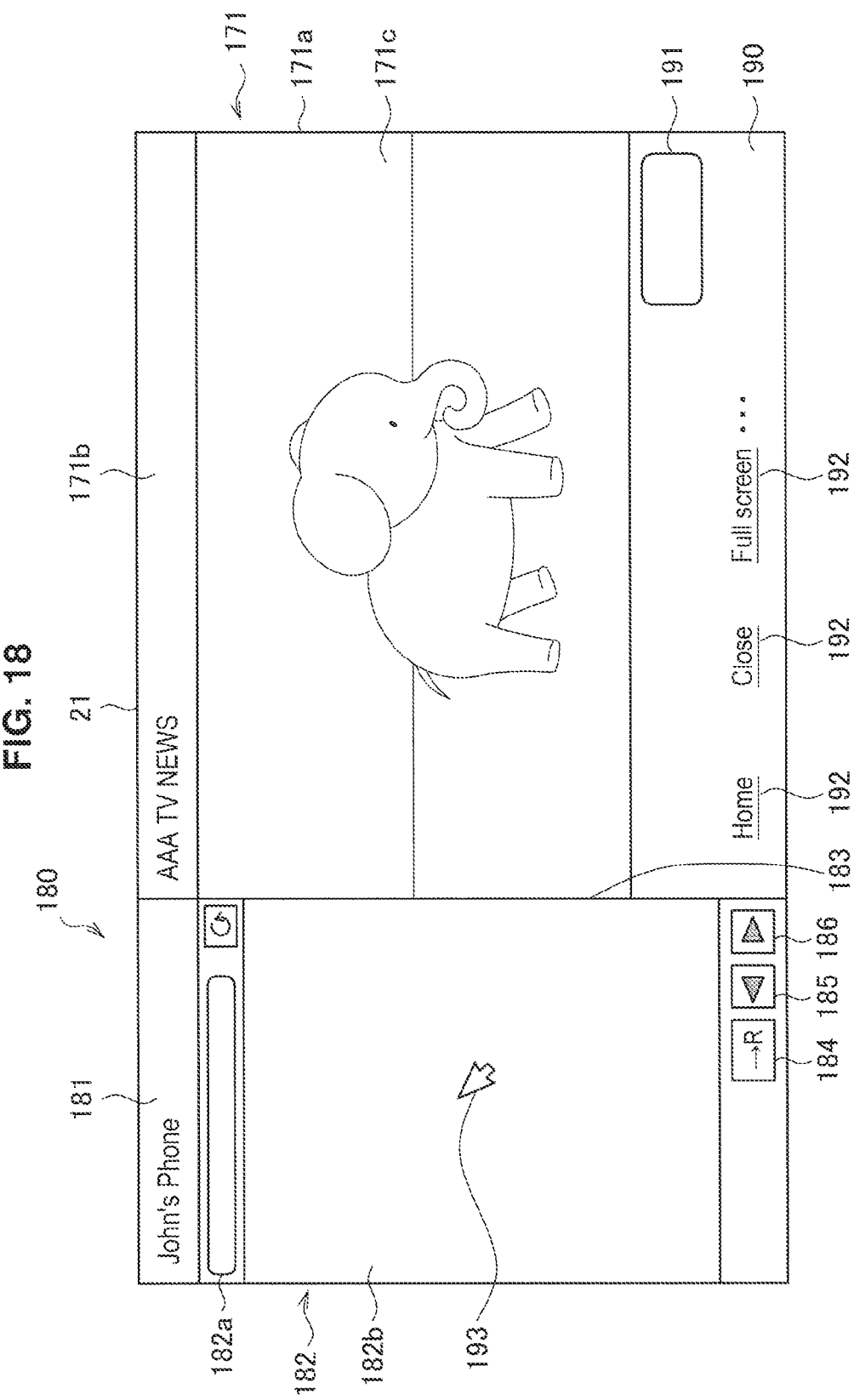
FIG. 18 is an illustrative diagram showing an example of display by a display device.

An example of the display is shown in FIG. 18. This example of the display is displayed when the display area at the left end is selected in the example of display of Step S40. In other words, the control unit 26 causes a base image display window 171, a throw image display window 180, a various information display window 190, and a cursor 193 to be displayed.

The base image display window 171 includes a base image display area 171a and a base image indicator 171b. In the base image display area 171a, base image information 171c is displayed. The indicator 171b indicates information for identifying the base image information such as the title of the base image information or the like. Here, an aspect ratio of the base image display area 171a coincides with an aspect ratio of the display unit 21. In other words, the control unit 16 reduces the display area of the base image information to the right to display the throw image display window 180 in an unoccupied display area. In addition, since the aspect ratio of the base image display area 171a coincides with the aspect ratio of the display unit 21, the display area on the lower side of the base image display area 171a is vacant. Thus, the control unit 26 causes the various information display window 190 to be displayed in the vacant display area. Of course, the aspect ratio of the base image display area 171a may be different from the aspect ratio of the display unit 21.

The throw image display window 180 is a window for displaying a throw image. The throw image display window 180 includes an indicator 181, a throw image display area 182, a display area switching button 184, a reduction button 185, an enlargement button 186, and the cursor 193.

The indicator 181 indicates information for identifying the information processing device 10 which is transmitting the throw image information to the display device 20 in streaming, for example, the name of the possessor of the information processing device 10. In the throw image display area 182, throw image information is displayed. In this example, address image information 182a and a web page 182b are displayed in the throw image display area 182. The address image information 182a indicates the address of the web page 182b.

The display area switching button 184 is a button for switching a display area of a throw image, i.e., a display area of the throw image display window. Display area switching buttons 184 equal in number to displayable areas may be displayed. In this example, the displayable area switching button 210 indicates a displayable area at the right end. The reduction button 185 is a button for reducing the throw image display window. The enlargement button 186 is a button for enlarging the throw image display button.

In the various information display window 190, information regarding base image information and throw image information, and the like are displayed. Specifically, in the various information display window 190, advertisement information 191 and operation buttons 192 are included. The advertisement information 191 is arbitrary advertisement information, but for example, may be advertisement information relating to the throw image information or the base image information. The operation buttons 192 are buttons for the user to perform various operations. The operation buttons 192 may include a user interface for performing audio input and the like.

The cursor 193 moves according to input operations of the user. Here, an input operation for moving the cursor 193 may be performed using a remote controller for the display device 20. It should be noted that, in the second process example to be described below, movements of the cursor and the like are performed using the information processing device 10.

In other words, the control unit 26 causes the cursor 193 to move and the like based on operation information given from the remote controller. Then, when the user has pressed the display area switching button 184, the control unit 26 moves the display area of the throw image display window 180 to the right end. Here, as an operation of pressing the display area switching button 184, an operation of pressing a decision button of the remote controller with the cursor 193 staying on the display area switching button 184 or the like is exemplified. Operations of selecting the reduction button 185, the enlargement button 186, and the operation buttons 192 are also performed in the same manner.

In addition, when the user has pressed the reduction button 185, the control unit 26 reduces the throw image display window 180. Specifically, the control unit 26 shifts a boundary line 183 between the throw image display window 180 and the base image display window 171 to the left.

In addition, when the user has pressed the enlargement button 186, the control unit 26 enlarges the throw image display window 180. Specifically, the control unit 26 shifts the boundary line 183 between the throw image display window 180 and the base image display window 171 to the right.

In addition, when the user has pressed an operation button 192, the control unit 26 performs a process according to the type of the operation button 192. For example, when a "Full screen" button has been pressed, the control unit 26 causes throw image information to be displayed in a full screen. When a "Close" button has been pressed, the control unit 26 closes the throw image display window. In addition, when a "Home" button has been pressed, the control unit 26 causes a predetermined initial image to be displayed as a base image. Types of the operation buttons 192 are not limited to the above.

In addition, when switching request information is given, the control unit 26 moves the display area of the throw image display window to the display area indicated by the switching request information.

In Step S170, the control unit 26 determines whether or not termination notification information has been received. When termination notification information is determined to have been received, the control unit 26 proceeds to Step S180, and when termination notification information is determined not to have been received, the control unit proceeds to Step S140. In Step S180, the control unit 26 performs a disconnection process. For example, the control unit 26 disconnects communication with the information processing device 10.

Here, in the first process example, only one information processing device 10 is shown, but there may be a plurality of information processing devices 10. In other words, a plurality of users may cause image information of their information processing devices 10 to be displayed on the display device 20.

According to the first process example, the information processing device 10 can designate a display position of a window displayed on the display device 20, i.e., the throw image display window. Thus, the user can easily cause a window to be displayed at his or her desired position within the display unit 21 using his or her information processing device 10.

In addition, since the display device 20 transmits information regarding a displayable position of the throw image display window to the information processing device 10, the information processing device 10 can display, for example, the display area selection dialog. Thus, the user can select his or her desired display area more easily.

1-4-2. Second Process Example

Next, the second process example will be described based on FIGS. 7 and 8. The second process example is an example in which the information processing device 10 is used as a remote controller.

(Process by the Information Processing Device)

Figure 5:
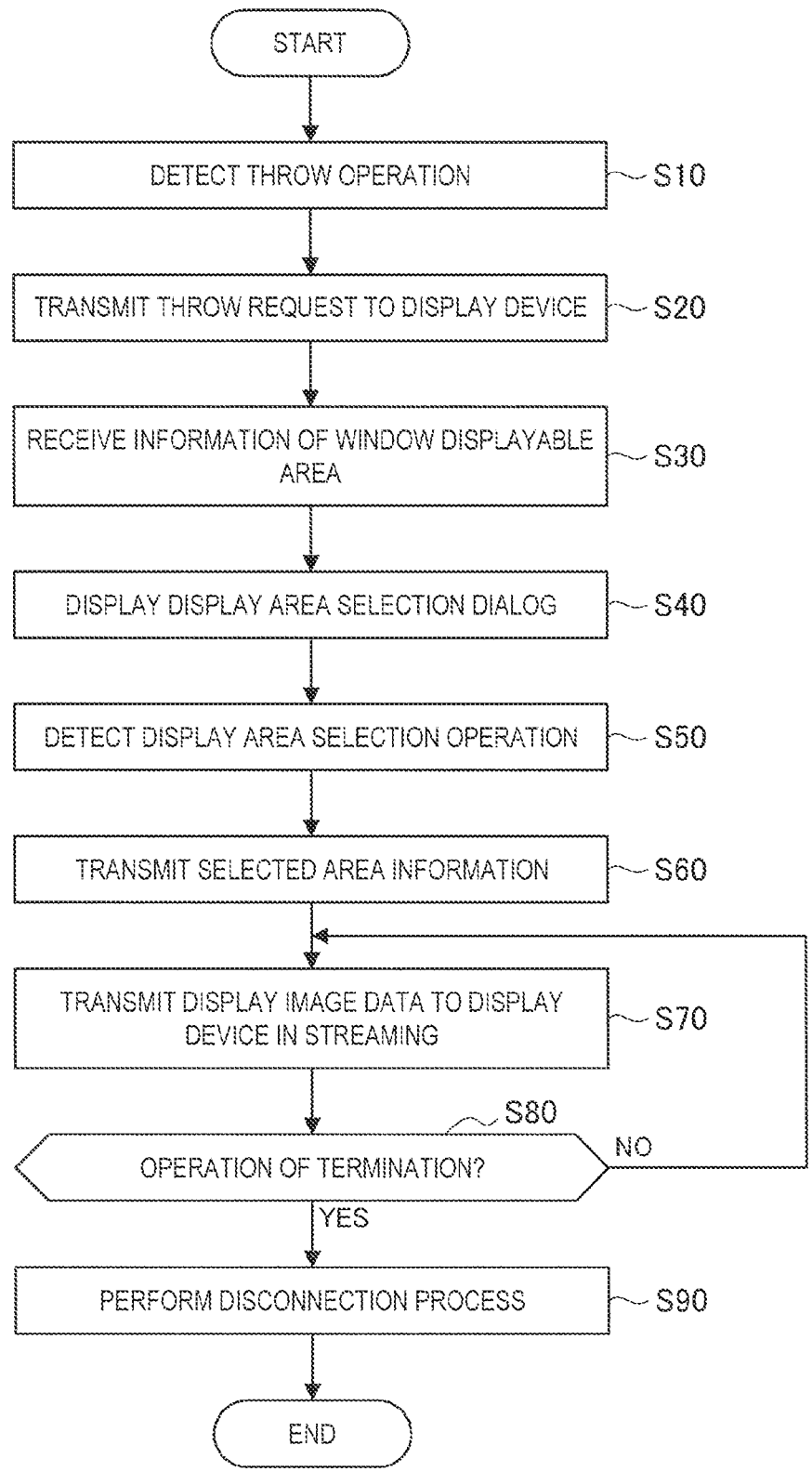
FIG. 5 is a flowchart showing the procedure of a process by an information processing system.
Figure 7:
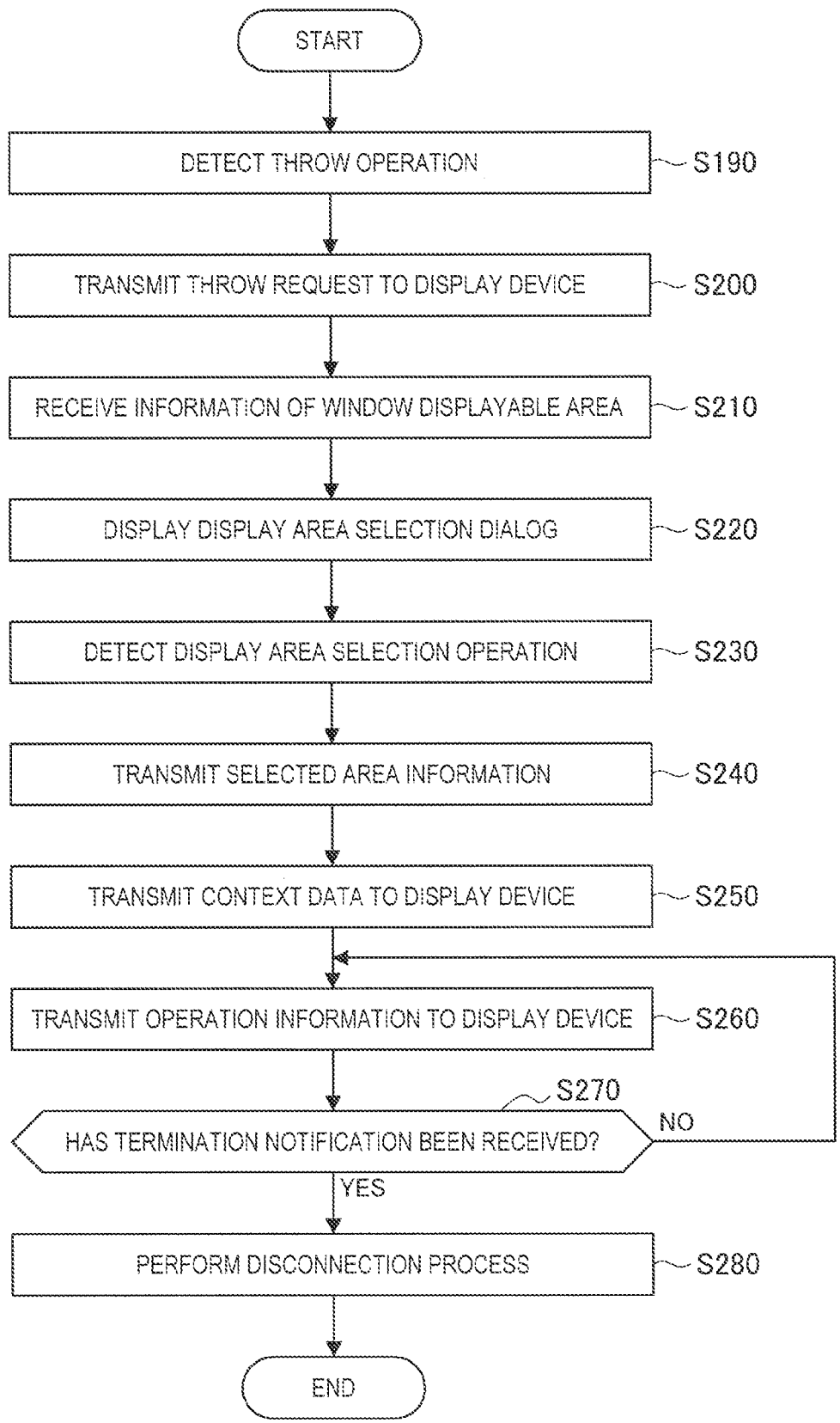
FIG. 7 is a flowchart showing the procedure of a process by an information processing system.

In Steps S190 to S240 shown in FIG. 7, the information processing device 10 performs the same processes as in Steps S10 to S60 shown in FIG. 5.

In Step S250, the control unit 16 generates context information. Here, the context information includes information regarding throw image information and the like. For example, the context information includes information regarding an application being executed in the information processing device 10 (an application ID or the like), a location of throw image information (for example, a URL), a current display state of the throw image information (a display position, a reproduction position, or the like), an operation history, and the like.

In Step S260, the control unit 16 receives an input operation from the user. This input operation includes an input operation performed by the user with respect to the throw image information displayed in a window of the display device 20. As the input operation, an operation using a touch panel, an operation of moving the information processing device 10 itself (hereinafter referred to also as a "remote pointing operation"), and the like are exemplified. As the operation using a touch panel, for example, a dragging operation, a tapping operation, pinch-in and pinch-out operations, and the like are exemplified.

Specifically, the control unit 16 recognizes an input operation performed by the user based on detection information given from the detection unit 13 and operation information given from the operation unit 12. Then, the control unit 16 outputs remote operation information regarding the recognized input operation to the communication unit 14, and the communication unit 14 transmits the remote operation information to the display device 20. The display device 20 performs a process based on the remote operation information. Details thereof will be described below.

In Step S270, the control unit 16 determines whether or not termination notification information has been received. When termination notification information is determined to have been received, the control unit 16 proceeds to Step S280, and when termination notification information is determined not to have been received, the control unit proceeds to Step S260. In Step S280, the control unit 16 performs a disconnection process. For example, the control unit 16 disconnects communication with the display device 20.

(Process by the Display Device)

Figure 6:
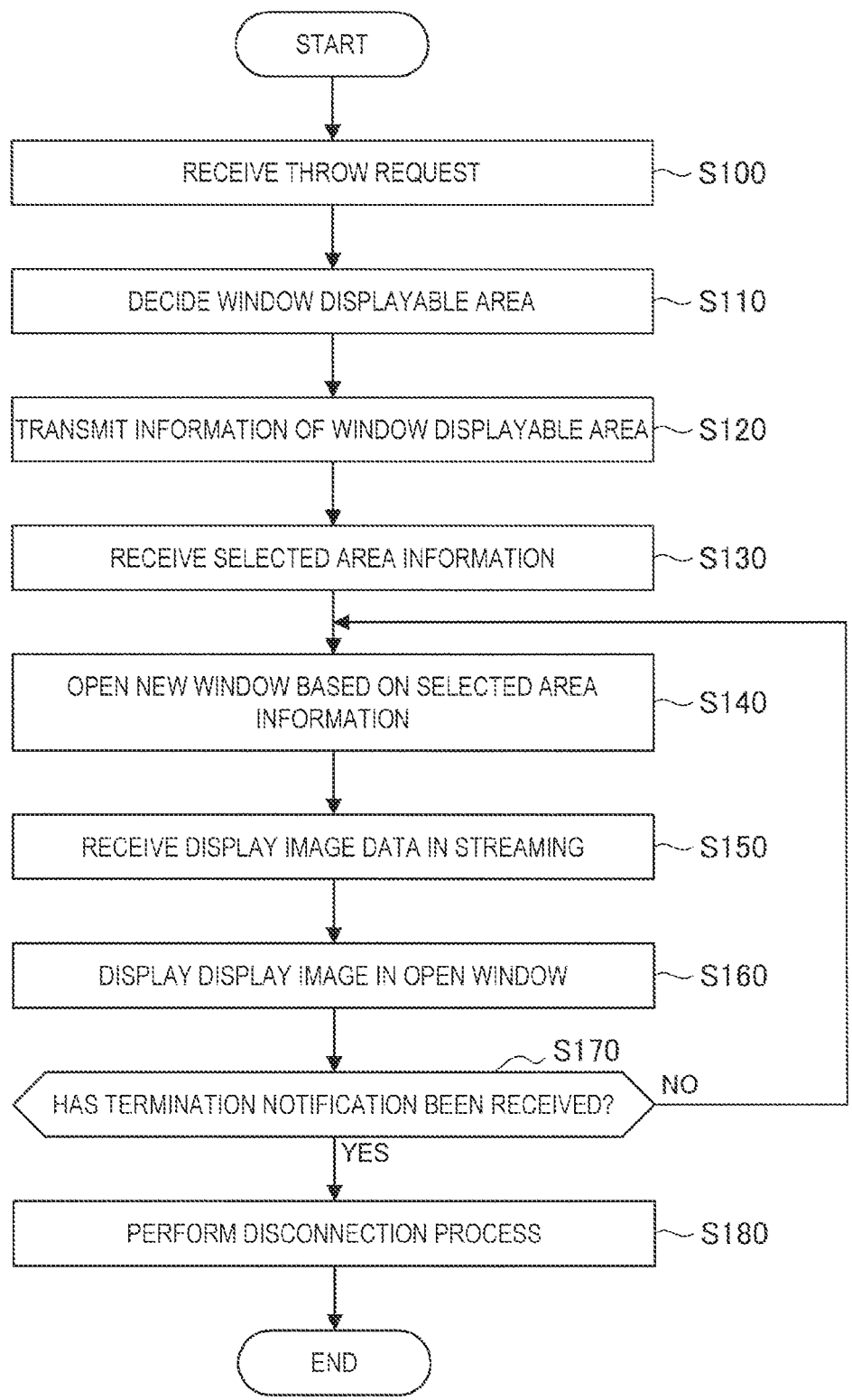
FIG. 6 is a flowchart showing the procedure of a process by an information processing system.
Figure 8:
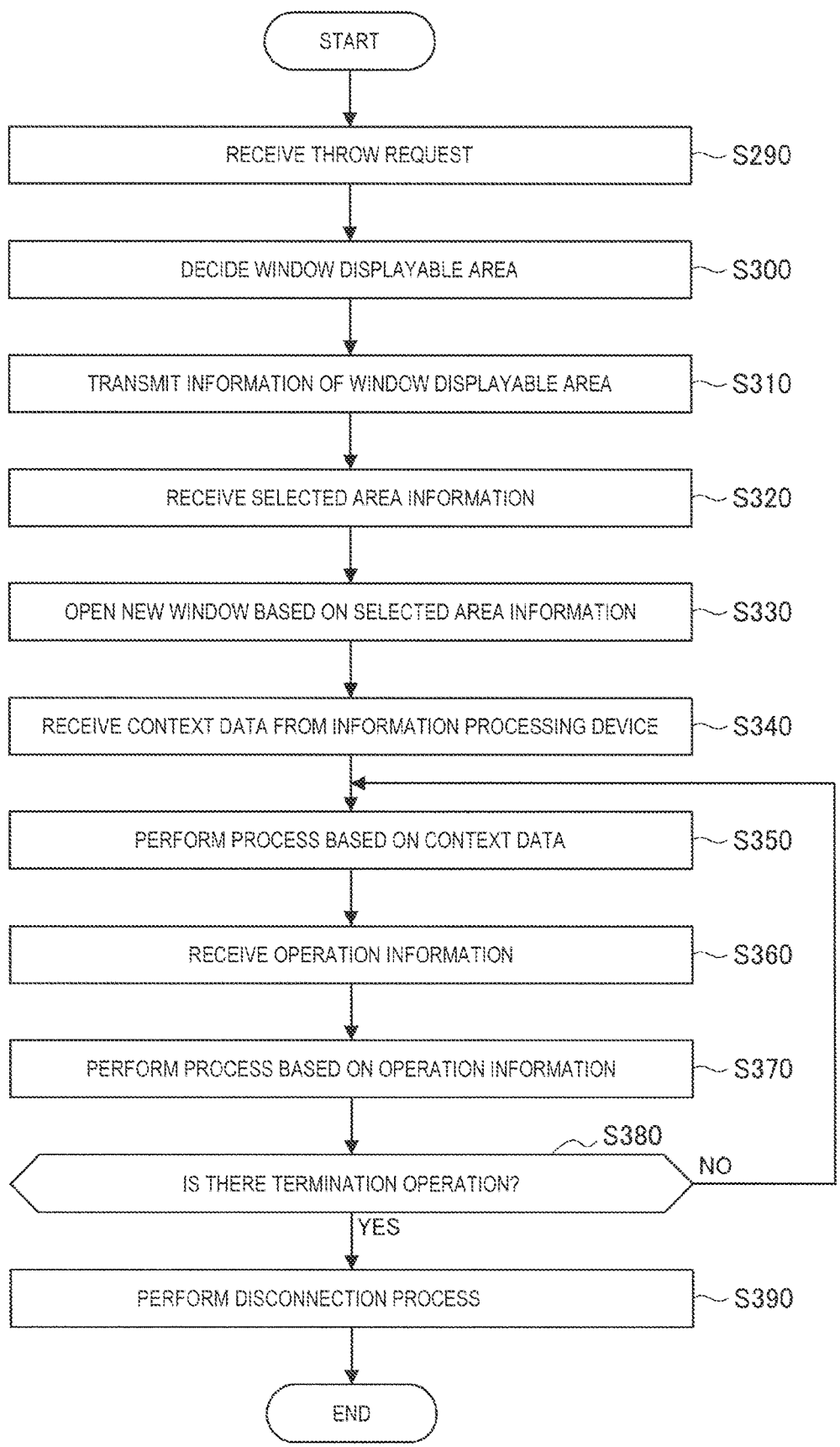
FIG. 8 is a flowchart showing the procedure of a process by an information processing system.

In Steps S290 to S330 shown in FIG. 8, the display device 20 performs the same processes as in Steps S100 to S140 shown in FIG. 6.

In Step S340, the communication unit 24 receives the context information and outputs the information to the control unit 26.

In Step S350, the control unit 26 performs a process based on the context information. Specifically, the control unit 26 executes an application indicated by the context information, and acquires throw image information from the location indicated by the context information. Then, the control unit 26 causes the throw image information to be displayed in the throw image display window.

Step S360, the communication unit 24 receives the remote operation information, and outputs the information to the control unit 26.

In Step S370, the control unit 26 performs a process based on the remote operation information. For example, the control unit 26 causes the throw image information to be scrolled based on a dragging operation. In addition, the control unit 26 performs a decision process based on a tapping operation (for example, a process of pressing the above-described various buttons 184, 185, 186, and 192). In addition, the control unit 26 causes the throw image display window to be reduced based on a pinch-in operation. In addition, the control unit 26 causes the throw image display window to be enlarged based on a pinch-out operation. In addition, the control unit 26 causes a cursor (for example, the cursor 193) to move based on a remote pointing operation.

In Step S380, the control unit 26 determines whether or not the user has performed a termination operation. For example, the control unit 26 may determine an operation of pressing the "Close" button to be a termination operation. When a termination operation has been detected, the control unit 26 proceeds to Step S390, and when a termination operation has not been detected, the control unit returns to Step S350.

In Step S390, the control unit 26 performs a disconnection process. For example, the control unit 26 outputs termination notification information indicating that display of the throw image information is to be terminated to the communication unit 24. The communication unit 24 transmits the termination notification information to the information processing device 10. Then, the control unit 26 disconnects communication with the information processing device 10.

Here, in the second process example, only one information processing device 10 is shown, but there may be a plurality of information processing devices 10. In other words, a plurality of users may cause image information of their own information processing devices 10 to be displayed on the display device 20.

According to the second process example, the same effect as the first process example is obtained. In addition, the user can operate throw image information more easily. It should be noted that the throw image information may also be displayed on the display unit 11 in the second process example.

1-4-3. Third Process Example

Next, a third process example will be described based on FIGS. 19 and 20. The third process example corresponds to a modified example of the first process example and the second process example. In the third process example, the control unit 26 decides a display state of the throw image display window based on a use state (vertical placement, horizontal placement, oblique placement, or the like) of the information processing device 10.

Specifically, the control unit 16 determines a use state of the information processing device 10 based on detection information given from the detection unit 13. Then, the control unit 16 outputs use state information regarding the use state to the communication unit 14. The communication unit 14 transmits use state information to the display device 20. The communication unit 24 of the display device 20 receives the use state information and outputs the information to the control unit 26. The control unit 26 decides a display state of the throw image display window based on the use state information. For example, when the use state is vertical placement, the control unit 26 sets the throw image display window to be in a vertically extending form, and when the use state is horizontal placement, the control unit sets the throw image display window to be in a horizontally extending form. In addition, the use state is oblique placement, the control unit 26 sets the throw image display window to be in an obliquely extending form.

Figure 19:
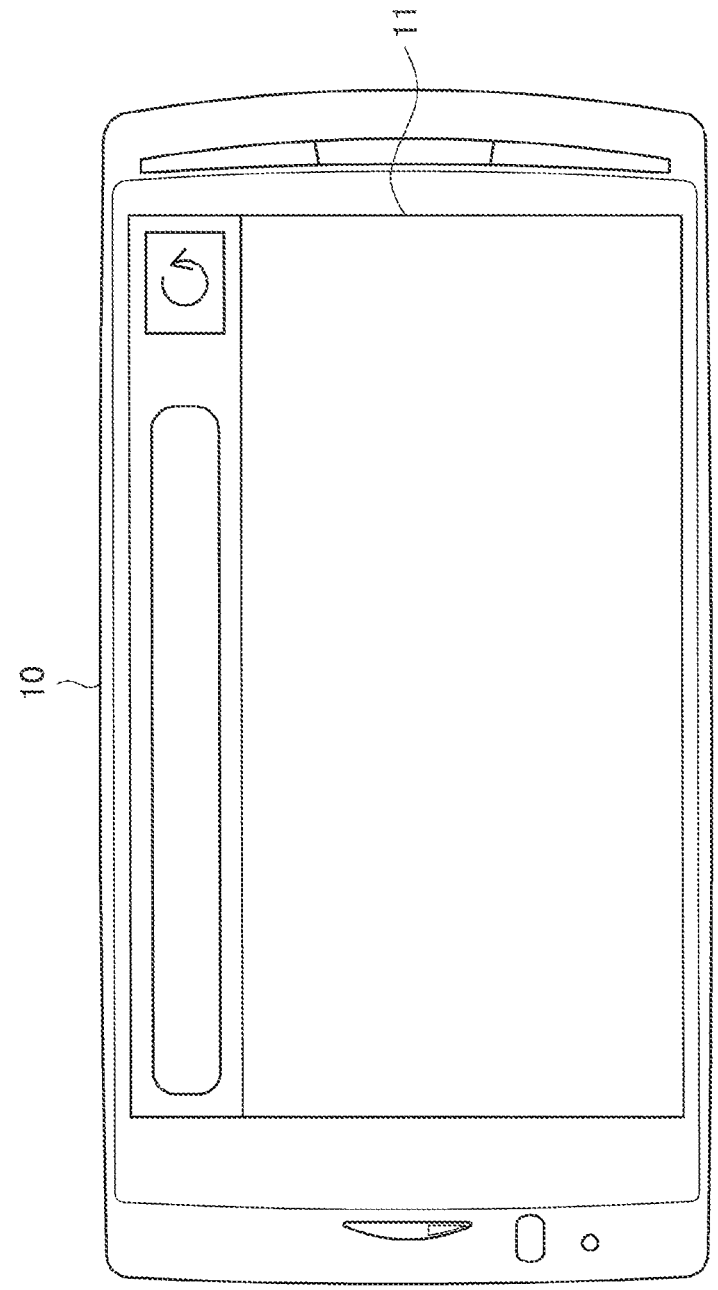
FIG. 19 is an illustrative diagram showing an example of display by an information processing device.
Figure 20:
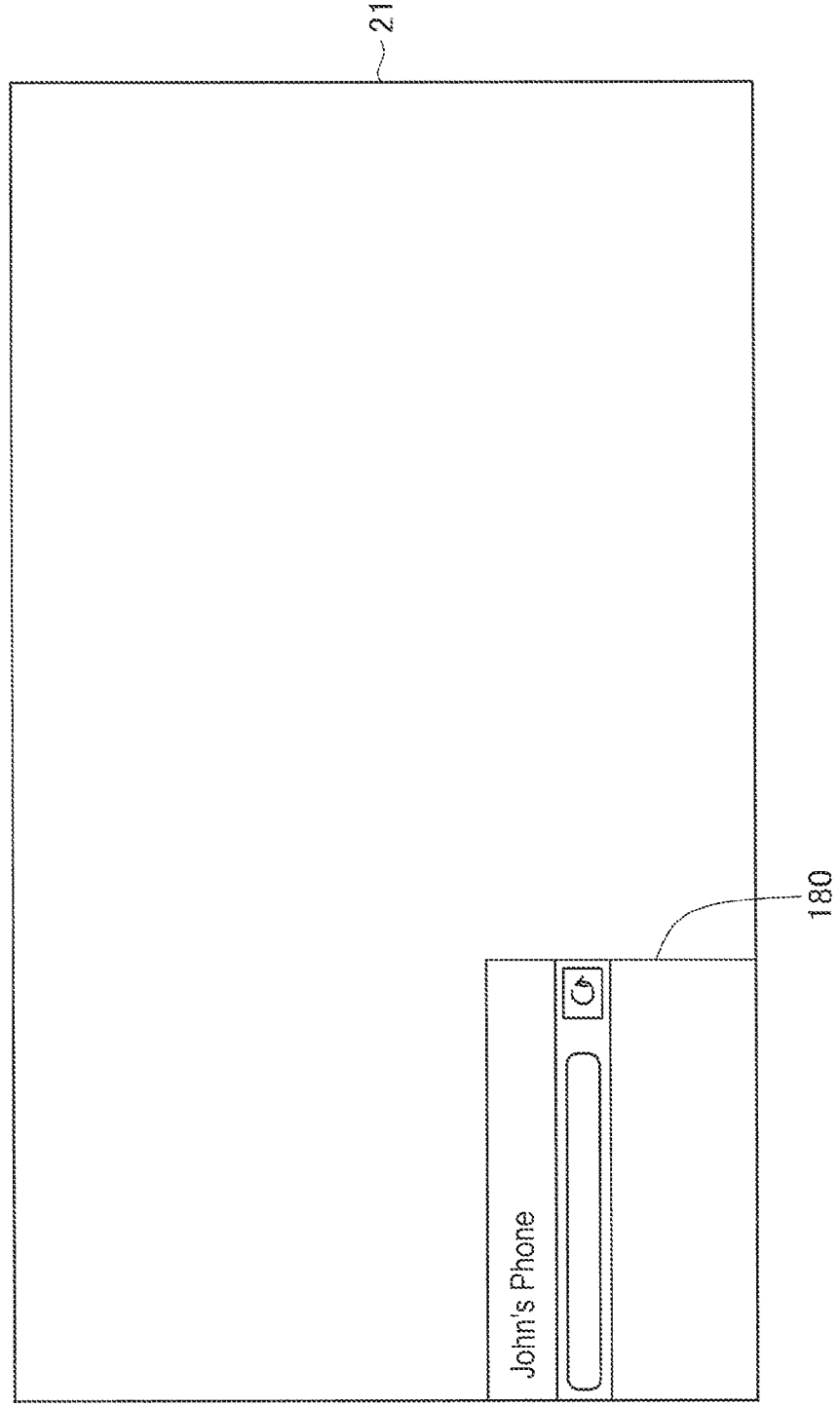
FIG. 20 is an illustrative diagram showing an example of display by a display device.

An example of the process is shown in FIGS. 19 and 20. In other words, when the information processing device 10 is in horizontal placement as shown in FIG. 19, the control unit 26 causes the throw image display window 180 to be displayed in the horizontally extending form as shown in FIG. 20. In this case, the control unit 26 may cause the throw image display window 180 to be displayed at the entire lower end of the display unit 21. In addition, the control unit 26 may cause the throw image display window 180 to be displayed as if it were gradually rising from a lower end of the display unit 21.

According to the third process example, since the display device 20 decides a display state of the window based on a use state of the information processing device 10, the user can cause the window to be displayed in his or her desired display state.

1-4-4. Fourth Process Example

Next, a fourth process example will be described based on FIG. 21. The fourth process example corresponds to a modified example of the first process example and the second process example. In the fourth process example, the control unit 26 causes the throw image display window to be displayed based on a position in a space and/or an attitude of the information processing device 10. More specifically, the control unit 26 causes the throw image display window to be displayed at the intersection of a straight line passing through the center of the information processing device 10 and extending in the longitudinal direction of the information processing device 10 and the display unit 21.

Specifically, the control unit 16 of the information processing device 10 outputs remote pointing operation information regarding a remote pointing operation to the communication unit 14. The communication unit 14 transmits the remote pointing operation information to the display device 20. The communication unit 24 of the display device 20 receives the remote pointing operation information, and outputs the information to the control unit 26. The control unit 26 decides a display position of the throw image display window based on the remote pointing operation information. For example, the control unit 26 decides a display position of the throw image display window so that the above-described intersection is disposed on any point of the throw image display window.

Figure 21:
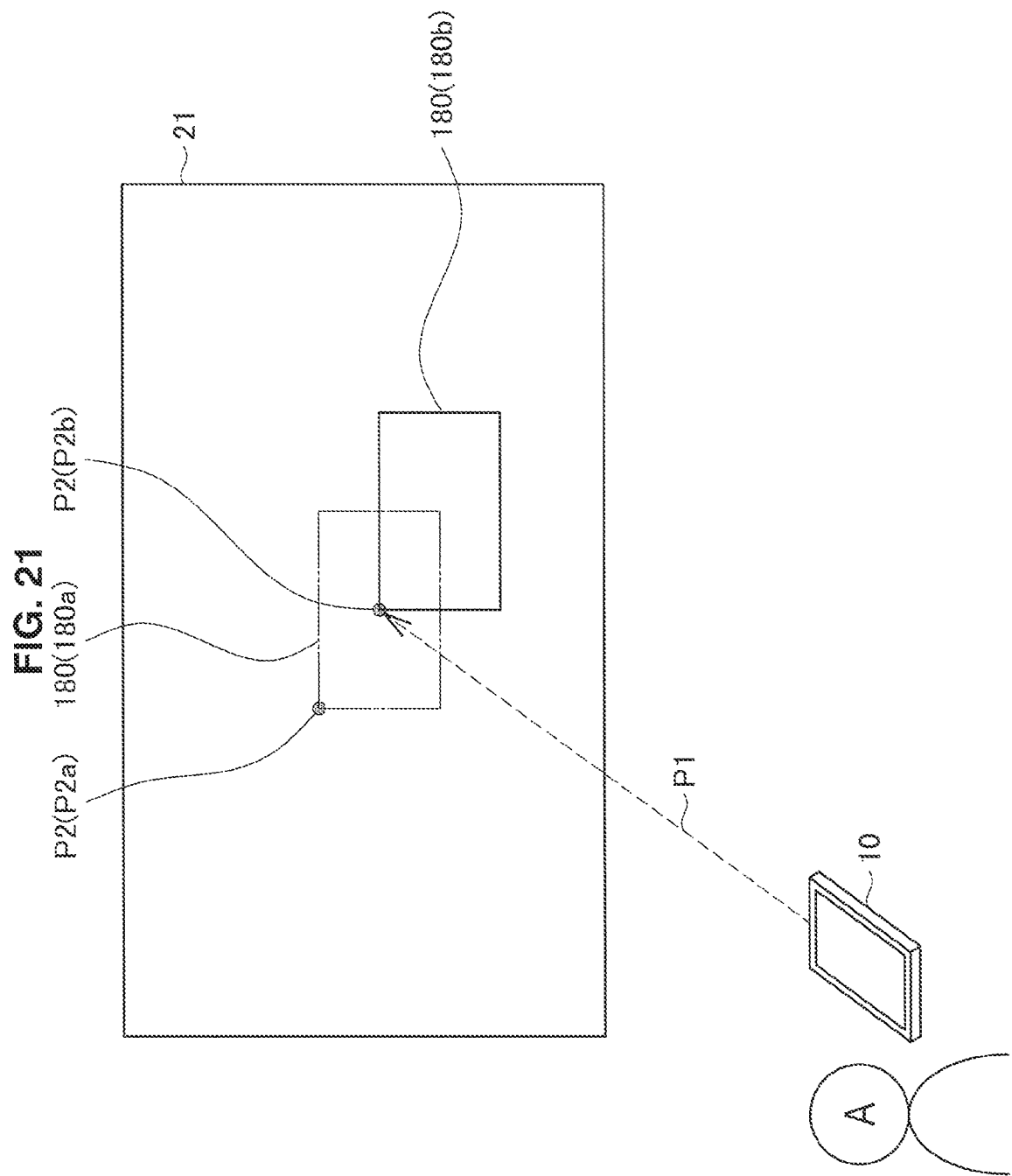
FIG. 21 is an illustrative diagram showing an example of display by a display device.

An example of the display is shown in FIG. 21. In this example, a user A moves the information processing device 10. The control unit 26 decides a display position of the throw image display window 180 so that the intersection P2 of the straight line P1 passing through the center of the information processing device 10 and extending in the longitudinal direction of the information processing device 10 and the display unit 21 is positioned at an upper-left end part of the throw image display window 180. For example, when the intersection P2 moves from a position P2a to a position P2b, the control unit 26 causes the throw image display window 180 to move from a position 180a to 180b.

It should be noted that the control unit 26 may compartmentalize the display unit 21 into a plurality of small regions and cause the throw image display window to be displayed in a small region which includes the above-described intersection.

According to the fourth process example, the user can cause the throw image display window to be displayed at his or her desired position.

1-4-5. Fifth Process Example

Next, a fifth process example will be described based on FIGS. 9, 10, and 22 to 24. In the fifth process example, the so-called catch is performed.

(Process by an Information Processing Device)

Figure 9:
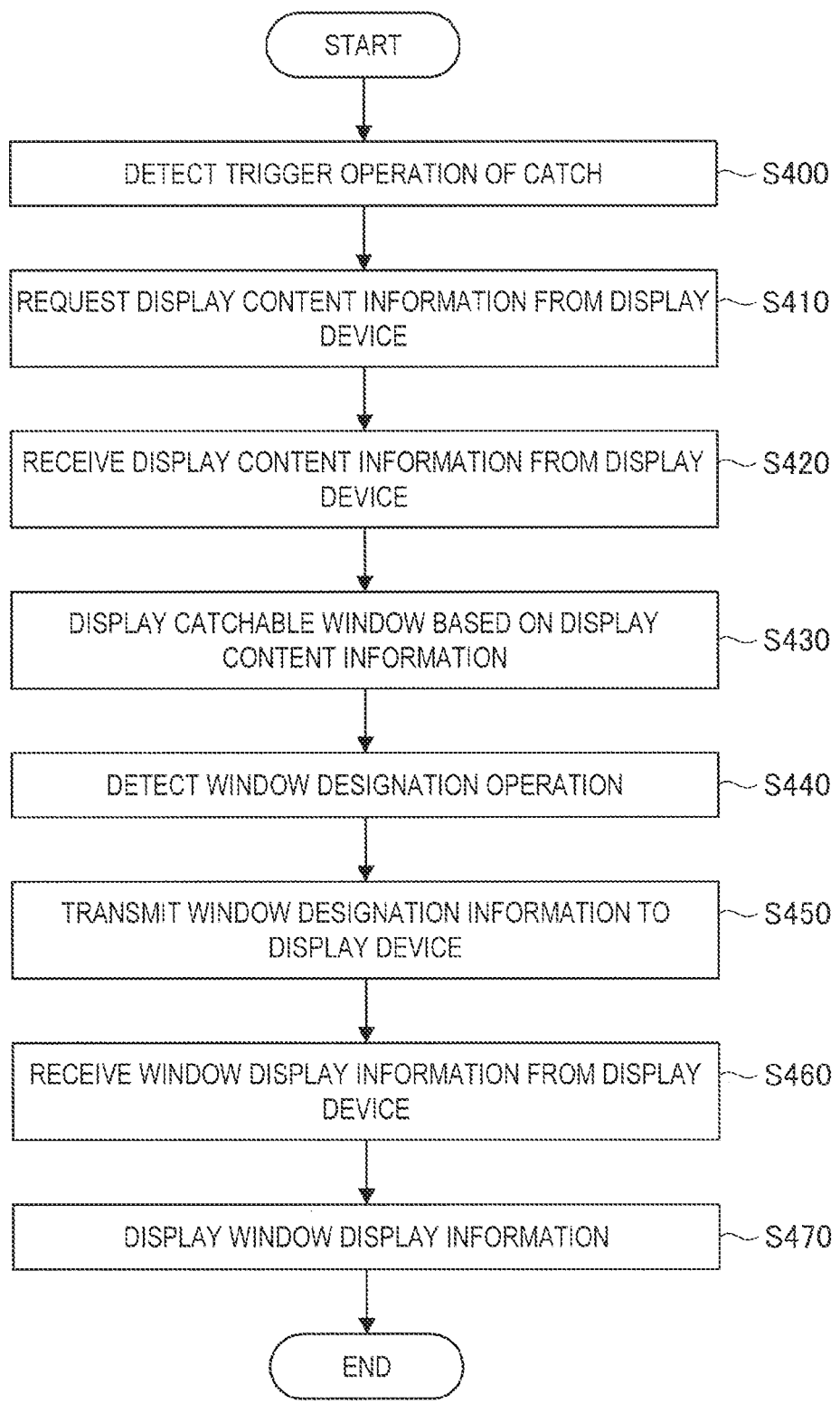
FIG. 9 is a flowchart showing the procedure of a process by an information processing system.

In Step S400 shown in FIG. 9, the control unit 16 stands by until the user performs a trigger operation of a catch. Here, as the trigger operation, for example, an operation of flicking the display unit 11 from an upper end to a lower end, or the like is exemplified. In addition, the control unit 16 may also cause a catch button to be displayed on the display unit 11. Then, the control unit 16 may determine an operation of tapping the catch button to be a trigger operation.

In Step S410, the control unit 16 outputs catch request information indicating a request to display content information to the communication unit 14. Here, the display content information is information indicating current display content of the display device 20. The display content information indicates a window that can be a target of a catch by a user, i.e., a display area (display position) of a catchable window. The communication unit 14 transmits the catch request information to the display device 20. Accordingly, the display device 20 transmits display content information to the information processing device 10. Details thereof will be described below.

In Step S420, the communication unit 14 receives the display content information, and outputs the information to the control unit 16.

In Step S430, the control unit 16 causes a catchable window to be displayed based on the display content information. Specifically, based on the display content information, the control unit 16 generates a catch target window selection dialog and causes the catch target window selection dialog to be displayed on the display unit 11. The catch target window selection dialog is a dialog for the user to select a catch target window. Image information within a catch target window selected by the user is displayed on the display unit 11 of the information processing device 10.

Figure 22:
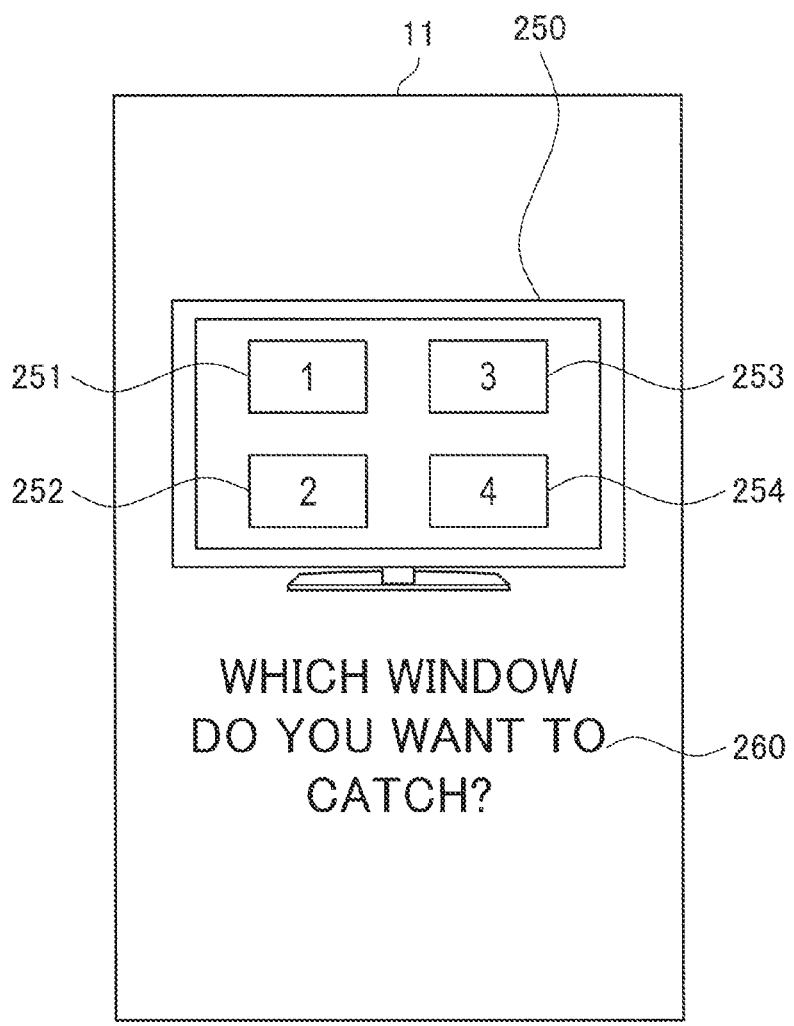
FIG. 22 is an illustrative diagram showing an example of display by an information processing device.

An example of the display is shown in FIG. 22. In this example, the control unit 16 causes a catch target window selection dialog 250 and an indicator 260 to be displayed. The control unit 16 may cause a cancel button to be displayed. The catch target window selection dialog 250 includes a display device image 250a and catch target window selection buttons 251 to 254.

The display device image 250a is an image deformation-displaying the display device 20. The catch target window selection buttons 251 to 254 are buttons for allowing the user to select a catch target window, and are displayed at parts corresponding to display positions of catchable windows in the display device image 250a. In other words, the catch target window selection buttons 251 to 254 indicate catchable windows. In this example, 4 catchable windows are displayed on the display unit 21. In addition, the catch target window selection button 251, for example, indicates a catchable window displayed at the upper-left end of the display unit 21. The indicator 260 is text information which prompts the user to select a catch target window.

Here, a catch target window selection dialog is not limited to this example. For catch target window selection, for example, text information indicating a display position of a catchable window may be displayed as a list. In this case, each line of the list serves as a catch target window selection button.

In Step S440, the control unit 16 stands by until the user performs a window designation operation, i.e., an operation of selecting a catch target window. When the window designation operation has been performed, the operation unit 12 outputs window designation operation information to the control unit 16. When the window designation operation information has been given, i.e., when the window designation operation has been detected, the control unit 16 proceeds to Step S450. Here, as the window designation operation, for example, the operation of tapping the catch target window selection button described above, or the like is exemplified.

In Step S450, the control unit 16 recognizes the catch target window selected by the user based on the window designation operation. Then, the control unit 16 generates window designation information regarding the catch target window selected by the user. Here, as the window designation information, an ID (window ID) for identifying the catch target window, information indicating a display area of the catch target window, or the like is exemplified. The control unit 16 may cause all the information to be included in the window designation information, or only any one kind of the information to be included in the window designation information. The control unit 16 outputs the window designation information to the communication unit 14. The communication unit 14 transmits the window designation information to the display device 20. Accordingly, the display device 20 transmits image information being displayed in the catch target window, i.e., window display information, to the information processing device 10.

In Step S460, the communication unit 14 receives the window display information, and outputs the information to the control unit 16. In Step S470, the control unit 16 causes the window display information to be displayed.

(Process by a Display Device)

Figure 10:
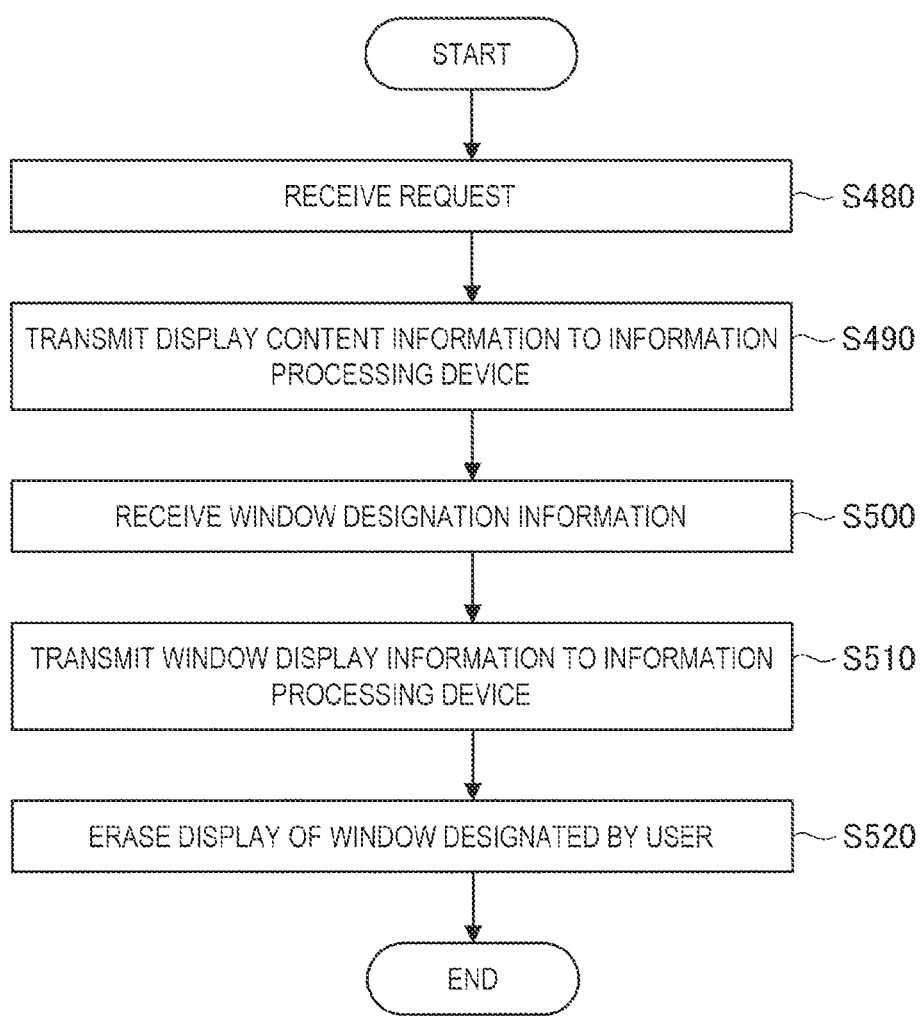
FIG. 10 is a flowchart showing the procedure of a process by an information processing system.

In Step S480 shown in FIG. 10, the communication unit 24 of the display device 20 receives the catch request information, and outputs the information to the control unit 26.

Figure 23:
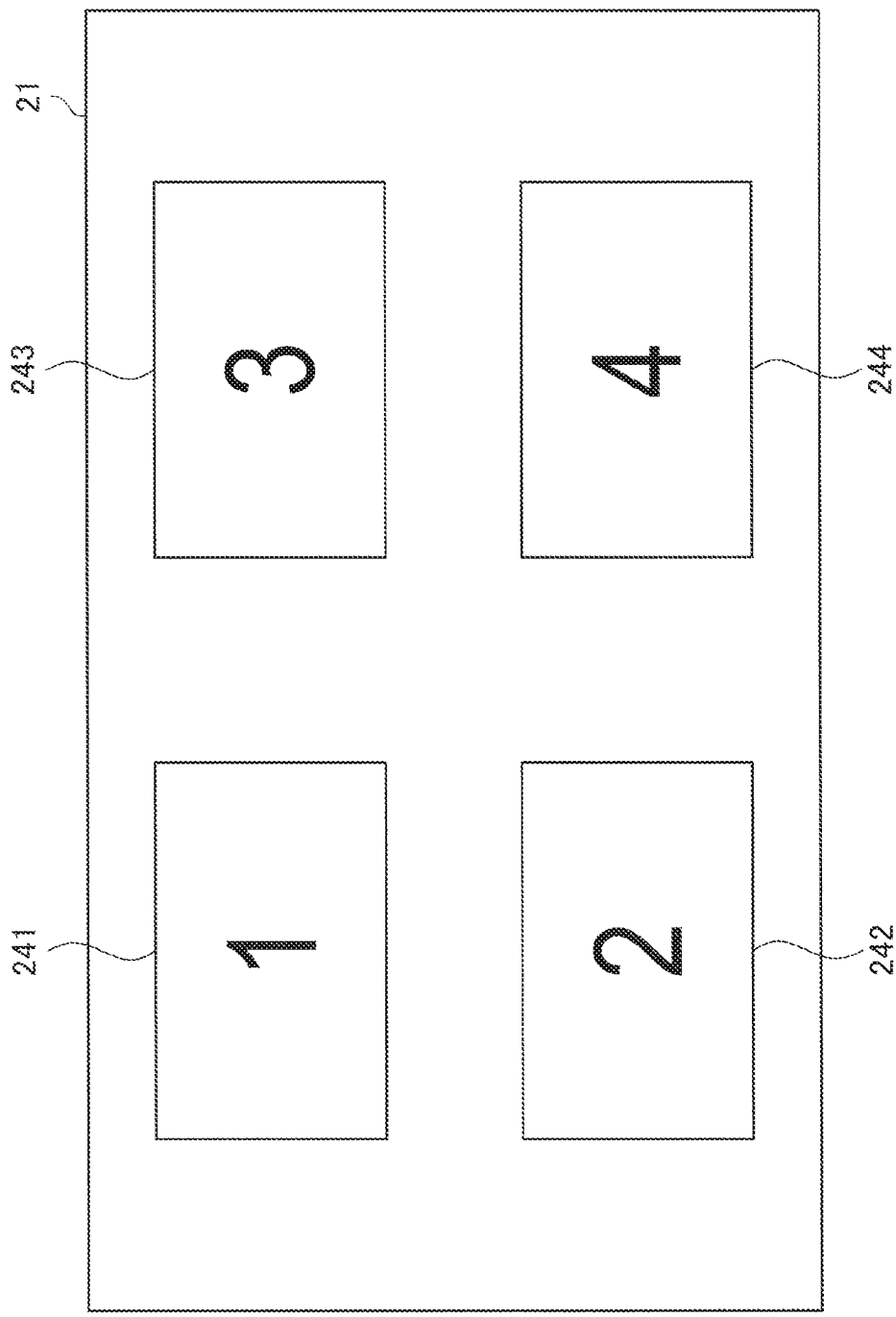
FIG. 23 is an illustrative diagram showing an example of display by a display device.

In Step S490, the control unit 26 generates display content information. For example, when catchable windows 241 to 244 shown in FIG. 23 are being displayed, the control unit 26 generates display content information indicating display areas of the catchable windows 241 to 244. Here, the control unit 26 may give a window ID to each catch target window and cause this window ID to be included in information regarding the display area of the catchable window. In addition, the control unit 26 may set only the window ID as the display content information. The control unit 26 outputs the display content information to the communication unit 24, and the communication unit 24 transmits the display content information to the information processing device 10.

In Step S500, the communication unit 24 receives the window designation information, and outputs the information to the control unit 26. In Step S510, the control unit 26 recognizes the catch target window based on the window designation information, and acquires image information being displayed in the catch target window, i.e., window display information. Then, the control unit 26 outputs the window display information to the communication unit 24. The communication unit 24 transmits the window display information to the information processing device 10.

In Step S520, the control unit 26 erases the catch target window from the display unit 21. The control unit 26 may leave the catch target window.

Figure 24:
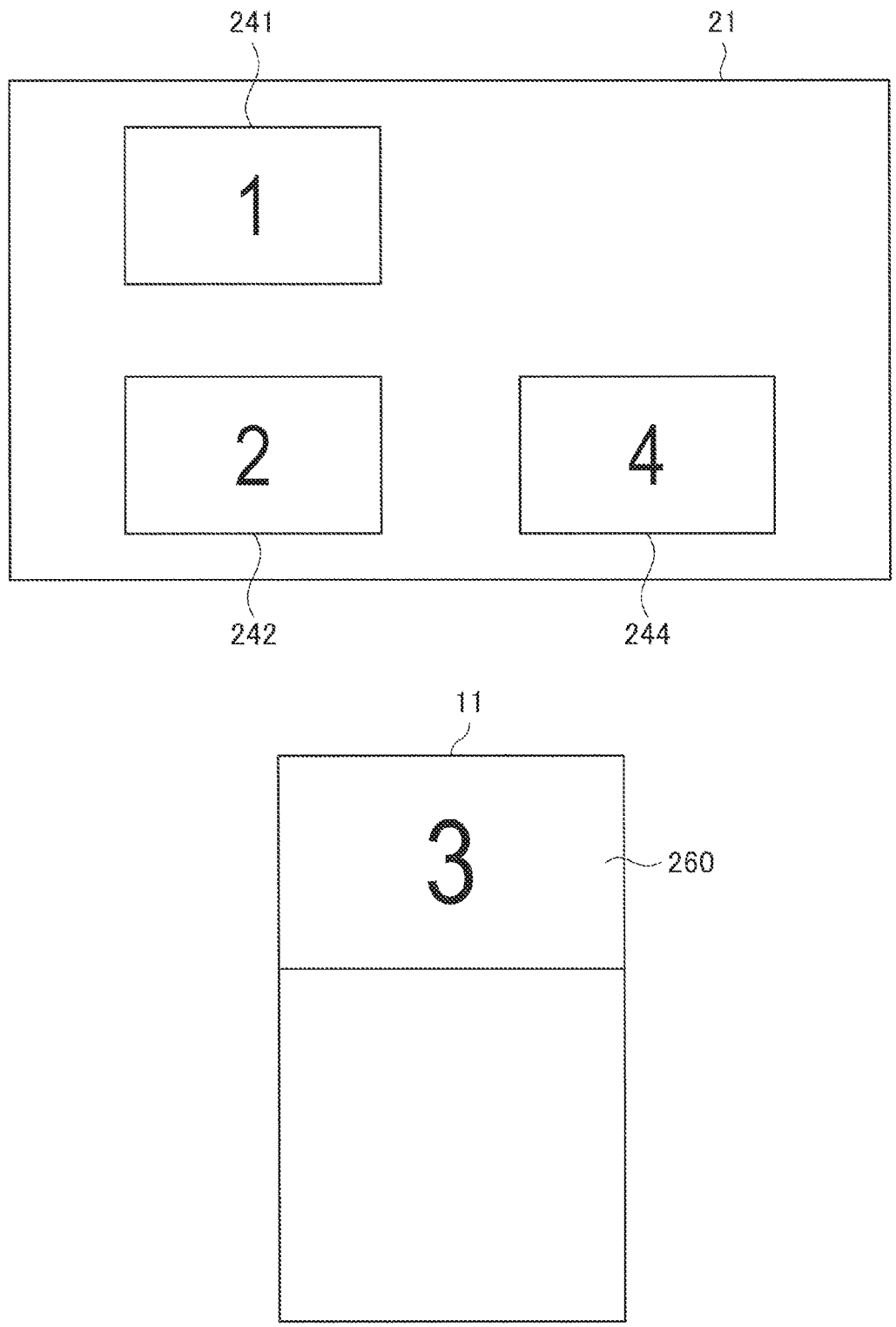
FIG. 24 is an illustrative diagram showing an example of display by an information processing device and a display device.

An example of the process will be described based on FIG. 24. The display device 20 is displaying the catchable windows 241 to 244 shown in FIG. 23. Thus, the information processing device 10 is displaying the catch target window selection dialog 250 shown in FIG. 22. When the user has selected the catchable window 243 as a catch target window, the information processing device 10 transmits window designation information indicating the same to the display device 20. The display device 20 acquires image information being displayed in the catch target window as window display information, and transmits the information to the information processing device 10. The information processing device 10 displays the window display information 260 (i.e., the image information that was displayed in the catchable window 243). Further, the display device 20 erases the catchable window 243.

It should be noted that the display device 20 may determine a catch target window from the following process. In other words, the imaging unit 23 images the user, and outputs a captured image obtained therefrom to the control unit 26. On the other hand, the user performs a gesture operation of designating any catchable window (for example, an operation of pointing at (indicating) any catchable window). Based on the captured image, the control unit 26 determines a catchable window designated by the user to be a catch target window.

In this case, the control unit 26 may allow the user to select a designation of the window display information from the following process. In other words, the control unit 26 causes the display unit 21 to display a list image showing a list of destinations. The user performs a gesture operation of selecting any destination from the listed destinations (for example, an operation of pointing at any destination, or an operation of dragging and dropping a catchable window). It should be noted that the drag-and-drop operation is performed by, for example, pointing at a catchable window and then moving a finger to a position indicating any destination. The control unit 26 determines the destination selected by the user based on the captured image, and transmits window display information to the destination. Destinations displayed in a list may include an information processing device (a stationary PC or the like) other than the information processing device 10.

In addition, the user may designate a destination of a catch target window and window display information with audio information. In this case, the audio detection unit 27 outputs the audio information to the control unit 26, and the control unit 26 recognizes the destination of the catch target window and the window display information based on the audio information.

According to the fifth process example, when image information displayed in any one window among a plurality of windows is requested from the information processing device 10, the display device 20 transmits the image information displayed in the one window to the information processing device 10. Thus, the user of the information processing device 10 can easily acquire the desired image information.

Furthermore, since the display device 20 performs control of erasing the one window, the user can easily ascertain acquisition of the image information displayed in the one window.

1-4-6. Sixth Process Example

Next, a sixth process example will be described based on FIGS. 11 and 25 to 28. The sixth process example is a process of deciding a display position of a window according to a position of a user. In this sixth process example, the information processing system may not necessarily have the information processing device 10. In addition, in the sixth process example, there are one or a plurality of users in front of the display device 20 (an imaging range of the imaging unit 23).

(Process by a Display Device)

Figure 11:
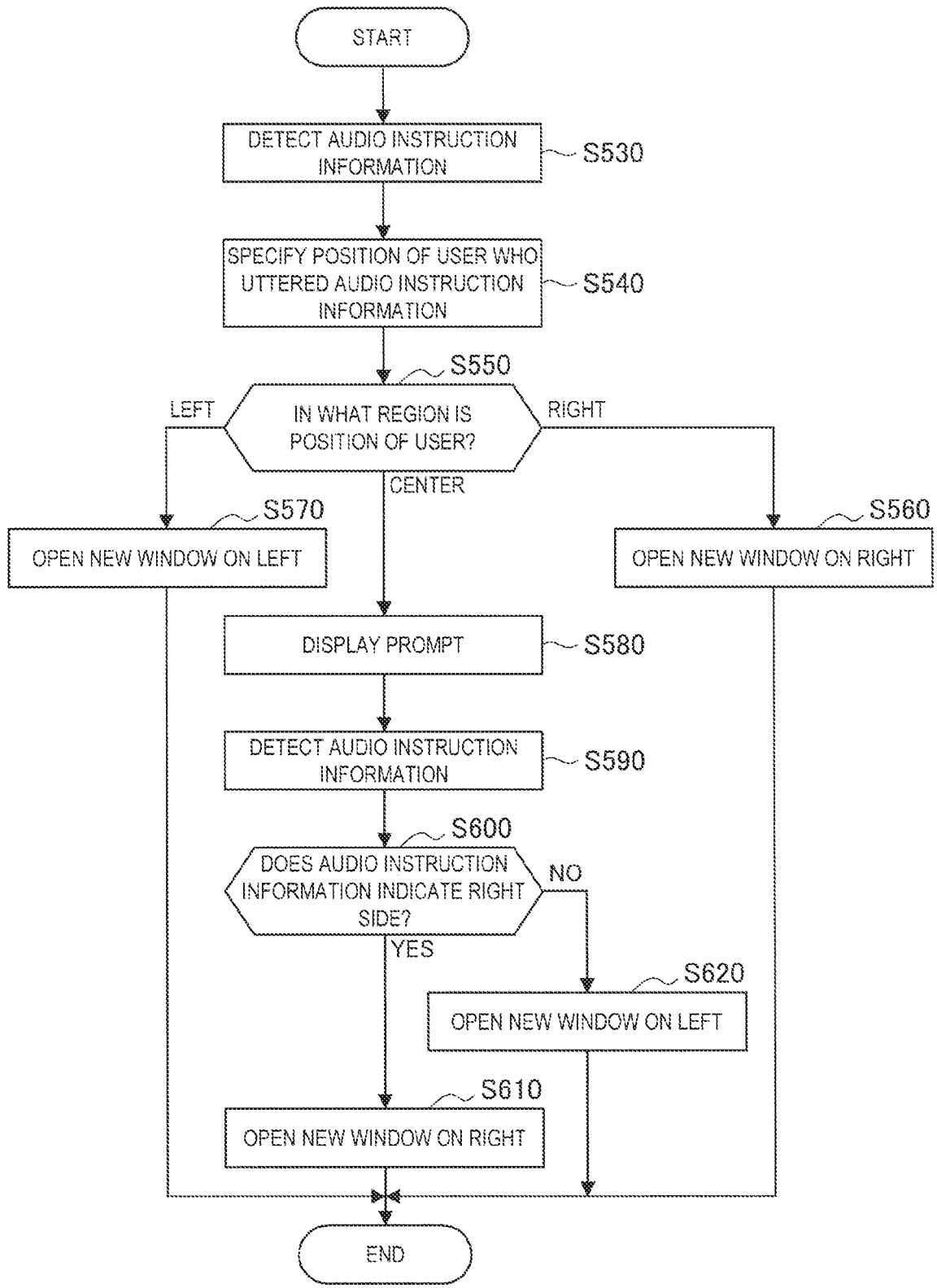
FIG. 11 is a flowchart showing the procedure of a process by an information processing system.

In Step S530 shown in FIG. 11, the audio detection unit 27 detects audio instruction information from a user and outputs the information to the control unit 26. Here, the audio instruction information includes audio information at least instructing display of a window. The audio instruction information may include audio information indicating the display content of the window.

In Step S540, the imaging unit 23 images the user and outputs a captured image obtained therefrom to the control unit 26. The control unit 26 specifies the position of the user who uttered the audio instruction information based on the captured image.

In Step S550, the control unit 26 determines the position of the user who uttered the audio instruction information. Here, the control unit 26 classifies the imaging range of the imaging unit 23 into the right side, the center, and the left side from the user, and determines which part of the classification the position of the user falls in. Of course, classification is not limited to this example. For example, classification may be made more finely. When the user is determined to be on the right side, the control unit 26 proceeds to Step S560, when the user is determined to be on the left side, the control unit proceeds to Step S570, and when the user is determined to be at the center, the control unit proceeds to Step S580.

In Step S560, the control unit 26 causes a window to be displayed on the right side (right end) of the display unit 21. When the audio instruction information includes display content of the window, the control unit 26 causes the display content designated by the user to be displayed in the window.

In Step S570, the control unit 26 causes a window to be displayed on the left side (left end) of the display unit 21. When the audio instruction information includes display content of the window, the control unit 26 causes the display content designated by the user to be displayed in the window.

In Step S580, the control unit 26 displays a prompt. Here, the prompt is information prompting designation of a display position of a window. A specific example will be described below.

In Step S590, the audio detection unit 27 detects the audio instruction information from the user, and outputs the information to the control unit 26. The audio instruction information here includes audio information indicating at least a display position of a window.

In Step S600, the control unit 26 determines whether or not the audio instruction information indicates the right side, and when the audio instruction information is determined to indicate the right side, the control unit proceeds to Step S610, and when the audio instruction information is determined to indicate the left side, the control unit proceeds to Step S620.

In Step S610, the control unit 26 causes a window to be displayed on the right side (right end) of the display unit 21. When the audio instruction information includes the display content of the window, the control unit 26 causes the display content designated by the user to be displayed in the window.

In Step S620, the control unit 26 causes a window to be displayed on the left side (left end) of the display unit 21. When the audio instruction information includes the display content of the window, the control unit 26 causes the display content designated by the user to be displayed in the window. It should be noted that the user may designate a display position of a window through a gesture operation (pointing, flicking, or the like). In this case, the control unit 26 decides a display position of a window based on a captured image. In other words, the control unit 26 determines the user who performed the gesture operation, and based on the result thereof, decides a display position of a window.

An example of the process will be described based on FIGS. 25 to 28. As shown in FIG. 25, the display device 20 (control unit 26) displays arbitrary image information, for example, image information 170. In this example, three users A to C are viewing the image information 170. In addition, the users A to C are included in the imaging rage of the imaging unit 23. The users A to C may or may not have the information processing device 10.

Figure 26:
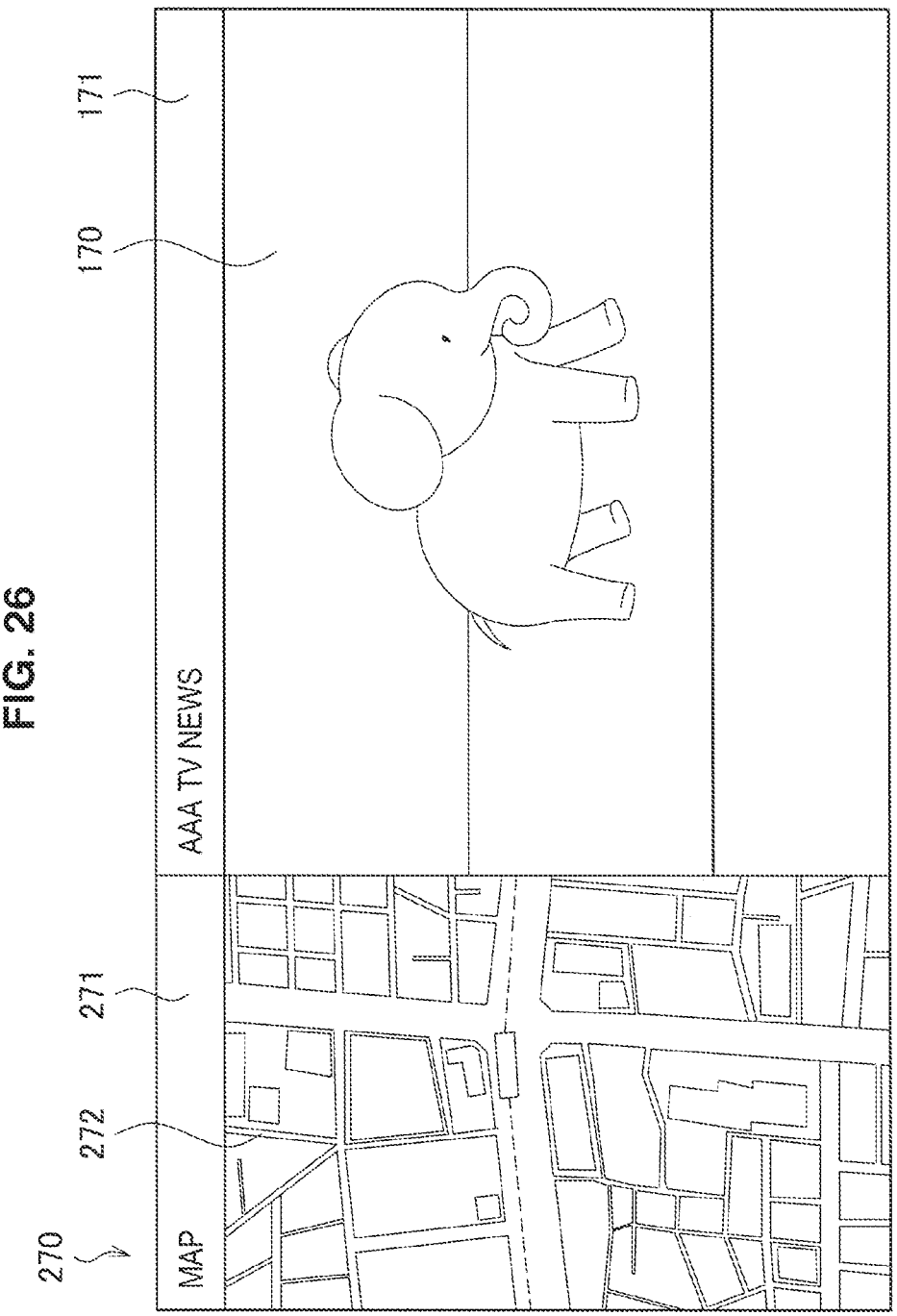
FIG. 26 is an illustrative diagram showing an example of display by a display device.

Then, when the user A on the left end utters "display a map," the display device 20 displays a window 270 at the left end of the display unit 21 as shown in FIG. 26. The window 270 includes an indicator 271 indicating display content of the window 270, and an image display area 272 in which a map image is displayed. In addition, the display device 20 reduces an aspect ratio of the image information 170 at a fixed rate and displays the indicator 171 on the upper side of the image information 170. The indicator 171 indicates information for identifying the image information 170.

Figure 27:
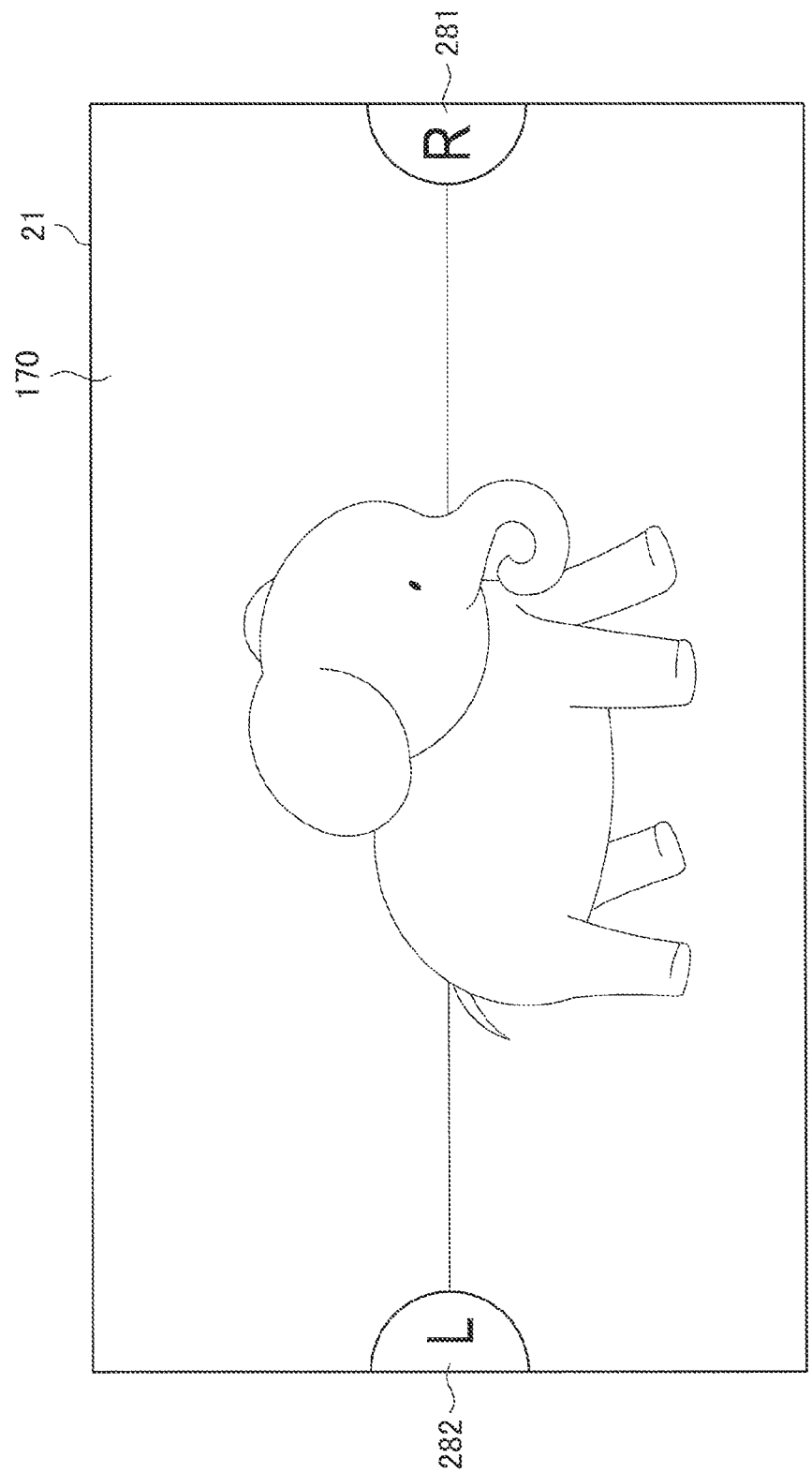
FIG. 27 is an illustrative diagram showing an example of display by a display device.
Figure 28:
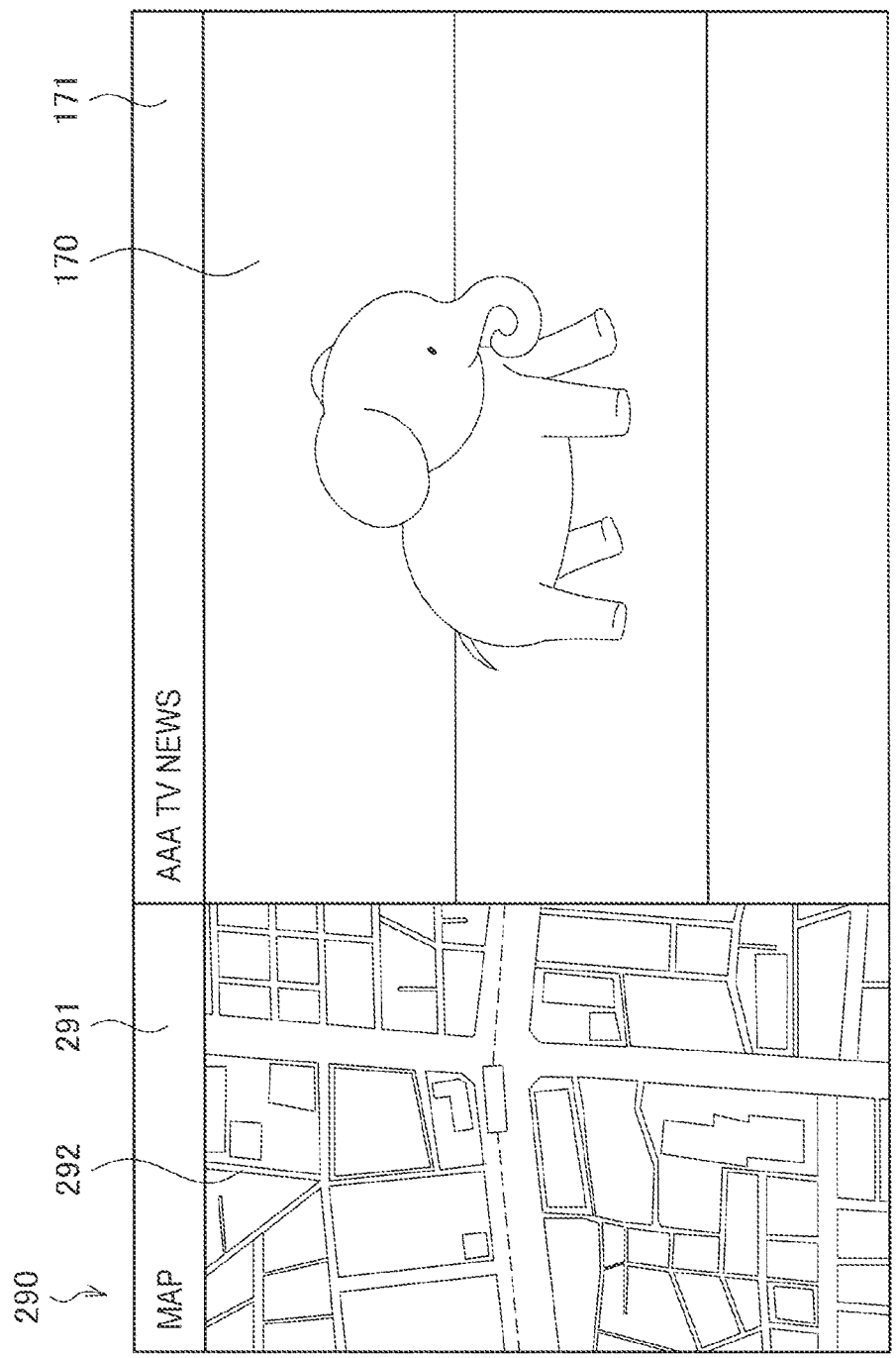
FIG. 28 is an illustrative diagram showing an example of display by a display device.

On the other hand, when the user B at the center utters "display a map," the display device 20 displays prompts 281 and 282 at both ends of the display unit 21 as shown in FIG. 27. The prompt 281 is displayed at the right end of the display unit 21, at which the letter "R" is drawn. The prompt 282 is displayed at the left end of the display unit 21, at which the letter "L" is drawn. Accordingly, the display device 20 can prompt the user to designate a display position of a window. Then, when the user B utters "left," the display device 20 displays a window 290 at the left end of the display unit 21 as shown in FIG. 28. The window 290 includes an indicator 291 indicating the display content of the window 290 and an image display area 292 in which a map image is displayed. In addition, the display device 20 reduces the aspect ratio of the image information 170 at a fixed rate and displays the indicator 171 on the upper side of the image information 170. The indicator 171 indicates information for identifying the image information 170.

According to the sixth process example, each user can easily cause a desired window to be displayed at a position that he or she can easily view.

1-4-7. Seventh Process Example

Figure 29:
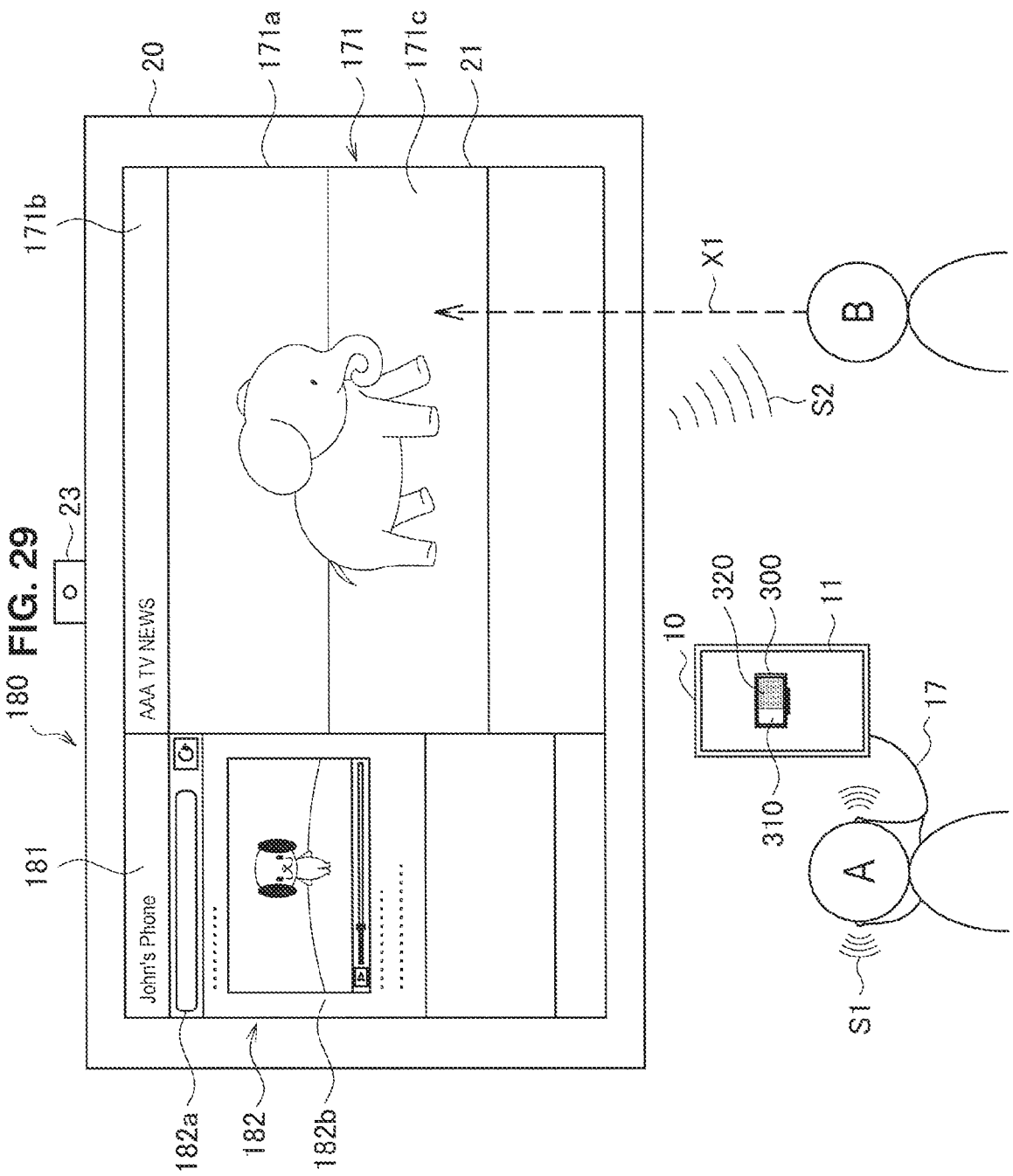
FIG. 29 is an illustrative diagram showing an example of display by a display device.

Next, a seventh process example will be described based on FIGS. 12 and 29. The seventh process example corresponds to a modified example of the first and second process examples.

First, the control unit 26 causes the same image as in the first and second process examples to be displayed. An example of the display is shown in FIG. 29. In this example, the control unit 26 causes the base image display window 171 and the throw image display window 180 to be displayed. In this example, although the various information display window 190 and the cursor 193 are omitted, images thereof may of course be displayed. In addition, the users A and B are viewing the display device 20. The user B may not have the information processing device 10.

The base image display window 171 includes the base image display area 171*a* and the base image indicator 171*b*. In the base image display area 171*a*, the base image information 171*c* is displayed. The indicator 171*b* indicates information for identifying base image information, such as the title of base image information. Details thereof are the same as in FIG. 18.

The throw image display window 180 is a window for displaying a throw image. The throw image display window 180 includes the indicator 181 and the throw image display area 182. Details thereof are the same as in FIG. 18. It should be noted that, although the display area switching button 184, the reduction button 185, the enlargement button 186, and the cursor 193 are omitted in this example, images thereof may of course be displayed.

In addition, in this example, throw image information (i.e., the address image information 182*a* and web page 182*b*) transmitted from the information processing device 10 of the user A (or obtained from context information) is being displayed in the throw image display area 182. It should be noted that the control unit 26 may cause another window, for example, a window described in the seventh process example, to be displayed instead of the throw image display window.

In addition, the control unit 16 of the information processing device 10 is outputting audio information S1 corresponding to the throw image information (or another window described above).

Here, the control unit 26 outputs display content information indicating the display content of the display unit 21 to the communication unit 24, and the communication unit 24 transmits the display content information to the information processing device 10 of the user A. The communication unit 14 of the information processing device 10 receives the display content information and outputs the information to the control unit 16. The control unit 16 causes the display content information to be displayed on the display unit 11. An example of the display is as shown in FIG. 29. In other words, in this example, the control unit 16 causes display content information 300 to be displayed. The display content information 300 is an image obtained by deforming the display content of the display device 20. The display content image 300 includes a window selection button 310 corresponding to the throw image display window and a window selection button 320 corresponding to the base image display window 171.

When the user taps any window selection button, the control unit 16 outputs selected window information regarding the window selection button tapped (selected) by the user to the communication unit 14. The communication unit 14 outputs the selected window information to the display device 20. The communication unit 24 of the display device 20 outputs the selected window information to the control unit 26. Based on the selected window information, the control unit 26 recognizes the window selected by the user, and acquires audio information corresponding to the window. Here, the control unit 26 may acquire audio information from a network or from the storage unit 25. The control unit 26 outputs the audio information to the communication unit 24, and the communication unit 24 transmits the audio information to the information processing device 10. The communication unit 14 of the information processing device 10 receives the audio information, and outputs the information to the control unit 16. The control unit 16 causes the audio information to be output from the audio output unit 17. It should be noted that, instead of acquiring the audio information from the display device 20, the control unit 16 may acquire the information from a network. In addition, audio information may be stored in the storage unit 15 in advance and the control unit 16 may acquire the audio information from the storage unit 15.

In addition, instead of transmitting the display content information from the control unit 26 to the information processing device 10, the following process may be performed. In this case, it is necessary for the information processing device 10 to be equipped with an imaging unit. In other words, the user images the display unit 21 using the imaging unit of the information processing device 10. The imaging unit outputs a captured image obtained from the imaging to the control unit 16. The control unit 16 causes the captured image to be displayed on the display unit 11 as display content information.

Figure 12:
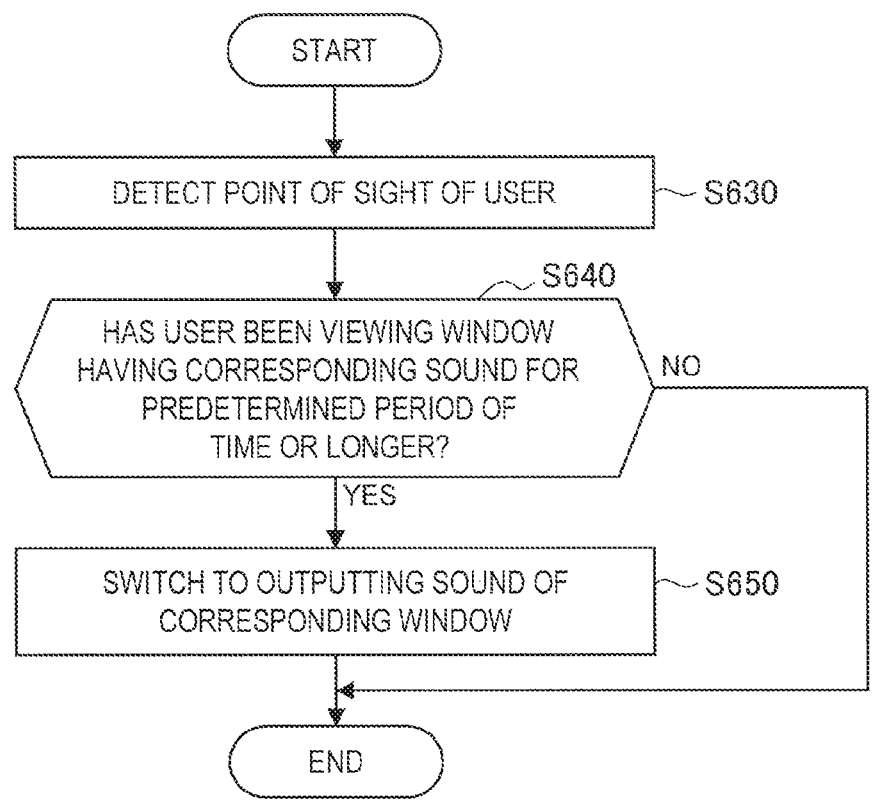
FIG. 12 is a flowchart showing the procedure of a process by an information processing system.

On the other hand, the display device 20 performs a process according to the flowchart shown in FIG. 12 with respect to the user B. It should be noted that, in this case, it is preferable for the audio output unit 22 to be able to output audio information with directivity.

In other words, in Step S630, the imaging unit 23 images the user B, and outputs a captured image obtained therefrom to the control unit 26. The control unit 26 detects a point of sight of the user B based on the captured image.

In Step S640, the control unit 26 determines whether or not the user B has been viewing a window having a corresponding sound for a predetermined period of time based on the result of the detection. In this example, the window having a corresponding sound is any of the base image display window 171 and the throw image display window 180. When the user B is determined to have been viewing the window having a corresponding sound for the predetermined period of time, the control unit 26 proceeds to Step S650, and otherwise, the corresponding process ends.

The control unit 26 outputs audio information corresponding to the window that the user B has been viewing from the audio output unit 22. In other words, audio information is switched. When the point of view (line of sight X1) of the user B faces the base image display window 171, for example, the control unit 26 outputs audio information S2 corresponding to the base image display window 171. It should be noted that the control unit 26 may output audio information toward the user B from the audio output unit 22. In addition, the control unit 26 may output the audio information corresponding to the window that the user B has been viewing at a high level, and output other audio information at a low level. In addition, at the time of audio switching, the control unit 26 may fade out audio information that has been output up to that time, and fade in audio information to be newly output.

According to the seventh process example, each user can listen to his or her desired audio information more easily.

1-4-8. Eighth Process Example

Figure 13:
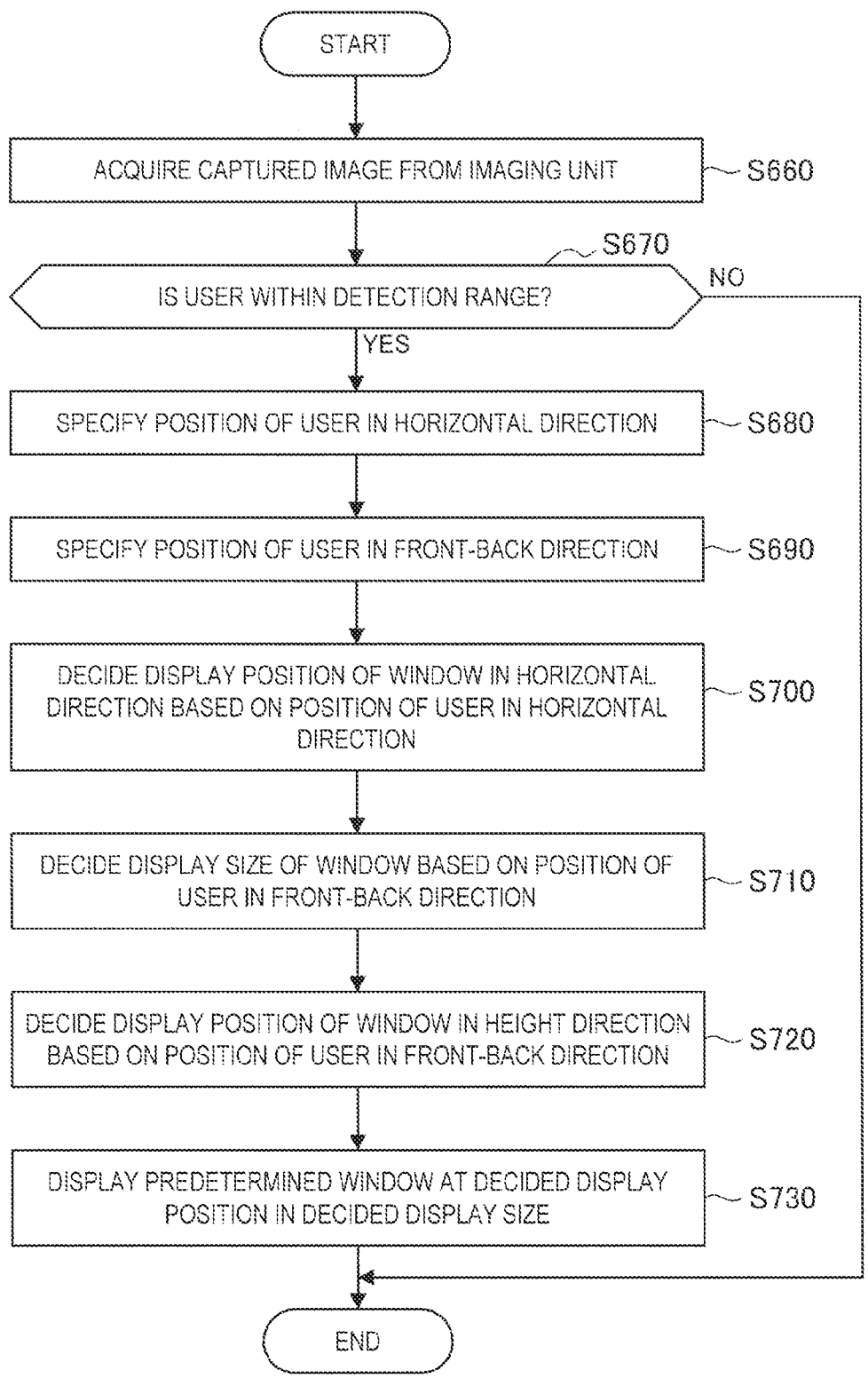
FIG. 13 is a flowchart showing the procedure of a process by an information processing system.

Next, an eighth process example will be described based on FIGS. 13 and 30. Also in this eighth process example, the information processing system may not include the information processing device 10. In addition, one or a plurality of users are viewing the display device 20 in the eighth process example.

In Step S660, the imaging unit 23 images a user, and outputs a captured image obtained therefrom to the control unit 26.

In Step S670, the control unit 26 determines whether or not the user is within the imaging range by detecting the face from the captured image. When the user is determined to be within the imaging range, the control unit 26 proceeds to Step S680, and when the user is determined not to be within the imaging range, the present process ends.

In Step S680, the control unit 26 specifies a position of the user in the horizontal direction based on the result of face detection.

In Step S690, the control unit 26 specifies the position of the user in the front-back direction (distance from the display device 20 to the user) based on the result of face detection, specifically, the size of the face.

In Step S700, the control unit 26 decides a display position of a window in the horizontal direction based on the position of the user in the horizontal direction. For example, the control unit 26 may specify the position of the window in the horizontal direction so that the position of the user in the horizontal direction and the position of the window in the horizontal direction coincide with each other.

In Step S710, the control unit 26 decides a display size of the window based on the position of the user in the front-back direction. For example, the control unit 26 may increase the display size of the window according to the user's distance from the display device 20. It should be noted that, instead of adjusting the display size of the window, the control unit 26 may adjust the size of image information displayed in the window. For example, the control unit 26 may increase the image information according to the user's distance from the display device 20.

In Step S720, the control unit 26 decides a display device of the window in the height direction (the distance from the lower edge of the display unit 21 thereto) based on the position of the user in the front-back direction. For example, the control unit 26 may specify the position of the window in the height direction so that the window is disposed at the height of the user's face.

In Step S730, the control unit 26 causes the window to be displayed at the decided position in the decided display size described above.

Figure 30:
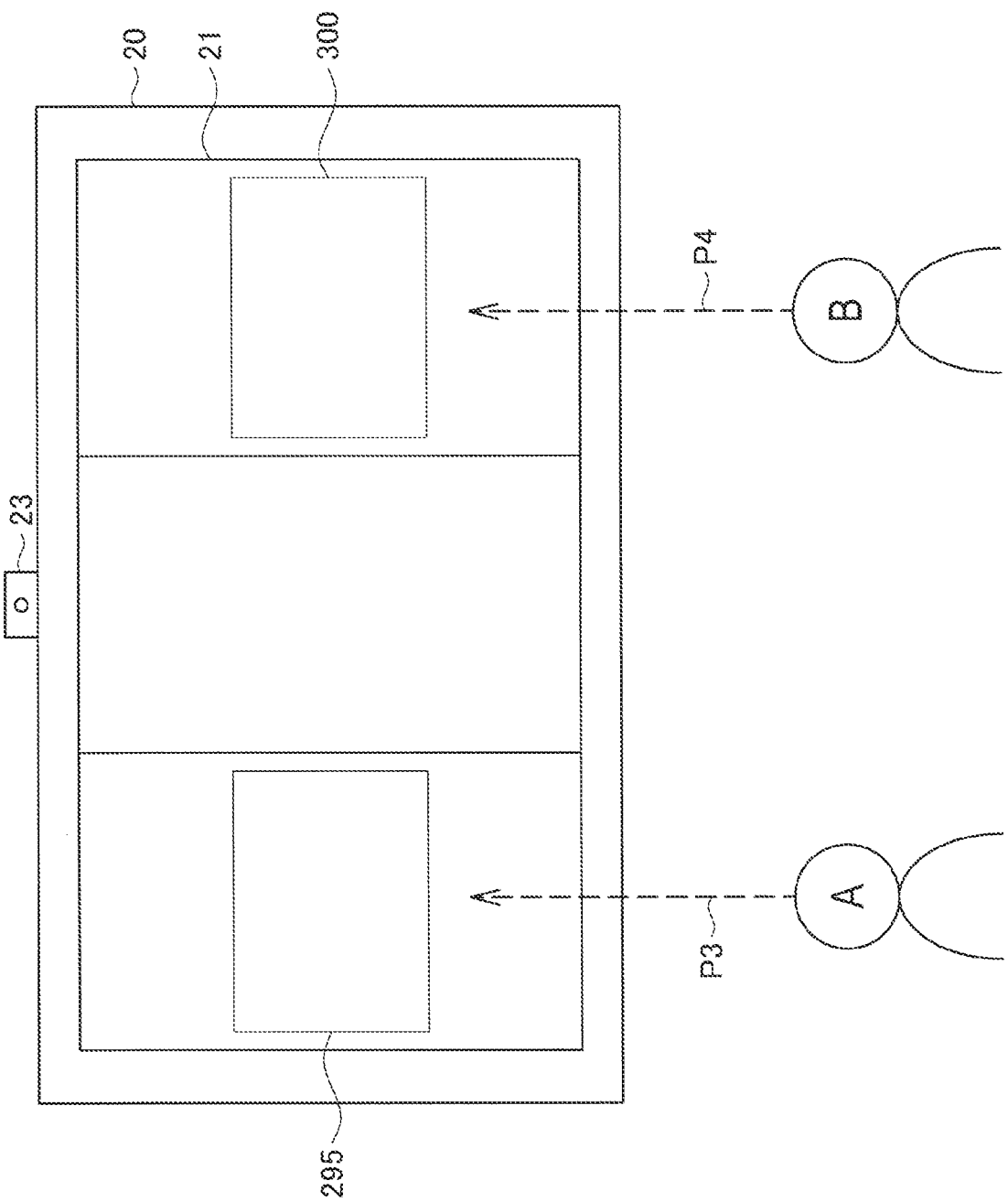
FIG. 30 is an illustrative diagram showing an example of display by a display device.

An example of the process is shown in FIG. 30. In this example, the users A and B each are viewing the display device 20. The display device 20 detects the faces of the users A and B by performing face detection, and based on the result of the detection, decides display positions and display sizes of a window 295 corresponding to the user A and a window 300 corresponding to the user B. Then, the display device 20 displays the windows 295 and 300 at the decided display positions in the decided display sizes. For example, the display device 20 displays the windows 295 and 300 such that the window 295 is disposed in front of a line of sight P3 of the user A and the window 300 is disposed in front of a line of sight P4 of the user B. The control unit 26 causes image information designated by the users A and B to be displayed in each of the windows 295 and 300.

For example, the control unit 26 causes throw image information transmitted from the information processing devices 10 that the users A and B have to be displayed. In this case, the storage unit 25 has stored user specification information in which identification information of the information processing devices 10 (information processing device IDs) is associated with user identification information. As the user identification information, the name of a user, a face image, or the like is exemplified. In addition, the identification information of the information processing devices 10 is added to the throw image information transmitted from the information processing devices 10. Then, based on the identification information of the information processing devices 10 added to the throw image information and the user specification information stored in the storage unit 25, the control unit 26 decides in which window the throw image information is to be displayed.

In addition, when the position of the user in the horizontal direction has been changed, the control unit 26 may also change the display position of the window in the horizontal direction.

An example of the process is shown in FIGS. 31 and 32. The control unit 26 is causing image information to be displayed in the windows 295 and 300 as shown in FIG. 31. In addition, the control unit 26 is causing a window 310 to be displayed between the windows 295 and 300, and causing this window 310 to display image information.

Here, when the user A moves in the direction of the arrow P5, the user B moves in the direction of the arrow P6, and thereby the positions of the users A and B are interchanged, the control unit 26 interchanges the display positions of the windows 295 and 300. Specifically, while moving the display position of the window 295 in the direction of the arrow P7, the control unit 26 moves the display position of the window 300 in the direction of the arrow P8, and thereby the display positions of the windows 295 and 300 are interchanged. Specifically, when the positions of the users are changed, the control unit 26 performs the processes of Steps S660 to Step S730 again. Accordingly, even when the positions of the users A and B are changed, the control unit 26 can cause the windows 295 and 300 to be displayed in front of the lines of sight of the users A and B.

In addition, when a window display position is changed according to a change of a position of a user, the control unit 26 may cause the window whose display position has been changed to be displayed in a different mode from other portions (i.e., with emphasis). For example, when a display position of a window is changed, the control unit 26 may cause the boundary portion of the window to be displayed in a different mode from other portions for a predetermined period of time after the display position of the window is changed. As a display mode of a window, for example, displaying the boundary portion of a window in a more conspicuous color than other portion, displaying the vicinity of the boundary of a window with an effect of shining, causing a window to flicker, or the like is exemplified. Accordingly, even when a user turns his or her line of sight away from the display device 20 while moving and then returns his or her line of sight to the display device 20, the user can easily find the window corresponding to him or her.

In addition, for a predetermined period of time after a display position of a window is changed, the control unit 26 may cause an indicator indicating the user corresponding to the window to be displayed within the window (or near the window). As such an indicator, an icon indicating a face image of a user, text information indicating the name of a user, a live video obtained by imaging a user, or the like is exemplified. The live video may be displayed as a through image. When the indicator is to be displayed within a window, the control unit 26 may cause the indicator to be displayed in a part inside the window, or image information inside the window and the indicator to be displayed in the form of α-blending. Accordingly, even when the user turns his or her line of sight away from the display device 20 while moving and then returns his or her line of sight to the display device 20, the user can easily find the window corresponding to him or her.

In addition, when a display position of a window is to be changed, the control unit 26 may consecutively move the window to a changed display position, or erase the window first and then cause the window to be displayed at a changed display position. In the former case, the control unit 26 may cause the window to be displayed transparently until the window arrives at the new display position (or for a predetermined period of time after the window arrives at the new display position). Accordingly, even when the window overlaps other image information during movement of the window, the control unit 26 can suppress deterioration in visibility of the other image information.

According to the eighth process example, the display device 20 decides a display position of a window associated with the information processing device 10 based on a position of a user of the information processing device 10, and thus the user can view the desired window more easily.

In addition, when the position of the user of the information processing device 10 has been changed, the display device 20 changes the display position of the window associated with the information processing device 10, and thus the user can view the desired window more easily.

1-4-9. Ninth Process Example

Figure 33:
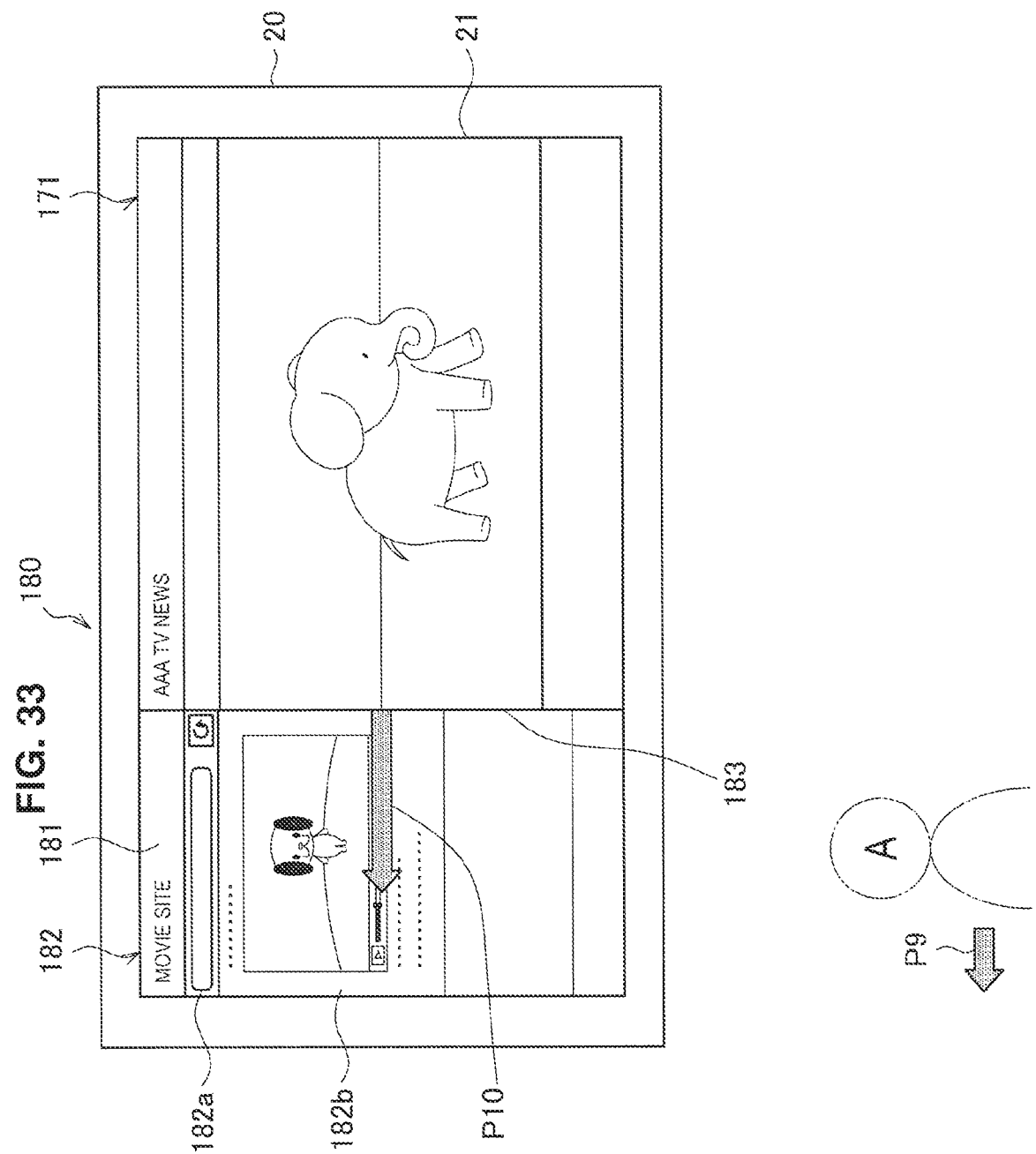
FIG. 33 is an illustrative diagram showing an example of display by a display device.
Figure 34:
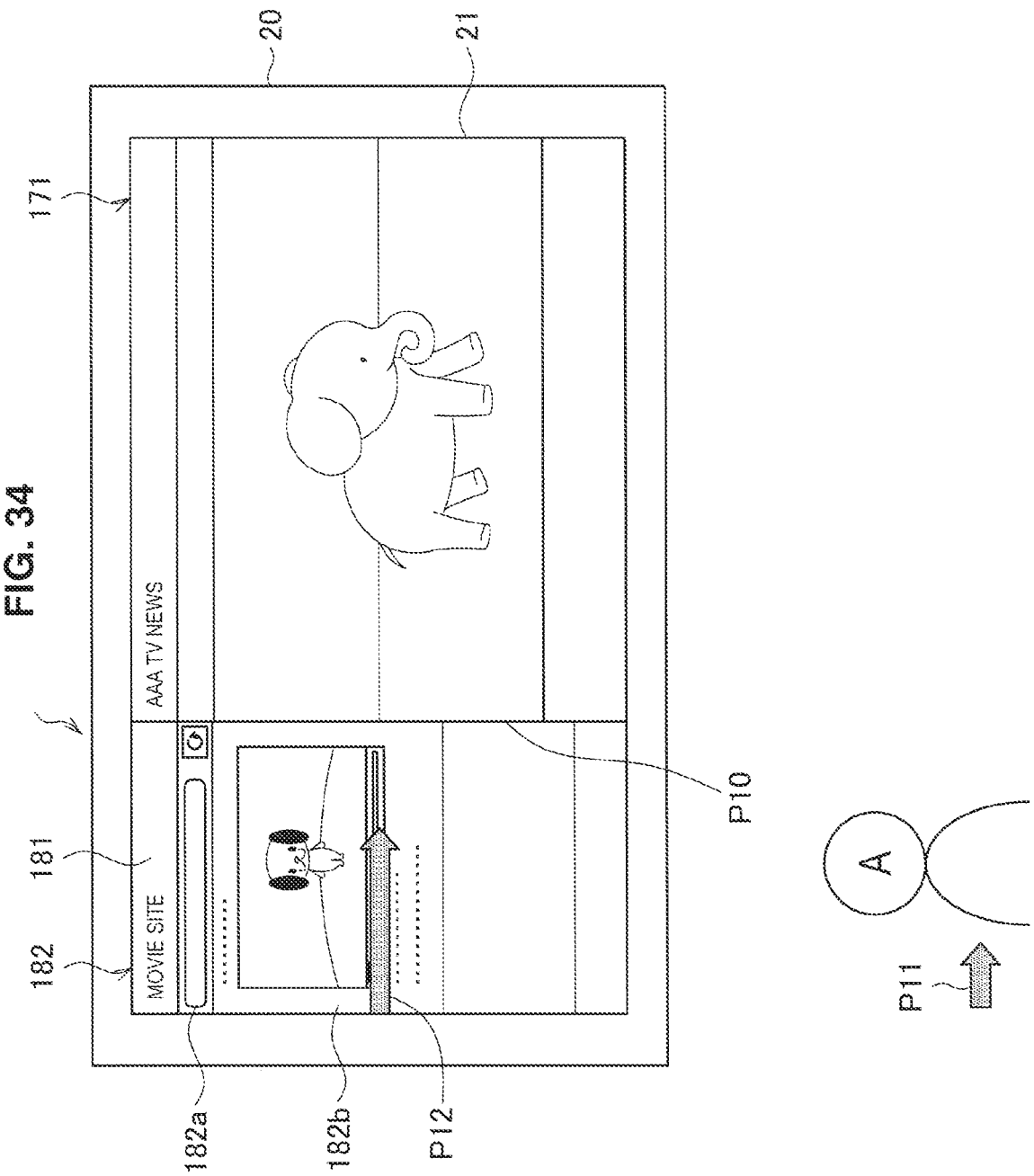
FIG. 34 is an illustrative diagram showing an example of display by a display device.
Figure 38:
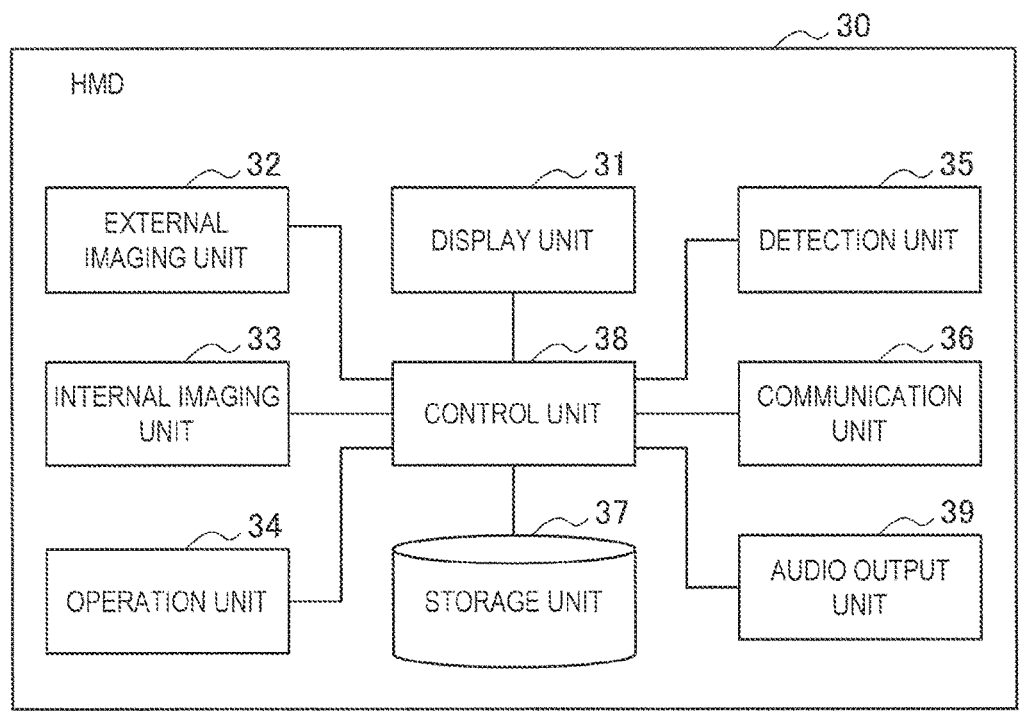
FIG. 38 is a block diagram showing a configuration of a head-mount display (or another information processing device) according to a second embodiment of the present disclosure.

Next, a ninth process example will be described based on FIG. 33. The ninth process example corresponds to a modified example of the first and second process examples.

First, the control unit 26 causes the same image as in the first and second process examples to be displayed. An example of the display is shown in FIG. 33. In this example, the control unit 26 causes the base image display window 171 and the throw image display window 180 to be displayed. In this example, although the various information display window 190 and the cursor 193 are omitted, images thereof may of course be displayed. In addition, the user A is viewing the display device 20. Further, the user A possesses the information processing device 10, and the information processing device 10 transmits throw image information to the display device 20.

The base image display window 171 includes the base image display area 171a and the base image indicator 171b. In the base image display area 171a, the base image information 171c is displayed. The indicator 171b indicates information for identifying base image information, such as the title of base image information. Details thereof are the same as in FIG. 18.

The throw image display window 180 is a window for displaying a throw image. The throw image display window 180 includes the indicator 181 and the throw image display area 182. Details thereof are the same as in FIG. 18. It should be noted that, although the display area switching button 184, the reduction button 185, the enlargement button 186, and the cursor 193 are omitted in this example, images thereof may of course be displayed.

In addition, in this example, the throw image information (i.e., the address image information 182a and the web page 182b) transmitted from the information processing device 10 of the user A (or obtained from context information) is displayed in the throw image display area 182. It should be noted that, instead of the throw image display window, the control unit 26 may cause another window, for example, the window described in the seventh process example, to be displayed.

Then, the imaging unit 23 images the user A, and outputs a captured image to the control unit 26. By detecting a face from the captured image, the control unit 26 recognizes the user A. When the user A starts moving in a direction out of the imaging range of the imaging unit 23, the control unit 26 reduces the throw image display window 180 according to a movement amount of the user A. In addition, when the user A has left the imaging range, the control unit 26 erases the throw image display window 180.

When the user A starts moving in the direction of the arrow P9, the control unit 26 moves the boundary line 183 between the throw image display window 180 and the base image display window 171 in the direction of the arrow P10 according to the movement amount of the user A. According to the movement of the boundary line 183, the control unit 26 also reduces the throw image information in the horizontal direction. In other words, the control unit 26 reduces the throw image display window 180 in the horizontal direction. Further, when the user A has left the imaging range, the control unit 26 causes the boundary line 183 to arrive at the left end of the display unit 21. Accordingly, the control unit 26 erases the throw image display window.

It should be noted that a time lag may be set between the movement of the user A and erasure of the throw image display window 180. In other words, the control unit 26 may erase the throw image display window 180 at a timing later than the timing at which the user A leaves the imaging range.

In addition, the control unit 26 may erase the throw image display window 180 using each of the following methods. For example, the control unit 26 may erase the throw image display window 180 by moving the throw image display window 180 outside the screen. In addition, the control unit 26 may reduce the throw image display window 180 in the vertical direction. Furthermore, the control unit 26 may erase the throw image display window 180 by increasing a degree of transparency of the throw image display window 180. Furthermore, the control unit 26 may allow the user to set whether or not the process is to be performed.

Then, when the user A starts entering the imaging range of the imaging unit 23, the control unit 26 causes the throw image display window 180 to be displayed again according to a movement amount of the user A. Then, when the entire user A (for example, his or her entire face) has entered the imaging range, the control unit 26 returns the throw image display window 180 to the original size.

For example, when the user A starts moving in the direction of the arrow P11 from the outside of the imaging range, the control unit 26 moves the boundary line 183 between the throw image display window 180 and the base image display window 171 in the direction of the arrow P12 according to the movement amount of the user A. According to the movement of the boundary line 183, the control unit 26 also enlarges the throw image information in the horizontal direction. In other words, the control unit 26 enlarges the throw image display window 180 in the horizontal direction. Then, when the entire user A has entered the imaging range, the control unit 26 causes the boundary line

183 to arrive at the original position. Accordingly, the control unit 26 causes the throw image display window to be displayed again.

It should be noted that a time lag may be set between the movement of the user A and display of the throw image display window 180. In other words, the control unit 26 may return the throw image display window 180 to the original size at a timing later than the timing at which the entire user A has entered the imaging range.

In addition, the control unit 26 may cause the throw image display window 180 to be displayed again using each of the following methods. For example, the control unit 26 may cause the throw image display window 180 to be displayed again by moving the throw image display window 180 into the screen from the outside of the screen. In addition, the control unit 26 may cause the throw image display window 180 to be displayed again by enlarging the throw image display window 180 in the vertical direction. Furthermore, the control unit 26 may cause the throw image display window 180 to be displayed again by lowering a degree of transparency of the throw image display window 180. Furthermore, the control unit 26 may allow the user to set whether or not the process is to be performed.

In addition, while the throw image display window 180 is erased, the control unit 26 may temporarily stop reproduction of the throw image information. The control unit 26 may temporarily stop streaming of the base image information. When a time since the user A has left (i.e., left the imaging range) is longer than a predetermined period of time, the control unit 26 may not perform the re-display. Furthermore, the control unit 26 may decide a display position of the throw image display window 180 based on a position in the imaging range at which the user A stands still. Details of the process are preferably the same as the eighth process example.

According to the ninth process example, the display device 20 can display a window when the user thereof is in the imaging range, and thus the window can be prevented from bothering another user when the user thereof is absent.

1-4-10. Tenth Process Example

Next, a tenth process example will be described based on FIG. 35. In the tenth process example, operation authority over each display area of the display unit 21 is set to different users. It should be noted that, in the example shown in FIG. 35, the users A and B are viewing the display device 20. In the tenth process example, the information processing system may or may not include the information processing device 10. When the information processing system includes the information processing device 10, i.e., when users each have different information processing devices 10, the storage unit 25 may store user specification information in which identification information of the information processing devices 10 is associated with user identification information (for example, face images). Accordingly, when remote operation information is given from the information processing device 10 of any user, the control unit 26 can recognize by which user the remote operation information was uttered.

For example, the imaging unit 23 images the users and outputs captured images obtained therefrom to the control unit 26. The control unit 26 detects the users A and B by performing face detection from the captured images, and specifies the positions of the users A and B in the horizontal direction. Then, the control unit 26 gives the user A operation authority of a display area 330 that is in front of the user A, and give the user B operation authority of a display area 340 that is in front of the user B. The control unit 26 gives the users A and B operation authority of a display area 350 that is between the display areas 330 and 340. It should be noted that methods for compartmentalizing display areas and giving operation authority are not limited to this example. For example, the control unit 26 may arbitrarily compartmentalize display areas and give different users operation authority for each display area.

Then, the control unit 26 causes windows 330*a* and 330*b* to be displayed in the display area 330 through a window display instruction operation by the user A, and a window 340*a* to be displayed in the display area 340 through an input operation by the user B.

Here, examples of the window display instruction operation by a user include the same operation (for example, the operation of tapping the throw button 100) as in the first process example and the second process example, various gesture operations, a sound operation (an instruction operation using a vocal utterance), etc. It should be noted that the control unit 26 can determine which user has performed a gesture operation or a sound operation based on the captured image.

In addition, based on a window operation by the user A, the control unit 26 performs a process relating to the windows 330*a* and 330*b* (for example, display of image information, switching of image information, or the like). In addition, based on a window operation by the user B, the control unit 26 performs a process relating to the window 340*a* (for example, display of image information, switching of image information, or the like). Here, as the window operation by a user, in addition to the same operation (for example, the operation of tapping the information processing device 10 by moving the cursor 193 to a desired position within a window) as in the above-described second process example, various gesture operations, a sound operation, or the like is exemplified.

In addition, the control unit 26 moves the windows 330*a* and 330*b* based on a window movement instruction operation by the user A, and moves the window 340*a* based on a window movement instruction operation by the user B. Here, as the window movement instruction operation by a user, in addition to the same operation (for example, the operation of dragging and dropping a window using the cursor 193) as in the above-described second process example, various gesture operations, a sound operation, or the like is exemplified.

In addition, when the window 330*b* enters the display area 350, for example, the control unit 26 turns the window 330*b* into a window 350*a* which can be operated by the users A and B.

As described above, the control unit 26 gives operation authority of a window displayed in a display area to a user who has operation authority of the display area.

According to the tenth process example, the display device 20 compartmentalizes the display area of the display unit 21 into a plurality of display areas (small regions), and associates each of the plurality of display areas with the plurality of information processing devices 10.

Thus, since operation authority is given to each of the display areas, each user can more easily recognize a window over which he or she has operation authority.

1-4-11. Eleventh Process Example

Next, an eleventh process example will be described based on FIGS. 36 and 37. In the eleventh process example, operation authority over each display area of the display unit 21 is set to different users. It should be noted that, in the example shown in FIG. 36, the users A, B, and C are viewing the display device 20, and in the example shown in FIG. 37, the users A and B are viewing the display device 20. In the eleventh process example, the information processing system may or may not include the information processing device 10. When the information processing system includes the information processing device 10, i.e., when users each have different information processing devices 10, the storage unit 25 may store user specification information in which identification information of the information processing devices 10 is associated with user identification information. As the user identification information, the names of the users, face images, or the like are exemplified. Accordingly, when remote operation information is given from the information processing device 10 of any user, the control unit 26 can recognize by which user the remote operation information was uttered.

For example, the imaging unit 23 images the users, and outputs captured images obtained therefrom to the control unit 26. The control unit 26 detects the users A, B, and C by performing face detection from the captured images.

Then, the control unit 26 causes windows 360 to 390 to be displayed as shown in FIG. 36, and gives operation authority over each of the windows to the different users. For example, the control unit 26 gives operation authority over the window 360 to the user A, operation authority over the window 370 to the user C, and operation authority over the window 380 to the users A and B. The control unit 26 gives operation authority over the window 390 to the user B. Then, the control unit 26 causes indicators 361 to 391 to be displayed at ends of the windows 360 to 390. The indicators 361 to 391 indicate the users having the operation authority over the windows 360 to 390.

It should be noted that, although the operation authority over the window 380 is given to the users A and B (i.e., the window 380 is shared by the users A and B), the control unit 26, for example, may give the operation authority to the user A in an initial state. Then, the control unit 26 may also give the operation authority over the window 380 to B through an operation by the user A. For example, the control unit 26 causes a list of users to share the operation authority to be displayed based on a gesture operation (for example, a pointing operation for the window 380) by the user A. Users on the list may be limited to, for example, users included in the captured images. Then, when the user A has selected any user (for example, the user B), the control unit 26 may cause the selected user to share the window 380 with the user A.

As described above, the control unit 26 associates the windows 360 to 390 with the users A, B, and C. Here, when each of the users A, B, and C retains one of the information processing devices 10, the control unit 26 determines a window to be operated according to remote operation information based on the remote operation information transmitted from an information processing device 10 and the user specification information stored in the storage unit 15. Thus, the control unit 26 associates the windows 360 to 390, the users A, B, and C, and their information processing devices 10 with one another.

In addition, based on a window operation by the user A, the control unit 26 performs a process relating to the windows 360 and 380 (for example, display of image information, switching of image information, or the like). In addition, based on a window operation by the user B, the control unit 26 performs a process relating to the windows 381 and 390 (for example, display of image information, switching of image information, or the like). In addition, based on a window operation by the user C, the control unit 26 performs a process relating to the window 370. Details of the window operation are the same as in the tenth process example. Furthermore, based on window movement instruction operations by the users A, B, and C, the control unit 26 moves the windows over which the users A, B, and C have operation authority. A specific process thereof is the same as in the tenth process example.

As described above, the control unit 26 gives operation authority over windows displayed on the display unit 21 to each of the users.

In addition, when the user A moves in the direction of arrow P13 and thus the user A leaves the imaging range as shown in FIG. 37, the control unit 26 cancels the operation authority of the user A. In other words, the control unit 26 cancels the association of the information processing device 10 of the user A and the window. For example, the control unit 26 cancels the operation authority of the user A over the windows 360 and 380.

Further, when there is a window over which no user is set to have operation authority, the control unit 26 gives the operation authority over the window to all users in the imaging range.

For example, when the user A leaves and thus there is no user having the operation authority over the window 360, the control unit 26 gives the operation authority over the window 360 to the users B and C. In other words, the control unit 26 associates the window 360 with the information processing devices 10 of the users other than the user A.

According to the above-described process, the control unit 26 changes display content of the indicators 361 to 391. For example, the control unit 26 causes "Free," i.e., text information indicating that the users B and C have been granted the operation authority, to be displayed in the indicator 361. In addition, the control unit 26 causes identification information of the user B to be displayed in the indicator 381. It should be noted that the control unit 26 may erase the window 360 over which no user is set to have operation authority.

According to the eleventh process example, while performing control of displaying the plurality of windows, the display device 20 associates each of the plurality of windows with each of the plurality of information processing devices 10. Thus, each user can operate the window associated with his or her own information processing device 10, and thus a possibility of confusion of operations is lowered.

Furthermore, when a user of an information processing device 10 fails to be detected, the display device 20 cancels association of the information processing device 10 with the window associated with the information processing device 10. Thus, when a certain user leaves the imaging range, a possibility of the window associated with the user being inoperative is lowered.

Furthermore, the display device 20 associates a window of which the association with an information processing device 10 has been cancelled with an information processing device 10 other than the information processing device 10. Thus, when a certain user leaves the imaging range, a window associated with the user can be operated by another user.

Furthermore, when a user of an information processing device 10 fails to be detected, the display device 20 erases the window associated with the information processing device 10. Thus, a possibility of users being confused is lowered. The above-described process examples may of course be appropriately combined with one another. For example, a window of the eleventh process example may include the throw image display window designated by the user in the first process example.

2. Second Embodiment

Example in which a Head-Mount Display is Added to the First Embodiment

Next, a second embodiment will be described.

2-1. Overall Configuration

First, an overall configuration will be described based on FIGS. 38 to 41, and 49. An information processing system according to the second embodiment includes an information processing device 10, a display device 20, and a head-mount display (hereinafter referred to also as an "HMD") 30. The information processing device 10, the display device 20, and the HMD 30 all perform communication with various servers (for example, a translation server 40, a subtitle server 50, and an ACR server 60).

2-2. Configuration of an HMD

Configurations of the information processing device 10 and the display device 20 are the same as in the first embodiment. Thus, a configuration of the HMD 30 will be described here.

Figure 40:
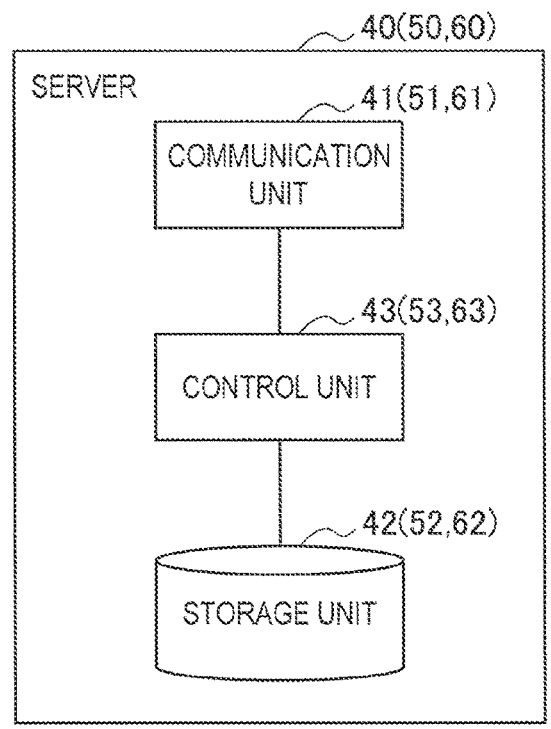
FIG. 40 is a block diagram showing a configuration of a server according to the same embodiment.

The HMD 30 includes a display unit 31, an external imaging unit 32, an internal imaging unit 33, an operation unit 34, a detection unit 35, a communication unit (acquisition unit) 36, a storage unit 37, a control unit 38, and an audio output unit 39 as shown in FIG. 40.

The display unit 31 displays various images according to control of the control unit 38. It should be noted that, since the display unit 31 is a transmissive type, when a user is wearing the HMD 30, he or she can view various objects behind the display unit 31 in addition to image information displayed on the display unit 31. Although the display unit is composed of two sheets, substantially the same image information is displayed on each of the two sheets of the display unit 31. It should be noted that image information may be viewed in stereopsis by displaying image information having parallax on the display unit 31.

The external imaging unit 32 images the front side of the HMD 30, and outputs a captured image obtained therefrom to the control unit 38. An imaging range of the external imaging unit 32 may be adjusted to be substantially the same as the visual field of a user. In addition, the external imaging unit 32 may also perform recording. The internal imaging unit 33 images the point of sight of a user wearing the HMD 30, and outputs a captured image obtained therefrom to the control unit 38.

The operation unit 34 receives an input operation by a user, and outputs operation information obtained therefrom to the control unit 38. The detection unit 35 detects an attitude of the HMD 30 and the like, and outputs detection information regarding the result of detection to the control unit 38. The communication unit 36 performs communication with the information processing device 10 and various servers. The communication unit 36 may perform communication with other devices, for example, the display device 20.

The storage unit 37 stores a program and the like to cause the HMD 30 to realize the display unit 31, the external imaging unit 32, the internal imaging unit 33, the operation unit 34, the detection unit 35, the communication unit 36, the storage unit 37, and the control unit 38. The control unit 38 not only controls the entire HMD 30 but also performs processes to be introduced in process examples to be described below. The audio output unit 39 outputs various kinds of audio information according to control of the control unit 38.

Figure 39:
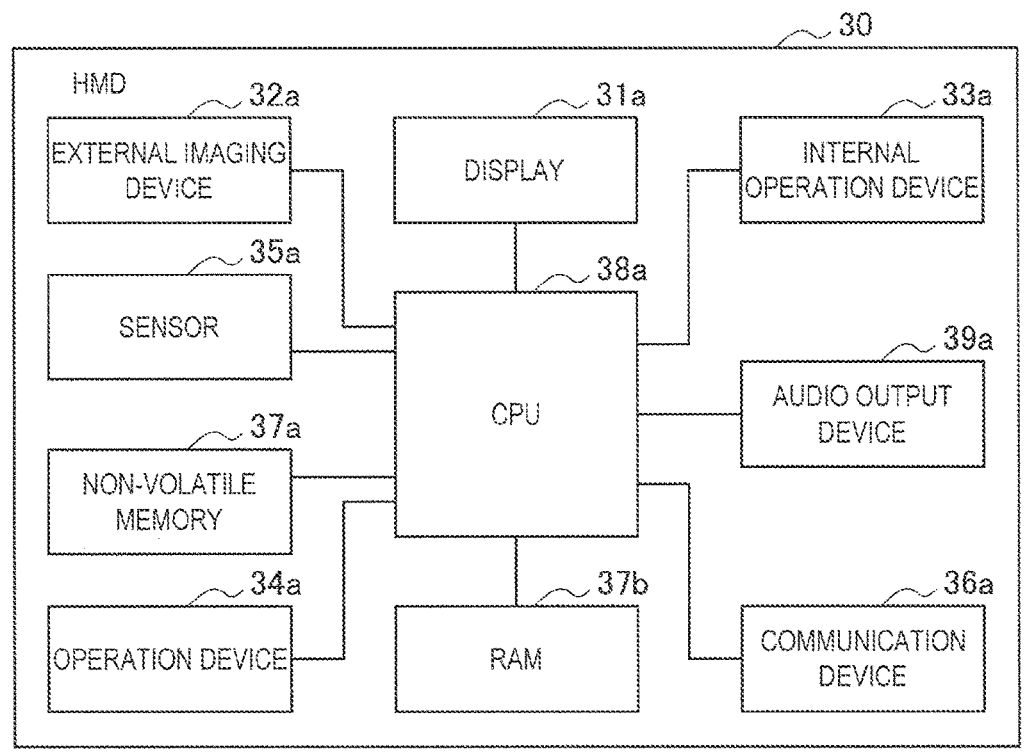
FIG. 39 is a hardware configuration diagram of the head-mount display according to the same embodiment.

The HMD 30 has hardware configurations shown in FIG. 39, and the display unit 31, the external imaging unit 32, the internal imaging unit 33, the operation unit 34, the detection unit 35, the communication unit 36, the storage unit 37, the control unit 38, and the audio output unit 39 described above are realized by the hardware configurations.

In other words, as the hardware configurations, the HMD 30 has a display 31a, an external imaging device 32a, an internal imaging device 33a, an operation device 34a, a sensor 35a, a communication device 36a, a non-volatile memory 37a, a RAM 37b, a CPU 38a, and an audio output device 39a.

The display 31a displays various kinds of image information. The external imaging device 32a images peripheries of the HMD 30. The internal imaging device 33a images the point of sight of a user wearing the HMD 30. The operation device 34a receives input operations from the users. The operation device 34a is preferably a touch panel (touch sensor); however, it may be hard keys, etc. The sensor 35a detects attitudes of the HMD 30 and the like. As a specific example of the sensor 35a, for example, a gyro sensor, an acceleration sensor, or the like is exemplified.

The communication device 36a performs communication with the information processing device 10 and various servers. The non-volatile memory 37a stores various programs, image information, and the like. Here, the programs include the program through which the HMD 30 realizes the display unit 31, the external imaging unit 32, the internal imaging unit 33, the operation unit 34, the detection unit 35, the communication unit 36, the storage unit 37, the control unit 38, and the audio output unit 39. The RAM 37b serves as a work area of the CPU 38a. The CPU 38a reads and executes programs stored in the non-volatile memory 37a. Thus, as the CPU 38a reads and executes the programs stored in the non-volatile memory 37a, the display unit 31, the external imaging unit 32, the internal imaging unit 33, the operation unit 34, the detection unit 35, the communication unit 36, the storage unit 37, the control unit 38, and the audio output unit 39 are realized. In other words, the CPU 38a can be a substantial operation subject of the HMD 30. The audio output device 39a is a device which outputs audio information, and is, for example, a speaker and a headphone.

2-3. Configurations of Servers

Next, configurations of a translation server 40, a subtitle server 50, and an ACR server 60 used in the second embodiment will be described based on FIGS. 40 and 41.

The translation server 40 includes a communication unit 41, a storage unit 42, and a control unit 43 as shown in FIG. 40. The communication unit 36 performs communication with the information processing device 10, the display device 20, the HMD 30, and the like. The storage unit 42 stores programs for realizing the communication unit 41, the storage unit 42, and the control unit 43, various kinds of translation information (information in which text having the same meaning in languages such as English, Japanese, and the like is associated), and the like in the translation server 40. The control unit 43 controls the entire translation server 40 and performs processes to be introduced in each process example described below.

Figure 41:
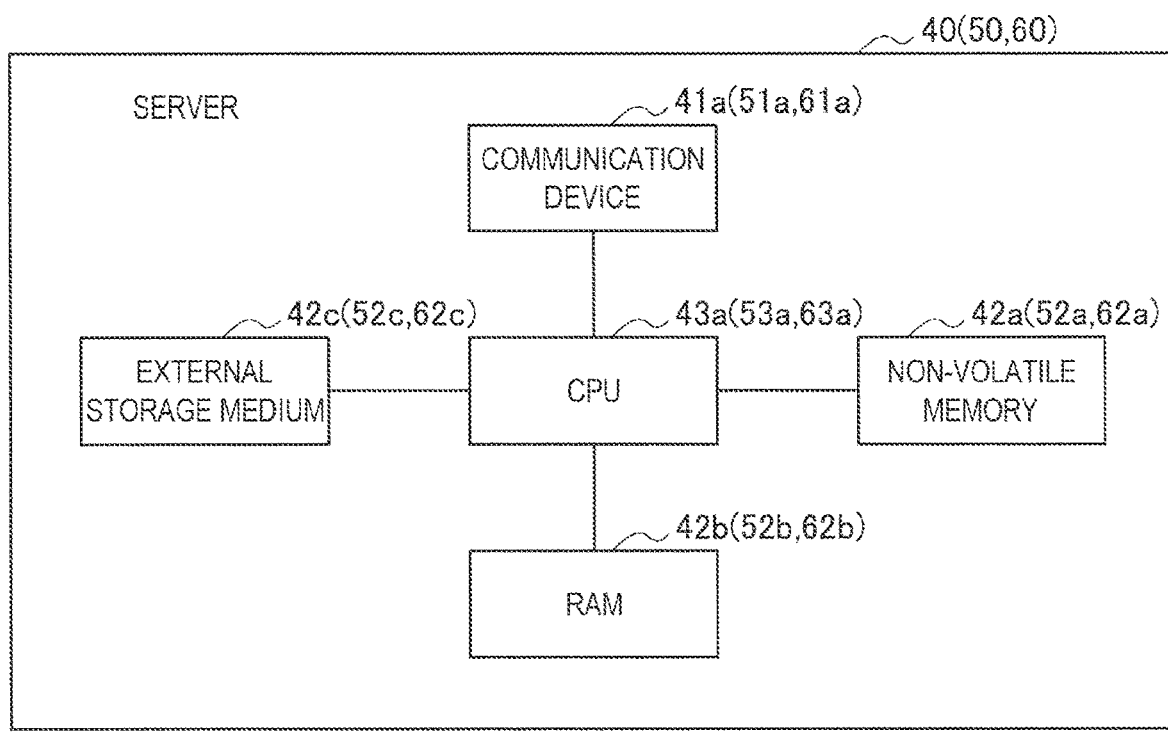
FIG. 41 is a hardware configuration diagram of the server according to the same embodiment.

The translation server 40 has the hardware configurations shown in FIG. 41, and these hardware configurations realize the above-described communication unit 41, storage unit 42, and control unit 43. In other words, the translation server 40 includes, as the hardware configurations, a communication device 41*a*, a non-volatile memory 42*a*, a RAM 42*b*, an external storage medium 42*c*, and a CPU 43*a*.

The communication device 41*a* performs communication with the information processing device 10, the display device 20, the HMD 30, and the like. The non-volatile memory 42*a* stores various programs, and the like. Here, the programs include the program through which the translation server 40 realizes the communication unit 41, the storage unit 42, and the control unit 43. The RAM 42*b* serves as a work area of the CPU 43*a*. The external storage medium 42*c* stores translation information and the like. The CPU 43*a* reads and executes the programs stored in the non-volatile memory 42*a*. Thus, as the CPU 43*a* reads and executes the programs stored in the non-volatile memory 42*a*, the communication unit 41, the storage unit 42, and the control unit 43 are realized. In other words, the CPU 43*a* can be a substantial operation subject of the translation server 40.

The subtitle server 50 includes a communication unit 51, a storage unit 52, and a control unit 53 as shown in FIG. 40. The communication unit 51 performs communication with the information processing device 10, the display device 20, the HMD 30, and the like. The storage unit 52 stores programs for realizing the communication unit 51, the storage unit 52, and the control unit 53, subtitle specifying information (information in which content IDs and subtitle information (relevant information) are associated), and the like in the subtitle server 50. The control unit 53 controls the entire subtitle server 50, and performs a process to be introduced in each process example to be described below.

The subtitle server 50 has the hardware configurations shown in FIG. 41, and these hardware configurations realize the above-described communication unit 51, storage unit 52, and control unit 53. In other words, the subtitle server 50 includes, as the hardware configurations, a communication device 51*a*, a non-volatile memory 52*a*, a RAM 52*b*, an external storage medium 52*c*, and a CPU 53*a*.

The communication device 51*a* performs communication with the information processing device 10, the display device 20, the HMD 30, and the like. The non-volatile memory 52*a* stores various programs, and the like. Here, the programs include the program through which the subtitle server 50 realizes the communication unit 51, the storage unit 52, and the control unit 53. The RAM 52*b* serves as a work area of the CPU 53*a*. The external storage medium 52*c* stores subtitle specifying information and the like. The CPU 53*a* reads and executes the programs stored in the non-volatile memory 52*a*. Thus, as the CPU 53*a* reads and executes the programs stored in the non-volatile memory 52*a*, the communication unit 51, the storage unit 52, and the control unit 53 are realized. In other words, the CPU 53*a* can be a substantial operation subject of the subtitle server 50.

The automatic content recognition (ACR) server 60 includes a communication unit 61, a storage unit 62, and a control unit 63 as shown in FIG. 40. The communication unit 61 performs communication with the information processing device 10, the display device 20, the HMD 30, and the like. The storage unit 62 stores programs for realizing the communication unit 61, the storage unit 62, and the control unit 63, content ID specifying information (information in which image information and audio information are associated with content IDs), and the like in the ACR server 60. The storage unit 62 may store additional information specifying information (information in which content IDs are associated with additional information). When the image information is video content such as a drama, the additional information may be, for example, performer information, related content, advertisements, scores (evaluations), and the like. In addition, when the image information is a sports program, the additional information may be player information and the like. This is information describing the content of image information (performer information and the like). The control unit 63 controls the entire ACR server 60, and performs a process to be introduced in each process example to be described below.

The ACR server 60 has the hardware configurations shown in FIG. 41, and these hardware configurations realize the above-described communication unit 61, storage unit 62, and control unit 63. In other words, the ACR server 60 includes, as the hardware configurations, a communication device 61*a*, a non-volatile memory 62*a*, a RAM 62*b*, an external storage medium 62*c*, and a CPU 63*a*.

The communication device 61*a* performs communication with the information processing device 10, the display device 20, the HMD 30, and the like. The non-volatile memory 62*a* stores various programs, and the like. Here, the programs include the program through which the ACR server 60 realizes the communication unit 61, the storage unit 62, and the control unit 63. The RAM 62*b* serves as a work area of the CPU 63*a*. The external storage medium 62*c* stores content ID specifying information and the like. The CPU 63*a* reads and executes the programs stored in the non-volatile memory 62*a*. Thus, when the CPU 63*a* reads and executes the programs stored in the non-volatile memory 62*a*, the communication unit 61, the storage unit 62, and the control unit 63 are realized. In other words, the CPU 63*a* can be a substantial operation subject of the ACR server 60.

2-4. Process Examples of an Information Processing System 2-4-1. First Process Example Next, a first process example will be described based on FIGS. 42, and 50 to 54. In first to fourth process examples, when a user wearing the HMD 30 is viewing the display device 20, subtitle information is displayed on the display unit 31.

Figure 42:
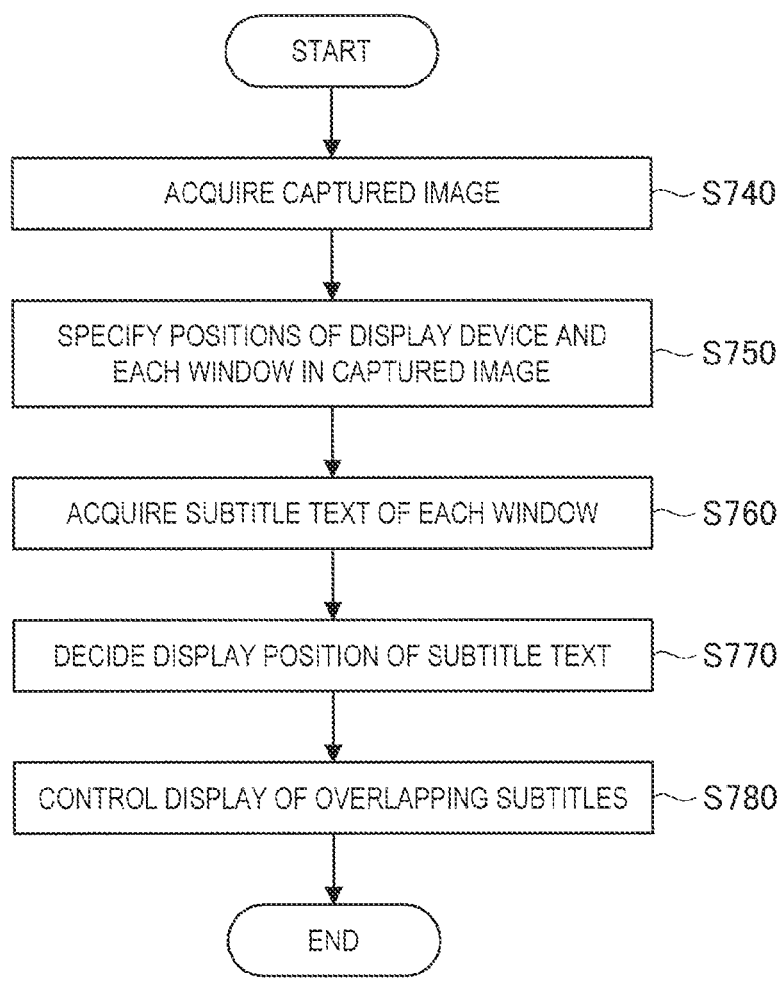
FIG. 42 is a flowchart showing the procedure of a process by an information processing system.
Figure 43:
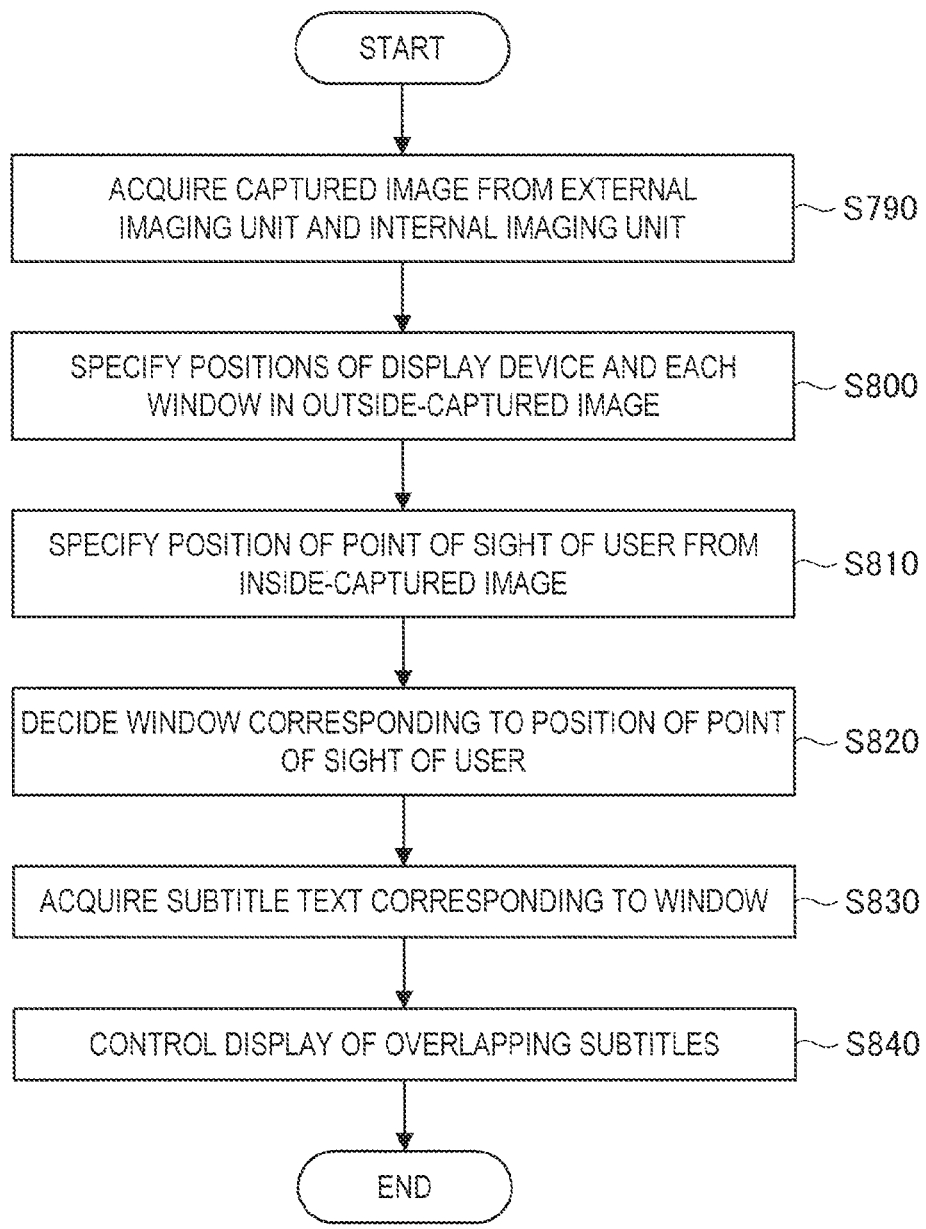
FIG. 43 is a flowchart showing the procedure of a process by an information processing system.
Figure 44:
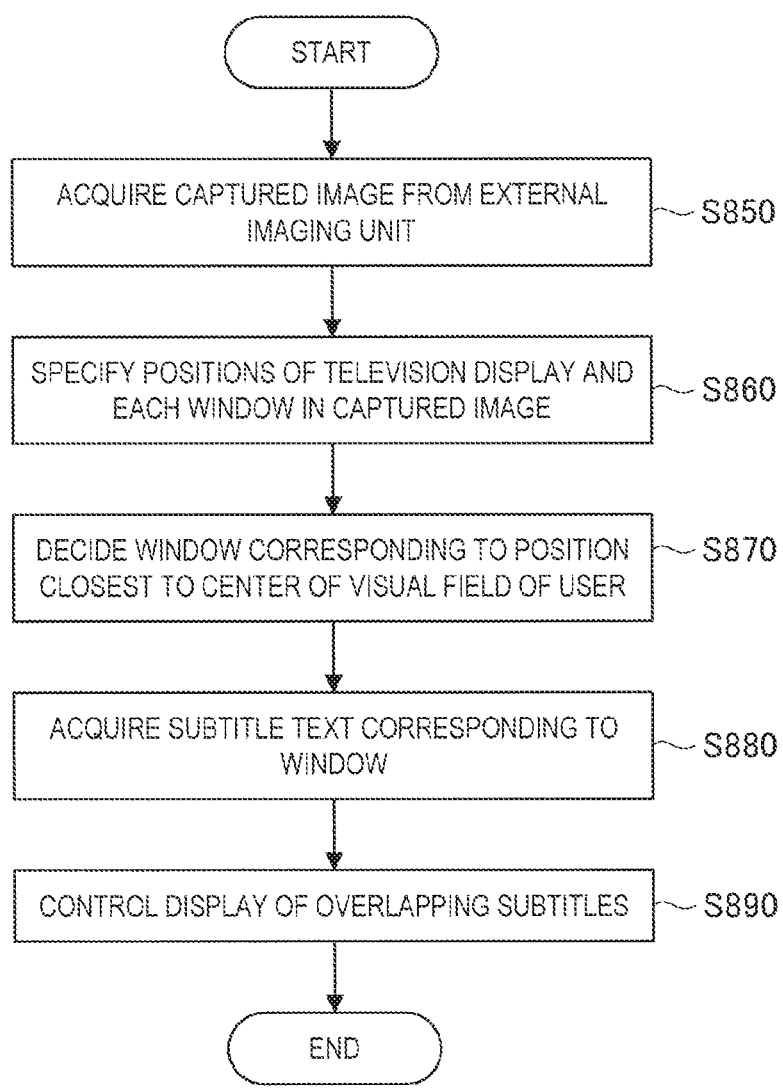
FIG. 44 is a flowchart showing the procedure of a process by an information processing system.

In Step S740 shown in FIG. 42, the external imaging unit 32 of the HMD 30 images the display unit 21 of the display device 20, and outputs a captured image obtained therefrom to the control unit 38.

In Step S750, the control unit 38 specifies positions of the display device 20 and each window in the captured image.

In Step S760, the control unit 38 acquires subtitle information (subtitle text information and relevant information) of each window. The control unit 38 may acquire not only the subtitle information but also various kinds of additional information (information describing content of image information and the like). Specific process content will be described below.

In Step S770, the control unit 38 decides a display position of the subtitle information based on the positions of the display device 20 and each window in the captured image. Specifically, the control unit 38 decides a display position of the subtitle information such that the subtitle information overlaps image information corresponding to the subtitle information. In Step S780, the control unit 38 controls display of the subtitle information. The control unit 38 may cause the subtitle information to be displayed by adjusting, for example, a font size, a position of a frame or a balloon (relative position with respect to a window), a shape, a color, a type of animation (or whether or not to include animation) of the subtitle information, and the like. The same also applies to the additional information.

Figure 46:
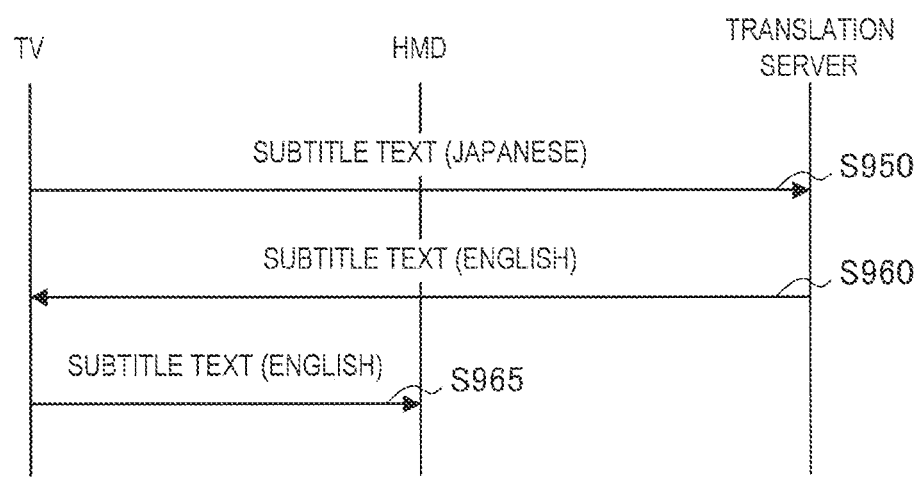
FIG. 46 is a sequence diagram showing the procedure of a process by the information processing system.
Figure 47:
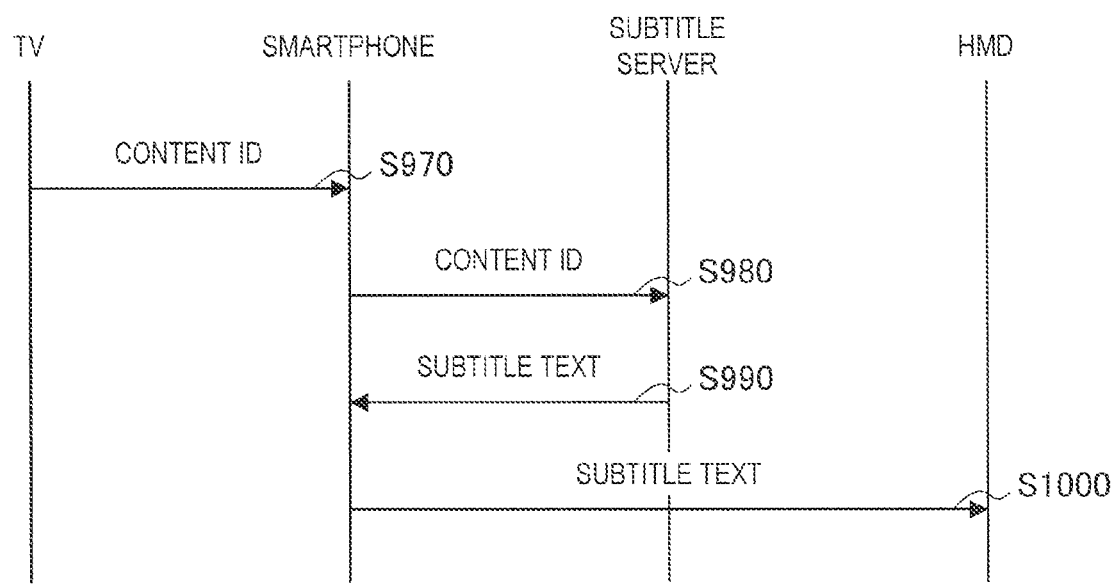
FIG. 47 is a sequence diagram showing the procedure of a process by the information processing system.
Figure 48:
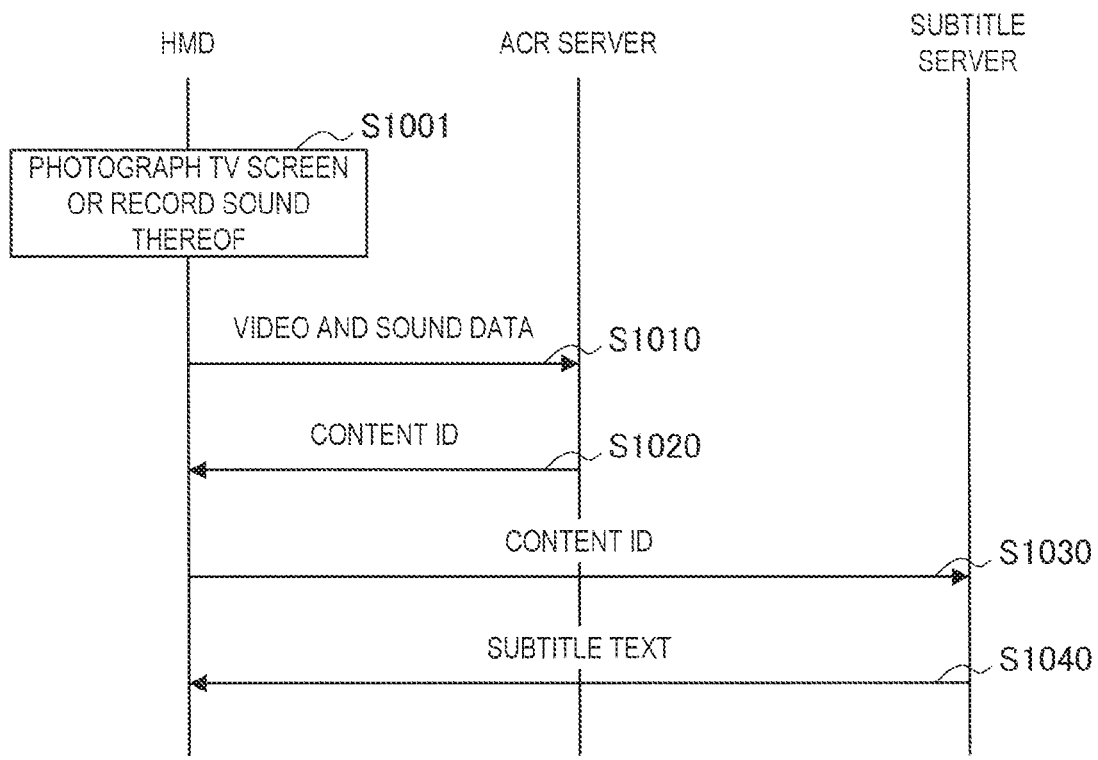
FIG. 48 is a sequence diagram showing the procedure of a process by the information processing system.
Figure 49:
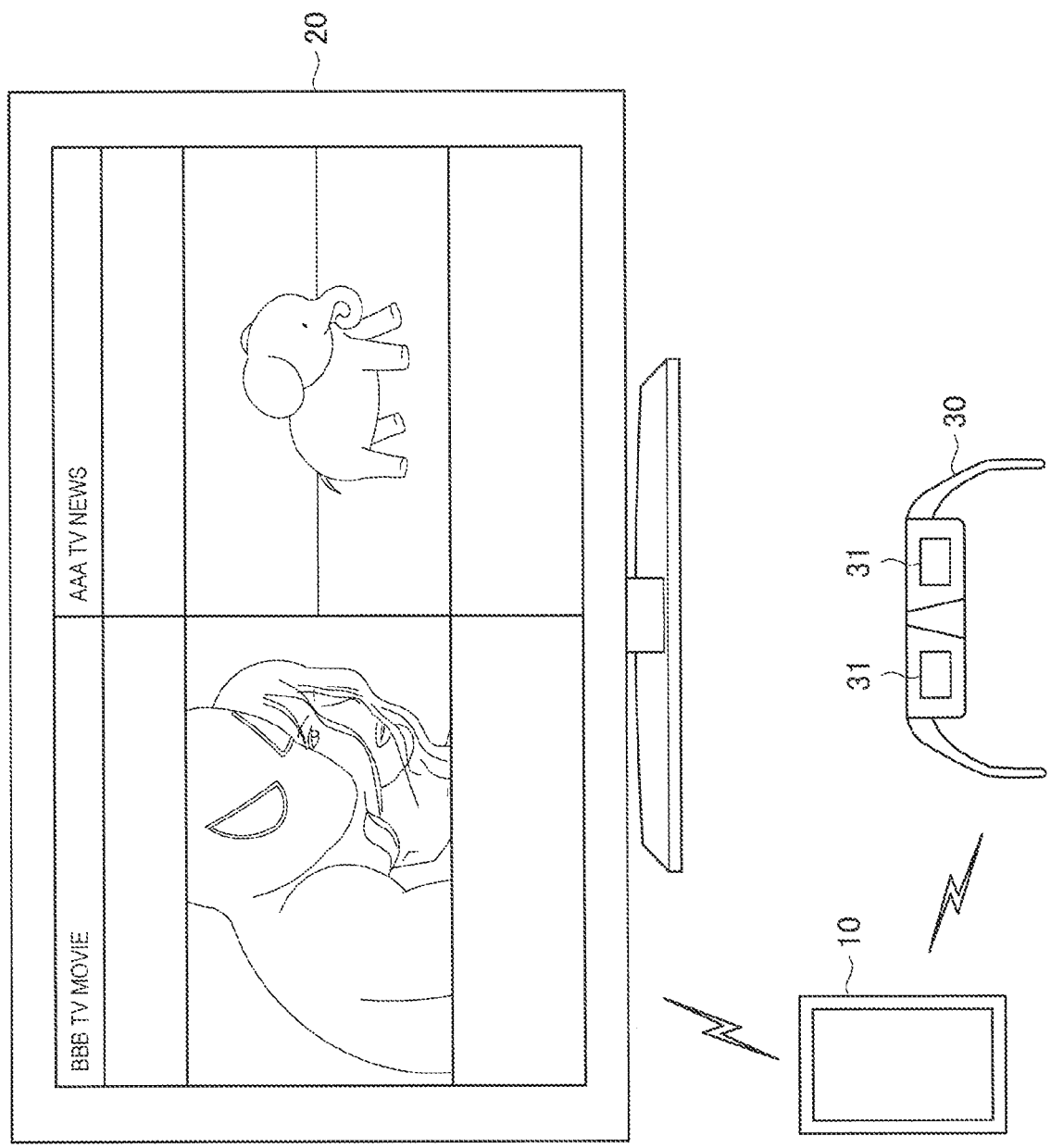
FIG. 49 is an illustrative diagram showing an overall configuration of an information processing system.

Here, the HMD 30 may acquire the subtitle information through any of processes shown in FIGS. 46 to 48.

For example, in Step S950 shown in FIG. 46, the control unit 26 of the display device 20 (a TV) transmits subtitle information (Japanese) corresponding to image information currently being displayed to the translation server 40. In Step S960, the control unit 43 of the translation server 40 acquires subtitle information (English or an arbitrary foreign language) corresponding to the foregoing subtitle information (Japanese), and transmits the information to the display device 20. In Step S965, the control unit 26 of the display device 20 transmits the subtitle information (English or the arbitrary foreign language) to the HMD 30.

For example, in Step S970 shown in FIG. 47, the control unit 26 of the display device 20 (a TV) transmits a content ID corresponding to image information currently being displayed to the information processing device 10 (a smartphone). In Step S980, the control unit 16 of the information processing device 10 transmits the content ID to the subtitle server 50. In Step S990, the control unit 53 of the subtitle server 50 transmits subtitle information corresponding to the content ID to the information processing device 10. In Step S1000, the control unit 16 of the information processing device 10 transmits the subtitle information to the HMD 30.

For example, in Step S1001 shown in FIG. 48, the external imaging unit 32 of the HMD 30 acquires a captured image (video) by imaging the display unit 21 (a TV screen) of the display device 20. The external imaging unit 32 may record audio information (sound data) output from the display device 20 instead of acquiring a captured image (video). In addition, the control unit 38 may acquire audio information from the display device 20. The external imaging unit 32 outputs the captured image or the audio information to the control unit 38.

In Step S1010, the control unit 38 transmits the captured image or the audio information to the ACR server 60. In Step S1020, the control unit 63 of the ACR server 60 transmits a content ID corresponding to the captured image or the audio information to the HMD 30. In Step S1030, the control unit 38 of the HMD 30 transmits the content ID to the subtitle server 50. In Step S1040, the control unit 53 of the subtitle server 50 transmits subtitle information corresponding to the content ID to the HMD 30.

Figure 50:
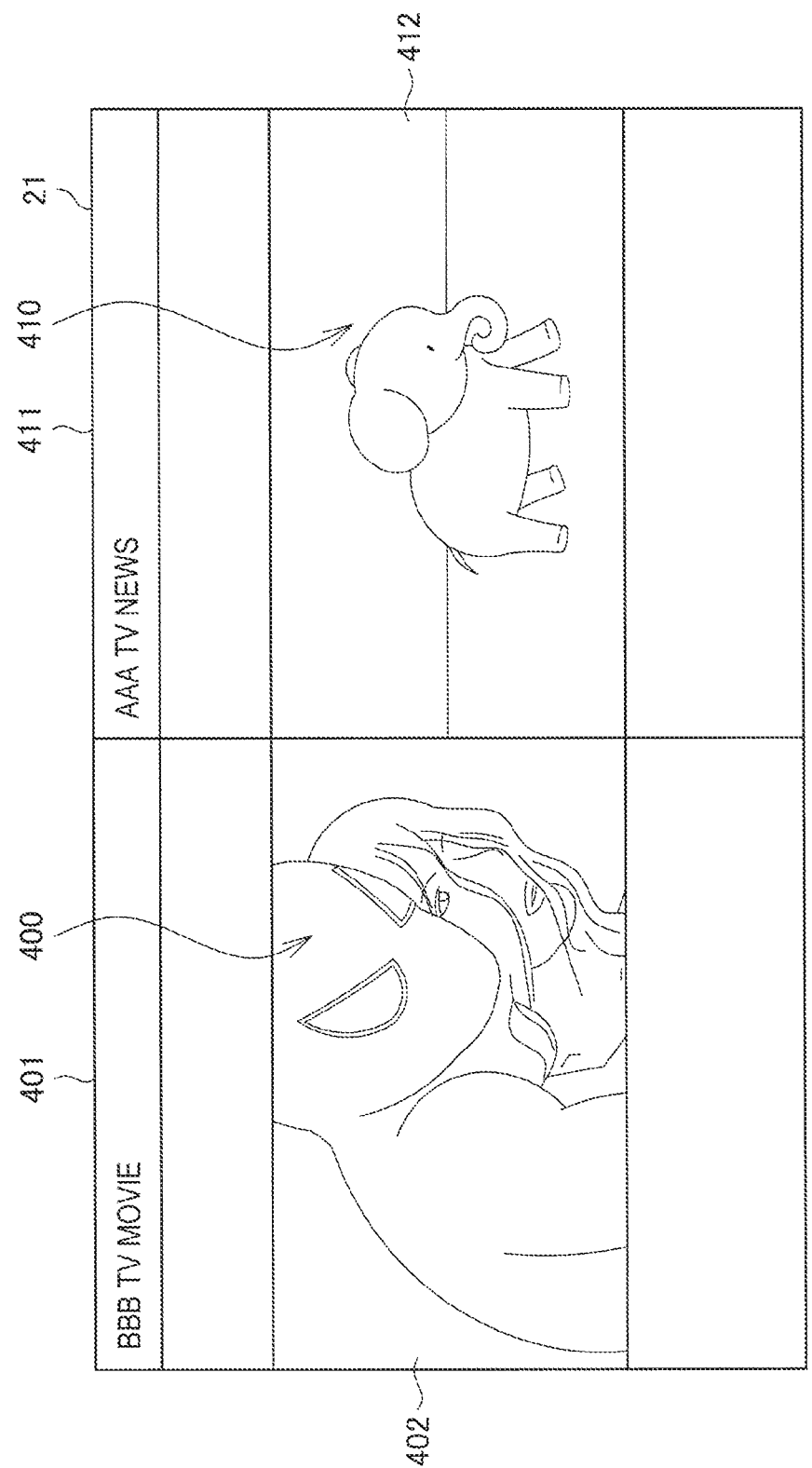
FIG. 50 is an illustrative diagram showing an example of display by a display device.

An example of the process will be described based on FIGS. 50 and 51. The display device 20 is displaying windows 400 and 410. The window 400 includes an indicator 401 and an image information display area 402. The indicator 401 displays information for identifying the content being displayed in the image information display area 402. In the image information display area 402, image information is displayed. The window 410 includes an indicator 411 and an image information display area 412. The indicator 411 displays information for identifying the content being displayed in the image information display area 412. In the image information display area 412, image information is displayed.

Figure 51:
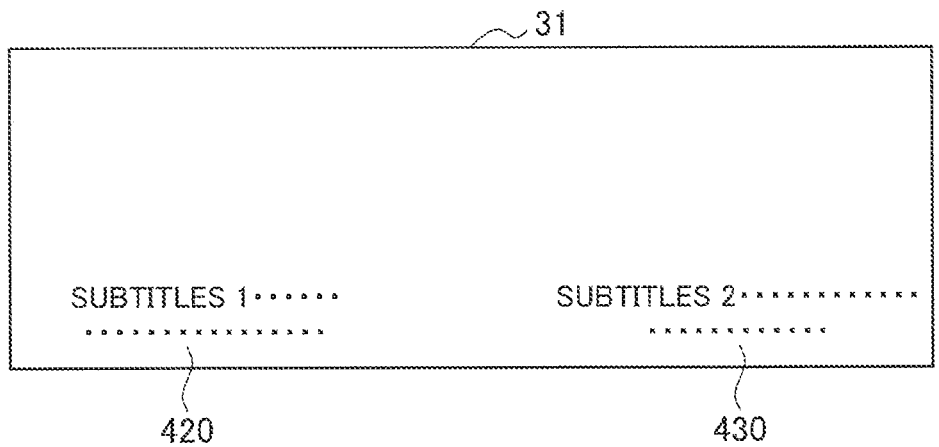
FIG. 51 is an illustrative diagram showing an example of display by a head-mount display.

On the other hand, the HMD 30 displays subtitle information 420 corresponding to the window 400 at a position on the display unit 31 overlapping the window 400, and displays subtitle information 430 corresponding to the window 410 at a position overlapping the window 410 as shown in FIG. 51.

According to the first process example, the display device 20 can transmit relevant information relating to the image information being displayed on the windows, i.e., subtitle information to the HMD 30. Thus, the HMD 30 can display the relevant information, for example, subtitle information and relevant information.

In addition, according to the first process example, the subtitle information is displayed on the HMD 30, and thus more personal subtitle information (which can only be viewed by the user wearing the HMD 30) can be displayed. The first process example is particularly preferable when, for example, a number of windows are displayed on the display device 20 and a number of users view different windows (i.e., different image information). In other words, if the users wear HMDs 30, subtitle information with regard to the windows that the users are viewing is displayed in the HMDs 30 of the users, and thus each of the users can more easily ascertain subtitle information that he or she wants to know.

2-4-2. Second Process Example

Next, a second process example will be described based on FIGS. 43, 50, 52, and 53. In Step S790 shown in FIG. 43, the external imaging unit 32 of the HMD 30 images the display unit 21 of the display device 20, and outputs an outside-captured image obtained therefrom to the control unit 38. On the other hand, the internal imaging unit 33 images a point of sight of the user wearing the HMD 30, and outputs an inside-captured image obtained therefrom to the control unit 38.

In Step S800, the control unit 38 specifies positions of the display device 20 and each window in the outside-captured image. In Step S810, the control unit 38 specifies a position of the point of sight (direction of the line of sight) of the user from the inside-captured image.

In Step S820, the control unit 38 specifies a window corresponding to the position of the point of sight of the user, i.e., a window that the user is viewing based on the results of Steps S800 and S810.

In Step S830, the control unit 38 acquires subtitle information (subtitle text information and relevant information) of each window. Details of the process are as described above. The control unit 38 may acquire not only the subtitle information but also various kinds of additional information (information describing content of image information and the like). Details of the process will be described below. In Step S840, the control unit 38 controls display of the subtitle information.

Figure 52:
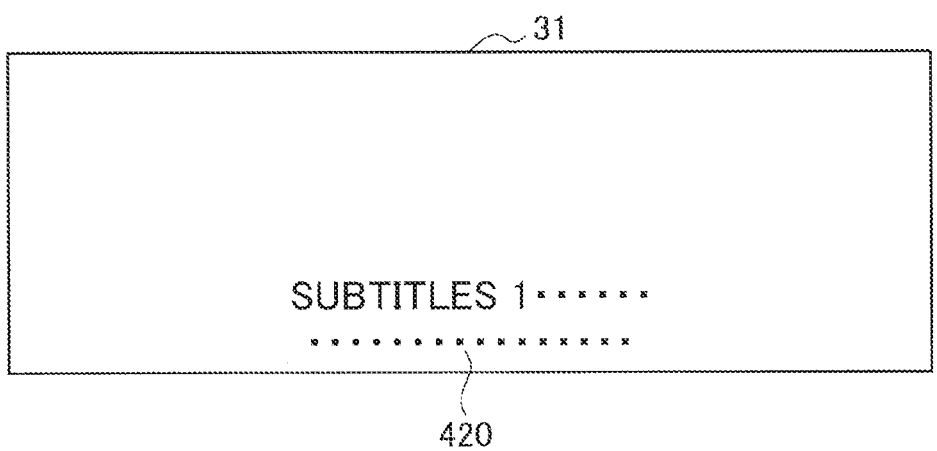
FIG. 52 is an illustrative diagram showing an example of display by a head-mount display.
Figure 53:
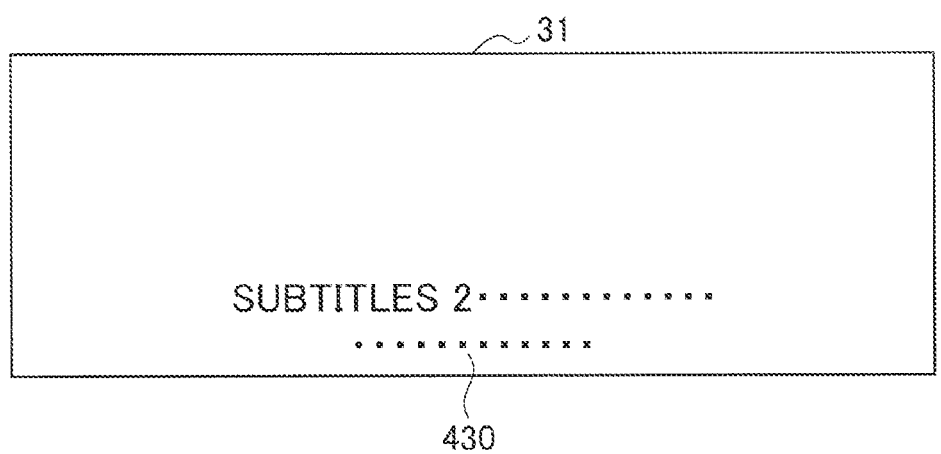
FIG. 53 is an illustrative diagram showing an example of display by a head-mount display.

An example of the process will be described based on FIGS. 50, 52, and 53. As shown in FIG. 50, the display device 20 is displaying the windows 400 and 410. Then, when the user wearing the HMD 30 is viewing the window 400, the HMD 30 acquires the subtitle information 420 corresponding to the window 400. Then, as shown in FIG. 52, the HMD 30 displays the subtitle information 420 corresponding to the window 400 on the display unit 31. On the other hand, when the user is viewing the window 410, the HMD 30 acquires the subtitle information 430 corresponding to the window 410. Then, the HMD 30 displays the subtitle information 430 corresponding to the window 410 on the display unit 31 as shown in FIG. 53.

According to the second process example, each user can more easily ascertain subtitle information that he or she wants to know.

2-4-3. Third Process Example

Next, a third process example will be described based on FIGS. 44, 50, 52, and 53. In Step S850 shown in FIG. 44, the external imaging unit 32 of the HMD 30 images the display unit 21 of the display device 20, and outputs a captured image obtained therefrom to the control unit 38.

In Step S860, the control unit 38 specifies positions of the display device 20 and each window in the captured image. In Step S870, the control unit 38 specifies the window at the position closest to the center of the visual field of the user based on the captured image.

In Step S880, the control unit 38 acquires subtitle information (subtitle text information and relevant information) of the window at the center of the visual field of the user based on the results of Steps S860 and S870. Details of the process are as described above. The control unit 38 may acquire not only the subtitle information but also various kinds of additional information (information describing content of image information, and the like). Details of the process will be described below. In Step S890, the control unit 38 controls display of the subtitle information.

An example of the process will be described based on FIGS. 50, 52, and 53. The display device 20 is displaying the windows 400 and 410 as shown in FIG. 50. In addition, when the window 400 is at the center of the visual field of the user wearing the HMD 30, the HMD 30 acquires the subtitle information 420 corresponding to the window 400. Then, the HMD 30 displays the subtitle information 420 corresponding to the window 400 on the display unit 31 as shown in FIG. 52. On the other hand, when the window 410 is at the center of the visual field of the user, the HMD 30 acquires the subtitle information 430 corresponding to the window 410. Then, the HMD 30 displays the subtitle information 430 corresponding to the window 410 on the display unit 31 as shown in FIG. 53.

According to the third process example, each user can more easily ascertain subtitle information that he or she wants to know.

2-4-4. Fourth Process Example

Figure 45:
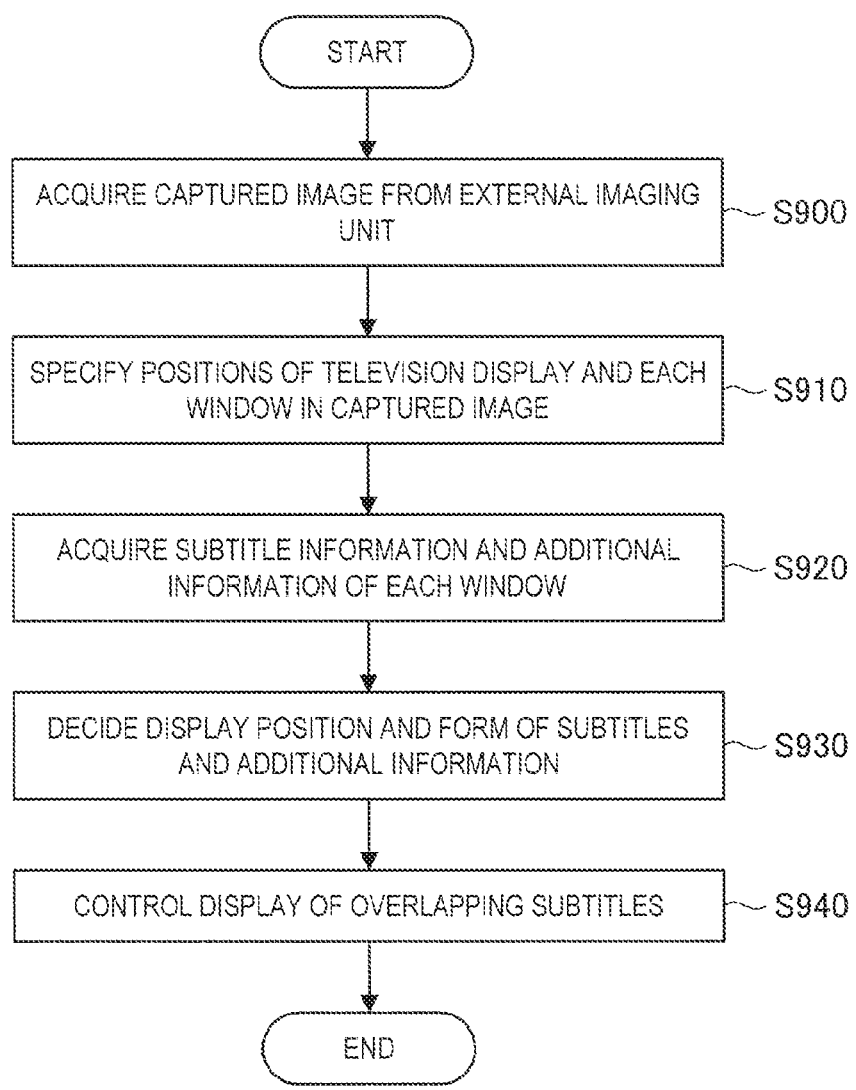
FIG. 45 is a flowchart showing the procedure of a process by an information processing system.
Figure 54:
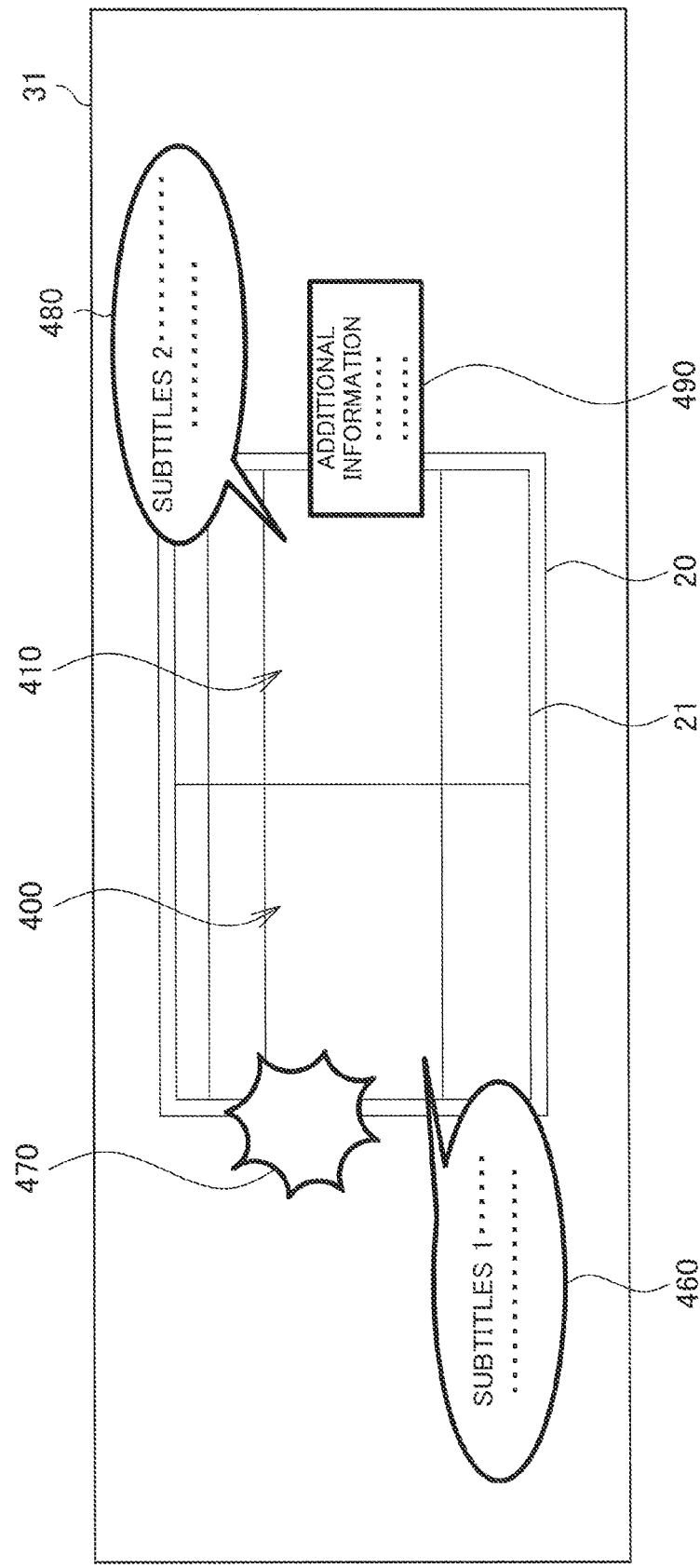
FIG. 54 is an illustrative diagram showing an example of display by a head-mount display.

Next, a fourth process example will be described based on FIGS. 45, 50, and 54. In Step S900 shown in FIG. 45, the external imaging unit 32 of the HMD 30 images the display unit 21 of the display device 20, and outputs a captured image obtained therefrom to the control unit 38.

In Step S910, the control unit 38 specifies positions of the display device 20 and each window in the captured image.

In Step S920, the control unit 38 acquires subtitle information (subtitle text information and relevant information) and additional information of each window. A method for acquiring the subtitle information is as described above. The control unit 38 may acquire the additional information together with a content ID according to the flow shown in FIG. 48.

In Step S930, the control unit 38 decides display positions of the subtitle information and the additional information based on the positions of the display device 20 and each window in the captured image. Specifically, the control unit 38 decides a display position of the subtitle information so that the subtitle information and the additional information overlap image information corresponding to the subtitle information and the additional information In Step S940, the control unit 38 controls display of the subtitle information.

An example of the process will be described based on FIGS. 50 and 54. The display device 20 is displaying the windows 400 and 410. The user wearing the HMD 30 is viewing the windows 400 and 410. The HMD 30 may display subtitle information 460 and 480 having balloons, sound effect information 470 corresponding to a sound effect, and additional information 490 so that the information overlaps windows corresponding thereto. The sound effect information is one type of additional information. In this example, the subtitle information 460 and the sound effect information 470 correspond to the window 400, and the subtitle information 480 and the additional information 490 correspond to the window 410. The control unit 38 may display the subtitle information and the like at a position overlapping or not overlapping the display device 20.

According to the fourth process example, each user can more easily ascertain subtitle information that he or she wants to know.

In the first to fourth process examples described above, when a window designated by the user in the first and second process example (throw) or the sixth process example (sound or gesture operation) of the first embodiment is displayed, the control unit 38 may perform the following process. In other words, the control unit 38 may keep displaying subtitle information and additional information corresponding to the window.

In addition, in the first to fourth process examples described above, the control unit 38 of the HMD 30 may output audio information of at least one window among a plurality of windows from the audio output unit 39. In addition, the control unit 38 of the HMD 30 may cause subtitle information of at least one window among the remaining windows to be displayed on the display unit 31. A window of which audio information is output by the display device 20 may be set in advance, or may be a window of which subtitles are not being displayed or a window that no user is viewing. A user may be able to arbitrarily select a process among the first to fourth process examples to be performed.

2-4-5. Fifth Process Example

Next, a fifth process example will be described based on FIGS. 55 and 56. In the fifth process example, a display unit which will display subtitle information is decided based on a use state of the HMD 30. It should be noted that the same process may be applied to additional information.

Specifically, the external imaging unit 32 of the HMD 30 images the front side of the HMD 30 (the visual field of the user), and outputs a captured image obtained therefrom to the control unit 38. The control unit 38 determines whether or not the user is viewing the display device 20 based on the captured image. When the user is determined to be viewing the display device 20, the control unit 38 transmits subtitle information display request information to the display device 20. The control unit 26 of the display device 20 acquires subtitle information according to the flow shown in FIG. 46, and displays the information on the display unit 21. On the other hand, when the user is determined not to be viewing the display device 20, the control unit 38 acquires subtitle information using the above-described method, and displays the information on the display unit 31.

Figure 55:
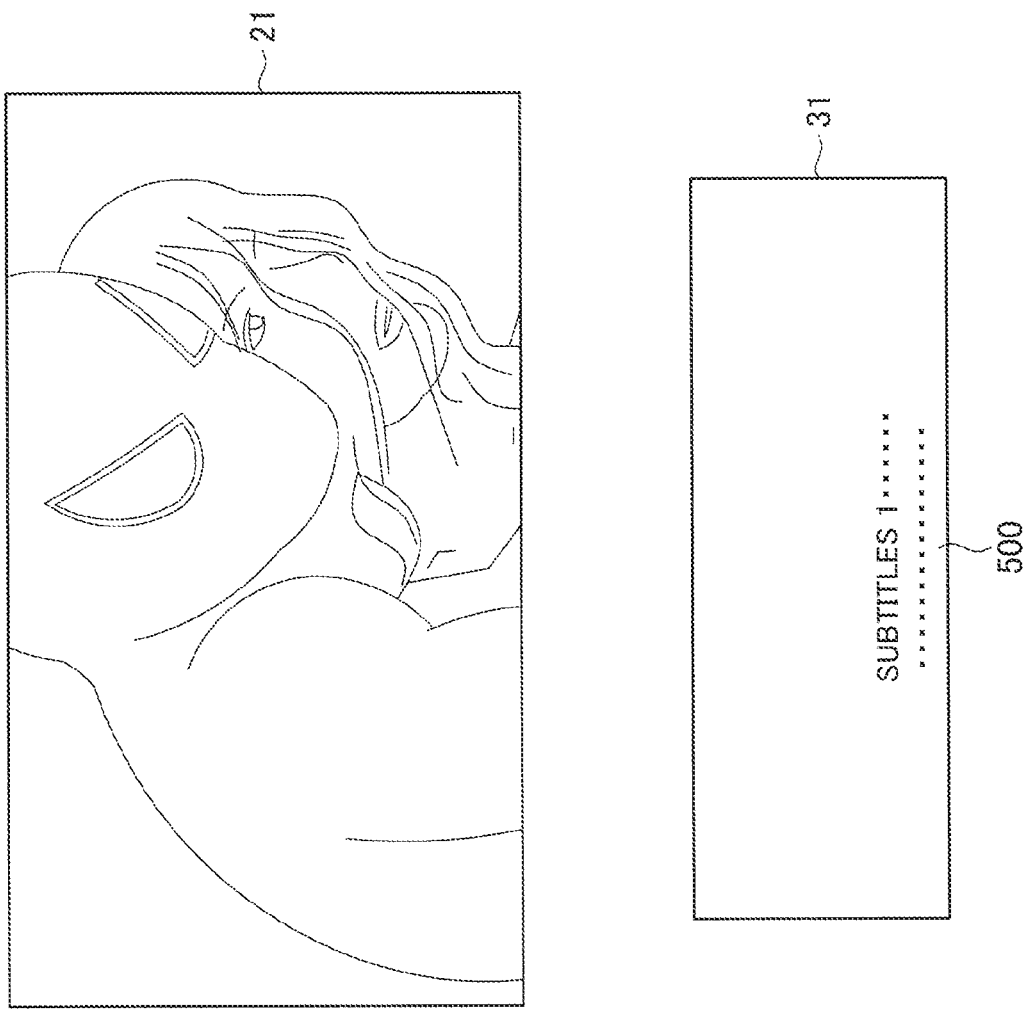
FIG. 55 is an illustrative diagram showing an example of display by a display device and a head-mount display.
Figure 56:
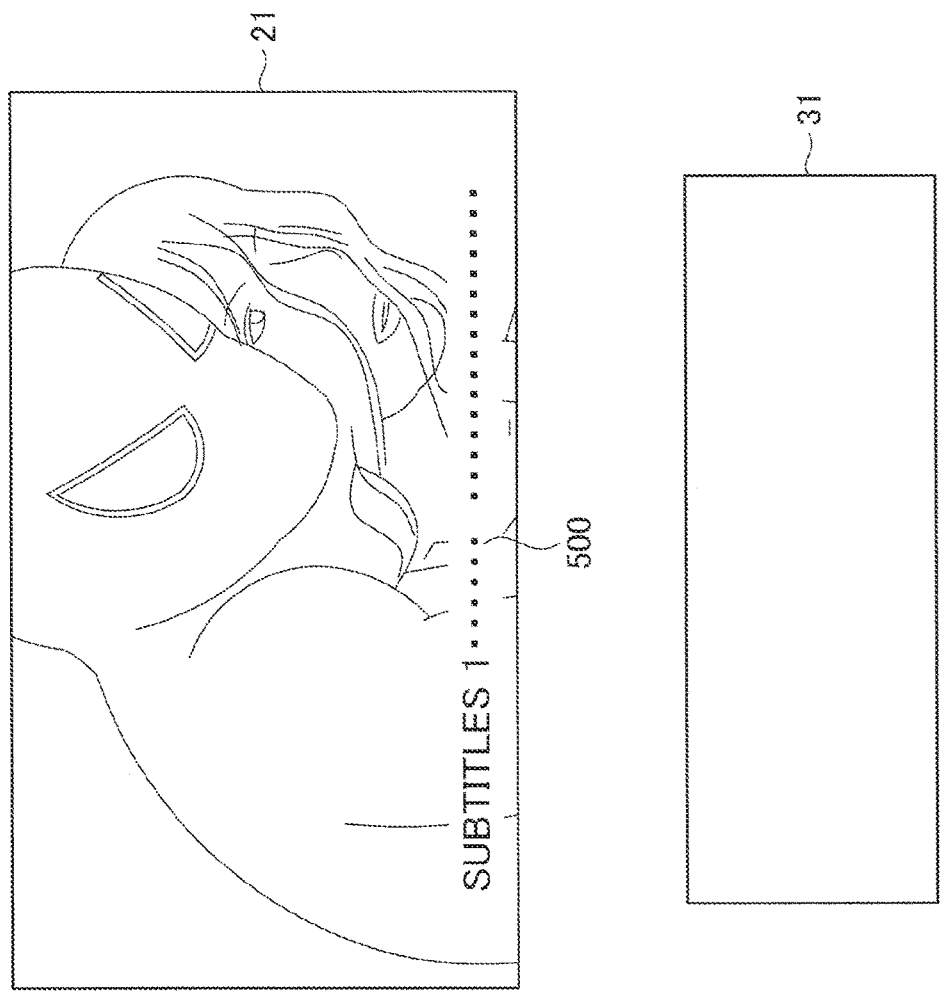
FIG. 56 is an illustrative diagram showing an example of display by a display device and a head-mount display.

An example of the process is shown in FIGS. 55 and 56. When the user is not viewing the display device 20, the HMD 30 displays subtitle information 500 (which corresponds to image information being displayed on the display device 20) on the display unit 31 as shown in FIG. 55. On the other hand, when the user is viewing the display device 20, the control unit 26 of the display device 20 causes the subtitle information 500 to be displayed on the display unit 21.

It should be noted that the control unit 38 may vary output methods of subtitle information and audio information according to whether or not a user wearing the HMD 30 is viewing the display device 20. For example, when the user is viewing the display device 20, the control unit 38 may output audio information in a first language (for example, English), and subtitle information in a second language (for example, Japanese). In addition, when the user is not viewing the display device 20, the control unit 38 may output audio information in the second language (for example, Japanese), and subtitle information in the first language (for example, English). A place for output may be decided, for example, in the same manner as in the above-described fifth process example. It should be noted that a place for output may be set to the display device 20 or the information processing device 10. In this case, the control units 16 and 26 perform output control. In addition, in this case, the information processing system may not have the HMD 30.

In addition, the control unit 38 may cause subtitle information to be displayed on the display unit 31 when a user is wearing the HMD 30, and subtitle information to be displayed on the display unit 21 when the user is not wearing the HMD 30.

According to the fifth process example, information that is presumed to be more necessary to users can be provided. The fifth process example may be combined with the first to fourth process examples.

2-4-6. Sixth Process Example

Next, a sixth process example will be described. In the sixth process example, an output destination of audio information and image information is changed for each piece of image information (or each genre of image information).

An example of correspondence between a genre of image information and an output destination is shown in FIG. 57. This table may be stored in any of, for example, the information processing device 10, the display device 20, and the HMD 30. When the table is stored in the storage unit 37 of the HMD 30, for example, the control unit 38 decides an output destination. In addition, the control unit 38 decides an output destination of audio information and subtitle information, and causes the audio information and the subtitle information to be output to the decided output destination. It should be noted that this table may include other information, for example, correspondence between genres of image information and kinds of languages (kinds such as Japanese and English), and volumes of subtitle information (whether it is simple or full). In this case, the subtitle server 50 stores a simple version of subtitle information and a full version of subtitle information. According to the table, the control unit 38 decides an output destination of the audio information and subtitle information, and decides a kind of language and volume of the subtitle information. Then, the control unit 38 acquires the subtitle information of the decided kind of language and volume (a specific acquisition method thereof conforms to FIGS. 46 and 48), and causes the subtitle information to be output from the decided output destination. In addition, when a plurality of users are wearing HMDs 30, the control unit 38 may cause different kinds of subtitle information to be displayed in the respective HMDs 30.

According to the sixth process example, information that is presumed to be close to needs of users can be provided. Display modes of the sixth process example can also be applied to the first to fifth process examples.

It should be noted that the first and second embodiments may have any effect described in the present specification or other effects.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An information processing device including:

a communication unit configured to receive display position designation information indicating a display position of a window from another information processing device; and a control unit configured to perform control of displaying a window at the display position indicated by the display position designation information in a display area of a display unit.

(2)

The information processing device according to (1), wherein the control unit performs control of transmitting information regarding a displayable position of the window to the other information processing device.

(3)

The information processing device according to (1) or (2), wherein the control unit decides a display state of the window based on a use state of the other information processing device.

(4)

The information processing device according to any one of (1) to (3), wherein there are a plurality of other information processing devices, and wherein the control unit associates each of a plurality of windows with each of the plurality of other information processing devices while performing control of displaying a plurality of windows.

(5)

The information processing device according to (4), further including:

a detection unit configured to detect a position of a user of the other information processing device, wherein the control unit decides a display position of a window associated with the other information processing device based on the position of the user of the other information processing device.

(6)

The information processing device according to (5), wherein, when the position of the user of the other information processing device has been changed, the control unit changes the display position of the window associated with the other information processing device.

(7)

The information processing device according to (4), further including:

a detection unit configured to detect a position of a user of the other information processing device, wherein, according to determination that the position of the user of the other information processing device is not in a predetermined range, the control unit cancels association between the other information processing device and a window associated with the other information processing device.

(8)

The information processing device according to (7), wherein the control unit associates the window of which the association with the other information processing device has been cancelled with an information processing device other than the other information processing device.

(9)

The information processing device according to (7), wherein, according to the determination of the detection unit that the position of the user of the other information processing device is not in the predetermined range, the control unit erases the window associated with the other information processing device.

(10)

The information processing device according to (4), wherein the control unit compartmentalizes the display area into a plurality of small regions, and associates each of the plurality of small regions with each of the plurality of other information processing devices.

(11)

The information processing device according to any one of (1) to (10), wherein, while the control unit performs control of displaying a plurality of windows, when the other information processing device requests image information displayed in one window of the plurality of windows, the control unit performs control of transmitting the image information displayed in the one window to the other information processing device.

(12)

The information processing device according to (11), wherein the control unit performs control of erasing the one window.

(13)

The information processing device according to any one of (1) to (12), wherein the control unit transmits relevant information relating to image information being displayed in the window to the other information processing device.

(14)

An information processing device including:

a control unit configured to generate display position designation information indicating a display position of a window; and a communication unit configured to transmit the display position designation information to another information processing device capable of displaying the window.

(15)

An information processing method including:

receiving display position designation information indicating a display position of a window from another information processing device; and performing control of displaying a window at the display position indicated by the display position designation information in a display area of a display unit.

(16)

A program causing a computer to realize:

a communication function of receiving display position designation information indicating a display position of a window from another information processing device; and a control function of performing control of displaying a window at the display position indicated by the display position designation information in a display area of a display unit.

REFERENCE SIGNS LIST

10 information processing device
11 display unit
12 operation unit
13 detection unit
14 communication unit
15 storage unit
16 control unit
17 audio output unit
20 display device
21 display unit
22 audio output unit
23 imaging unit
24 communication unit
25 storage unit
26 control unit
27 audio detection unit

The invention claimed is:

1. A first information processing device, comprising:
a display device; and
circuitry configured to:
receive request information from a second information processing device of a plurality of information processing devices, wherein the request information corresponds to a request to display first image information on the first information processing device;
transmit displayable area information to the second information processing device based on the received request information, wherein
the displayable area information indicates at least one display position in a specific display area of the display device, and
the first image information is displayable on the at least one display position;
receive display position designation information from the second information processing device, wherein
the display position designation information is based on the transmitted displayable area information, and
the display position designation information indicates a first display position of the at least one display position;
control, based on the received display position designation information, the display device to display a first window in the specific display area of the display device at the first display position;
determine a use state of the second information processing device,
wherein the use state of the second information processing device comprises at least one of a vertical placement, a horizontal placement, or an oblique placement of the second information processing device;
determine a display state of the first window based on the use state of the second information processing device;
control the display device to display the first window based on the display state of the second information processing device;
control reception of the first image information from the second information processing device;

control the display device to display the first image information in the first window;
control transmission of first relevant information to a server based on a user preference,
wherein the first relevant information corresponds to the first image information displayed in the first window;
receive, based on the transmission of the first relevant information, second relevant information from the server, wherein
the second relevant information corresponds to the first image information displayed in the first window, and
the second relevant information is different from the first relevant information; and
control transmission of the second relevant information to a third information processing device of the plurality of information processing devices.

2. The first information processing device according to claim 1,
wherein the circuitry is further configured to:
control the display device to display a plurality of windows corresponding to the plurality of information processing devices, wherein the plurality of windows includes the first window; and
associate each window of the plurality of windows with a respective information processing device of the plurality of information processing devices.

3. The first information processing device according to claim 1, wherein the circuitry is further configured to:
detect a first user position; and
determine the first display position of the first window associated with the second information processing device, wherein the first display position is determined based on the detected first user position.

4. The first information processing device according to claim 3, wherein the circuitry is further configured to:
identify a second user position based on a user movement from the first user position; and
control the display device to move the first display position of the first window;
wherein the display device is controlled based on the second user position.

5. The first information processing device according to claim 1, wherein the circuitry is further configured to:
detect a user position;
determine that the user position is outside a threshold range; and
cancel, based on the determination that the user position is outside the threshold range, an association between the second information processing device and the first window associated with the second information processing device.

6. The first information processing device according to claim 5, wherein, based on the cancellation of the association between the second information processing device and the first window, the circuitry is further configured to associate the first window with a fourth information processing device of the plurality of information processing devices.

7. The first information processing device according to claim 5, wherein the circuitry is further configured to delete the first window associated with the second information processing device.

8. The first information processing device according to claim 1, wherein the circuitry is further configured to:
divide the specific display area into a plurality of regions; and
associate each region of the plurality of regions with a respective information processing device of the plurality of information processing devices.

9. The first information processing device according to claim 1, wherein the circuitry is further configured to:
control the display device to display a plurality of windows corresponding to the plurality of information processing devices, wherein the plurality of windows includes the first window;
receive a request for second image information of a second window of the plurality of windows from a fourth information processing device of the plurality of information processing devices; and
control transmission of the second image information to the fourth information processing device.

10. The first information processing device according to claim 9, wherein the circuitry is further configured to delete the first window of the plurality of windows.

11. An information processing method, comprising:
in a first information processing device:
receiving request information from a second information processing device of a plurality of information processing devices, wherein the request information corresponds to a request to display image information on the first information processing device;
transmitting displayable area information to the second information processing device based on the received request information, wherein
the displayable area information indicates at least one display position in a specific display area of a display device of the first information processing device, and
the image information is displayable on the at least one display position;
receiving display position designation information from the second information processing device, wherein
the display position designation information is based on the transmitted displayable area information, and
the display position designation information indicates a display position of the at least one display position;
controlling, based on the received display position designation information, the display device to display a window in the specific display area of the display device at the display position;
controlling reception of the image information from the second information processing device;
controlling the display device to display the image information in the window;
determining a use state of the second information processing device,
wherein the use state of the second information processing device comprises at least one of a vertical placement, a horizontal placement, or an oblique placement of the second information processing device;
determining a display state of the window based on the use state of the second information processing device;
controlling the display device to display the window based on the display state of the second information processing device;

controlling transmission of first relevant information to a server based on a user preference,
wherein the first relevant information corresponds to the image information displayed in the window;
receiving, based on the transmission of the first relevant information, second relevant information from the server, wherein
the second relevant information corresponds to the image information displayed in the window, and
the second relevant information is different from the first relevant information; and
controlling transmission of the second relevant information to a third information processing device of the plurality of information processing devices.

12. A non-transitory computer-readable medium having stored thereon, computer-executable instructions which when executed by a computer in a first information processing device, cause the computer to execute operations, the operations comprising:
receiving request information from a second information processing device of a plurality of information processing devices, wherein the request information corresponds to a request to display image information on the first information processing device;
transmitting displayable area information to the second information processing device based on the received request information, wherein
the displayable area information indicates at least one display position in a specific display area of a display device of the first information processing device and,
the image information is displayable on the at least one display position;
receiving display position designation information from the second information processing device, wherein
the display position designation information is based on the transmitted displayable area information, and
the display position designation information indicates a display position of the at least one display position;
controlling, based on the received display position designation information, the display device to display a window in the specific display area of the display device at the display position;
determining a use state of the second information processing device,
wherein the use state of the second information processing device comprises at least one of a vertical placement, a horizontal placement, or an oblique placement of the second information processing device;
determining a display state of the window based on the use state of the second information processing device;
controlling the display device to display the window based on the display state of the second information processing device;
controlling reception of the image information from the second information processing device;
controlling the display device to display the image information in the window;
controlling transmission of first relevant information to a server based on a user preference,
wherein the first relevant information corresponds to the image information displayed in the window;
receiving, based on the transmission of the first relevant information, second relevant information from the server, wherein
the second relevant information corresponds to the image information displayed in the window, and
the second relevant information is different from the first relevant information; and
controlling transmission of the second relevant information to a third information processing device of the plurality of information processing devices.

* * * * *